(12) United States Patent
Zhang et al.

(10) Patent No.: US 12,015,795 B2
(45) Date of Patent: Jun. 18, 2024

(54) SIGNALING OF SLICE TYPES IN VIDEO PICTURES HEADERS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Zhipin Deng, Beijing (CN); Jizheng Xu, San Diego, CA (US); Ye-kui Wang, San Diego, CA (US)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/849,293

(22) Filed: Jun. 24, 2022

(65) Prior Publication Data

US 2023/0046994 A1    Feb. 16, 2023

Related U.S. Application Data

(63) Continuation of application No. PCT/CN2020/140044, filed on Dec. 28, 2020.

(30) Foreign Application Priority Data

Dec. 27, 2019    (WO) ................ PCT/CN2019/129069

(51) Int. Cl.
*H04N 11/02*    (2006.01)
*H04N 19/174*    (2014.01)
(Continued)

(52) U.S. Cl.
CPC .......... *H04N 19/46* (2014.11); *H04N 19/174* (2014.11); *H04N 19/176* (2014.11); *H04N 19/70* (2014.11)

(58) Field of Classification Search
CPC ..................................................... H04N 19/46
(Continued)

(56) References Cited

U.S. PATENT DOCUMENTS 6,804,403 B1    10/2004    Lu et al.
7,627,037 B2    12/2009    Li et al.
(Continued)

FOREIGN PATENT DOCUMENTS

CN    101309409 A    11/2008
CN    104169971 A    11/2014
(Continued)

OTHER PUBLICATIONS

Abe et al. "AHG9: On JCCR Signaling," Joint Video Experts Team (JVET) of ITU-T SG 16 WP 3 and ISO/IEC JTC 1/ SC 29/WG 11 17th Meeting: Brussels, BE, Jan. 7-17, 2020, document JVET-Q0147, 2020.
(Continued)

*Primary Examiner* — Leron Beck
(74) *Attorney, Agent, or Firm* — Perkins Coie LLP

(57) ABSTRACT

Devices, systems and methods related to digital video coding, and specifically, to signaling of slice types in video picture headers are described. One example method of video processing includes performing a conversion between a video including one or more video pictures including one or more slices and a bitstream of the video, wherein the bitstream conforms to a format rule, and wherein the format rule specifies that for a video picture of the one or more
(Continued)

1500

Performing a conversion between a video comprising one or more video pictures and a bitstream of the video, the bitstream conforming to a format rule specifying that a syntax element indicating a picture type for a picture is signaled in an access unit (AU) delimiter raw byte sequence payload (RBSP), and wherein the syntax element indicates whether all slices in the picture are I-slices ---- 1510 video pictures having all slices coded as I slices, P slice and B slice related syntax elements are omitted from a picture header for the video picture.

20 Claims, 18 Drawing Sheets

(51) Int. Cl.
- *H04N 19/176* (2014.01)
- *H04N 19/46* (2014.01)
- *H04N 19/70* (2014.01)

(58) Field of Classification Search
USPC .................................... 375/240.01–240.29
See application file for complete search history.

(56) References Cited

U.S. PATENT DOCUMENTS

| | | |
|---|---|---|
| 8,442,109 B2 | 5/2013 | Wang et al. |
| 9,294,777 B2 | 3/2016 | Wang |
| 9,485,508 B2 | 11/2016 | Wang et al. |
| 9,509,999 B2 | 11/2016 | Seregin et al. |
| 9,521,425 B2 | 12/2016 | Chen et al. |
| 9,578,328 B2 | 2/2017 | Rapaka et al. |
| 9,667,996 B2 | 5/2017 | Chen et al. |
| 9,712,871 B2 | 7/2017 | Ramasubramonian et al. |
| 9,762,927 B2 | 9/2017 | Chen et al. |
| 9,788,007 B2 | 10/2017 | Wang et al. |
| 9,918,091 B2 | 3/2018 | Wang et al. |
| 9,992,493 B2 | 6/2018 | Chen et al. |
| 9,992,494 B2 | 6/2018 | Zhang et al. |
| 10,116,937 B2 | 10/2018 | Li et al. |
| 10,148,981 B2 | 12/2018 | Zhu et al. |
| 10,158,884 B2 | 12/2018 | Zhang et al. |
| 10,212,411 B2 | 2/2019 | Zhang et al. |
| 10,306,240 B2 | 5/2019 | Xiu et al. |
| 10,306,269 B2 | 5/2019 | Hendry et al. |
| 10,382,781 B2 | 8/2019 | Zhao et al. |
| 10,402,689 B1 | 9/2019 | Bogdanovych et al. |
| 10,523,964 B2 | 12/2019 | Chuang et al. |
| 10,567,769 B2 | 2/2020 | Li et al. |
| 10,764,576 B2 | 9/2020 | Li et al. |
| 10,776,663 B1 | 9/2020 | Bogdanovych et al. |
| 10,779,002 B2 | 9/2020 | Chen et al. |
| 10,904,565 B2 | 1/2021 | Chuang et al. |
| 11,039,165 B2 | 6/2021 | Liu et al. |
| 11,233,988 B2 | 1/2022 | Seregin et al. |
| 11,240,531 B2 | 2/2022 | Liu et al. |
| 11,330,294 B2 | 5/2022 | Zhen et al. |
| 11,425,417 B2 | 8/2022 | Liu et al. |
| 11,503,342 B2 | 11/2022 | Deshpande et al. |
| 11,611,780 B2 | 3/2023 | Zhang et al. |
| 11,641,464 B2 | 5/2023 | Zhang et al. |
| 11,711,547 B2 | 7/2023 | Zhang et al. |
| 11,722,660 B2 | 8/2023 | Zhang et al. |
| 2011/0310976 A1 | 12/2011 | Wang et al. |
| 2012/0189049 A1 | 7/2012 | Coban et al. |
| 2013/0177084 A1 | 7/2013 | Wang et al. |
| 2013/0259446 A1 | 10/2013 | Sathish |
| 2014/0192887 A1 | 7/2014 | Hong et al. |
| 2014/0328398 A1 | 11/2014 | Chen et al. |
| 2015/0023409 A1* | 1/2015 | Schierl ................... H04N 19/70 375/240.02 |
| 2015/0201204 A1 | 7/2015 | Chen et al. |
| 2015/0264348 A1 | 9/2015 | Zou et al. |
| 2015/0304666 A1 | 10/2015 | Seregin et al. |
| 2015/0319447 A1 | 11/2015 | Minoo et al. |
| 2015/0355459 A1 | 12/2015 | Shen et al. |
| 2015/0358631 A1 | 12/2015 | Zhang et al. |
| 2016/0277762 A1 | 9/2016 | Zhang et al. |
| 2017/0150156 A1 | 5/2017 | Zhang et al. |
| 2017/0150176 A1 | 5/2017 | Zhang et al. |
| 2017/0201769 A1 | 7/2017 | Chon et al. |
| 2017/0295380 A1 | 10/2017 | Huang et al. |
| 2018/0220138 A1 | 8/2018 | He et al. |
| 2018/0241998 A1 | 8/2018 | Chen et al. |
| 2018/0270502 A1 | 9/2018 | Mukherjee et al. |
| 2018/0367814 A1 | 12/2018 | Seregin et al. |
| 2019/0110058 A1 | 4/2019 | Chien et al. |
| 2019/0141333 A1 | 5/2019 | Lee |
| 2019/0166370 A1 | 5/2019 | Xiu et al. |
| 2019/0215537 A1 | 7/2019 | Poirier et al. |
| 2019/0238864 A1 | 8/2019 | Xiu et al. |
| 2019/0260990 A1 | 8/2019 | Lim et al. |
| 2019/0273919 A1 | 9/2019 | Lim et al. |
| 2019/0306502 A1 | 10/2019 | Gadde et al. |
| 2020/0359016 A1 | 11/2020 | Li et al. |
| 2020/0359017 A1 | 11/2020 | Li et al. |
| 2020/0359018 A1 | 11/2020 | Li et al. |
| 2020/0382795 A1 | 12/2020 | Zhang et al. |
| 2020/0382807 A1 | 12/2020 | Liu et al. |
| 2020/0396453 A1 | 12/2020 | Zhang et al. |
| 2020/0396455 A1 | 12/2020 | Liu et al. |
| 2021/0021812 A1 | 1/2021 | Zheng et al. |
| 2021/0029362 A1 | 1/2021 | Liu et al. |
| 2021/0029378 A1 | 1/2021 | He et al. |
| 2021/0051335 A1 | 2/2021 | Liao et al. |
| 2021/0051339 A1 | 2/2021 | Liu et al. |
| 2021/0051341 A1 | 2/2021 | Seregin et al. |
| 2021/0067791 A1 | 3/2021 | Ye et al. |
| 2021/0067796 A1* | 3/2021 | Chen ................... H04N 19/463 |
| 2021/0076063 A1 | 3/2021 | Liu et al. |
| 2021/0084311 A1 | 3/2021 | Seregin et al. |
| 2021/0084315 A1 | 3/2021 | Chen et al. |
| 2021/0092372 A1 | 3/2021 | Misra et al. |
| 2021/0092435 A1 | 3/2021 | Liu et al. |
| 2021/0105499 A1* | 4/2021 | Lee ..................... H04N 19/159 |
| 2021/0126222 A1 | 4/2021 | Liu et al. |
| 2021/0127112 A1 | 4/2021 | Choi et al. |
| 2021/0136419 A1* | 5/2021 | Hsiang .................. H04N 19/70 |
| 2021/0160511 A1 | 5/2021 | Zhang et al. |
| 2021/0168366 A1 | 6/2021 | Li et al. |
| 2021/0185347 A1 | 6/2021 | Liu et al. |
| 2021/0195179 A1* | 6/2021 | Coban .................. H04N 19/186 |
| 2021/0227211 A1 | 7/2021 | Liu et al. |
| 2021/0227245 A1 | 7/2021 | Liu et al. |
| 2021/0227246 A1 | 7/2021 | Liu et al. |
| 2021/0227250 A1 | 7/2021 | Liu et al. |
| 2021/0235075 A1* | 7/2021 | Lee ..................... H04N 19/52 |
| 2021/0235083 A1 | 7/2021 | Liu et al. |
| 2021/0250592 A1 | 8/2021 | Xiu et al. |
| 2021/0250622 A1 | 8/2021 | Jung et al. |
| 2021/0266530 A1 | 8/2021 | Liu et al. |
| 2021/0266585 A1 | 8/2021 | Liu et al. |
| 2021/0274201 A1 | 9/2021 | Xu et al. |
| 2021/0274202 A1 | 9/2021 | Xiu et al. |
| 2021/0274211 A1 | 9/2021 | Liu et al. |
| 2021/0274212 A1 | 9/2021 | Liu et al. |
| 2021/0274213 A1 | 9/2021 | Xiu et al. |
| 2021/0281865 A1 | 9/2021 | Liu et al. |
| 2021/0281876 A1 | 9/2021 | Zhang et al. |
| 2021/0297674 A1 | 9/2021 | Xu et al. |
| 2021/0306666 A1 | 9/2021 | Lee |
| 2021/0314630 A1 | 10/2021 | Misra et al. |
| 2021/0352279 A1 | 11/2021 | Xu et al. |
| 2021/0360270 A1 | 11/2021 | Xu et al. |
| 2021/0368164 A1 | 11/2021 | Xu et al. |
| 2021/0368178 A1 | 11/2021 | Xu et al. |
| 2021/0368181 A1 | 11/2021 | Liu et al. |
| 2021/0368187 A1 | 11/2021 | Zhang et al. |
| 2021/0368198 A1 | 11/2021 | Zhang et al. |
| 2021/0368199 A1 | 11/2021 | Zhang et al. |
| 2021/0368203 A1 | 11/2021 | Zhang et al. |
| 2021/0377559 A1 | 12/2021 | Liu et al. |
| 2021/0385437 A1 | 12/2021 | Xu et al. |
| 2021/0385481 A1 | 12/2021 | Liu et al. |
| 2021/0385482 A1 | 12/2021 | Liu et al. |
| 2021/0400299 A1 | 12/2021 | Zhu et al. |
| 2022/0007053 A1 | 1/2022 | Hanhart et al. |
| 2022/0060735 A1 | 2/2022 | Chen et al. |
| 2022/0060743 A1 | 2/2022 | Bordes et al. |
| 2022/0150490 A1 | 5/2022 | Kuo et al. |
| 2022/0174303 A1 | 6/2022 | Jang |

(56) References Cited

U.S. PATENT DOCUMENTS

| | | | |
|---|---|---|---|
| 2022/0217328 A1 | 7/2022 | Zhang et al. | |
| 2022/0232207 A1 | 7/2022 | Zhang et al. | |
| 2022/0239950 A1 | 7/2022 | Zhang et al. | |
| 2022/0256197 A1 | 8/2022 | Zhang et al. | |
| 2022/0264086 A1 | 8/2022 | Zhang et al. | |
| 2022/0264137 A1 | 8/2022 | Zhang et al. | |
| 2022/0272353 A1 | 8/2022 | Zhang et al. | |
| 2022/0353536 A1 | 11/2022 | Samuelsson et al. | |
| 2022/0353537 A1 | 11/2022 | Deshpande et al. | |
| 2022/0394255 A1 | 12/2022 | Kang et al. | |
| 2023/0007264 A1 | 1/2023 | Koo et al. | |

FOREIGN PATENT DOCUMENTS

| | | | |
|---|---|---|---|
| CN | 105122804 A | 12/2015 | |
| CN | 105144719 A | 12/2015 | |
| CN | 105191315 A | 12/2015 | |
| CN | 105230018 A | 1/2016 | |
| CN | 106664425 A | 5/2017 | |
| CN | 107409209 A | 11/2017 | |
| CN | 107431818 A | 12/2017 | |
| CN | 107483934 A | 12/2017 | |
| CN | 107646195 A | 4/2018 | |
| CN | 108781282 A | 11/2018 | |
| CN | 109076221 A | 12/2018 | |
| CN | 109255750 A | 1/2019 | |
| CN | 109792539 A | 5/2019 | |
| CN | 110169061 A | 8/2019 | |
| CN | 110169073 A | 8/2019 | |
| CN | 111201793 A | 5/2020 | |
| EP | 2753079 A1 | 7/2014 | |
| EP | 3177018 A1 | 6/2017 | |
| EP | 3939311 A1 | 1/2022 | |
| GB | 2590634 A | 7/2021 | |
| JP | 2020017970 A | 1/2020 | |
| JP | 2022505470 A | 1/2022 | |
| JP | 2022537064 A | 8/2022 | |
| JP | 2022544164 A | 10/2022 | |
| JP | 2022547599 A | 11/2022 | |
| JP | 2022548704 A | 11/2022 | |
| WO | 2009051719 A2 | 4/2009 | |
| WO | 2013002589 A2 | 1/2013 | |
| WO | 2013128010 A9 | 9/2013 | |
| WO | 2014167178 A1 | 10/2014 | |
| WO | 2015196117 A1 | 12/2015 | |
| WO | 2016196043 A1 | 12/2016 | |
| WO | 2017133661 A1 | 8/2017 | |
| WO | 2017151343 A1 | 9/2017 | |
| WO | 2017214420 A | 12/2017 | |
| WO | 2018053293 A | 3/2018 | |
| WO | 2020009434 A1 | 1/2020 | |
| WO | 2020096755 A1 | 5/2020 | |
| WO | 2020185879 A1 | 9/2020 | |
| WO | 2020247255 A1 | 12/2020 | |
| WO | 2020253858 A1 | 12/2020 | |
| WO | 2020262286 A1 | 12/2020 | |
| WO | 2021026255 A1 | 2/2021 | |
| WO | 2021026363 A1 | 2/2021 | |
| WO | 2021050234 A1 | 3/2021 | |
| WO | 2021068956 A1 | 4/2021 | |
| WO | 2021123326 A1 | 6/2021 | |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
Bross et al. "Versatile Video Coding (Draft 7)," Joint Video Experts Team (JVET) of ITU-T SG 16 WP 3 and ISO/IEC ITC 1/SC 29/WG 11 16th Meeting: Geneva, CH, Oct. 1-11, 2019, document JVET-P2001, 2019.
Bross et al. "Versatile Video Coding (Draft 8)," Joint Video Experts Team (JVET) of ITU-T SG 16 WP 3 and ISO/IEC ITC 1/SC 29/WG 11 17th Meeting: Brussels, BE, Jan. 7-17, 2020, document JVET-Q2001, 2020.
Chen et al. "Algorithm Description of Joint Exploration Test Model 7 (JEM 7)," Joint Video Exploration Team (JVET) of TU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Affine Merge Enhancement with Simplification (Test 4.2.2)," Joint Video Experts Team (JVET) of TU-T SG 16 WP 3 and ISO/IEC JTC 1/SC 29/WG 11 12th Meeting: Macao, CN, Oct. 3-12, 2018, document JVET-L0368, 2018.
Chen et al. "AHG 19: Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0279, 2019.
Galpin et al. "Non-CE4: Temporal Merge Modes Simplification," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0501, 2019.
Hannuksela et al. "Use Cases and Proposed Design Choices for Adaptive Resolution Changing (ARC)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0259, 2019.
Hannuksela et al. "AHG19: On Adaptive Resolution Changing," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0048, 2019.
Helmrich et al. "CE7-Related: Joint Chroma Residual Coding with Multiple Modes," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0282, 2019.
Hendry et al. "On Adaptive Resolution Change (ARC) for VVC," Joint Video Experts Team (JVET) of ITU-T SG 16 WP 3 and ISO/IEC JTC 1/SC 29/WG 11 13th Meeting: Marrakech, MA, Jan. 9-18, 2019. document JVET-M0135, 2019.
Hong et al. AHG19: "Adaptive Resolution Change (ARC) Support in VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0118, 2019.
"High Efficiency Video Coding," Series H: Audiovisual and Multimedia Systems: Infrastructure of Audiovisual Services Coding of Moving Video, ITU-T Telecommunication Standardization Sector of ITU, H.265, Feb. 2018.
Lainema et al. "CE7-Related: Joint Coding of Chrominance Residuals," Joint Video Experts Team (JVET) of ITU-T SG 16 WP 3 and ISO/IEC JTC 1/SC 29/WG 11 13th Meeting: Marrakech, MA, Jan. 9-18, 2019 document JVET- M0305, 2019.
Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0236, 2019.
Meng et al. "Non-CE4: Harmonization of PROF, BDOF and DMVR Syntax," Joint Video Experts Team (JVET) of ITU-T SG 16 WP 3 and ISO/IEC JTC 1/SC 29/WG 1 16th Meeting: Geneva, CH, Oct. 1-11, 2019, document JVET-P0314, 2019.
Nalci et al. "Non-CE6: LFNST Signaling at the TU Level," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0569, 2019.
Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/ WG1125th Meeting: Chengdu, CN, Oct. 14-21, 2016, document JCTVC-Y1002, 2016.
Sanchez et al. "AHG17: On HRD for Open GOP and DRAP," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-00495, 2019.
Seregin et al. "AHG8: Scaling Window for Scaling Ratio Derivation," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0590, 2019.

(56) References Cited

OTHER PUBLICATIONS

Wan et al. "AHG17: Picture Header," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0239, 2019.
Wan et al. "AHG17: Text for Picture Header," Joint Video Experts Team (JVET) of ITU-T SG 16 WP 3 and ISO/IEC ITC 1/SC 29/WG 11 16th Meeting: Geneva, CH, Oct. 1-11, 2019, document JVET-P1006, 2019.
Wang et al. "CE4-Related: Remove Redundancy between TMVP and ATMVP," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0345, 2019.
Wang et al. "AHG17: On Access Unit Delimiter and Picture Header," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0120, 2019.
Wang et al. "AHG9: Cleanups on Parameter Sets," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0117, 2020.
Wenger et al. "[AHG19] On Signaling of Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0052, 2019.
Xu et al. "CE8-Related: A SPS Level Flag for BDPCM and JCCR," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0376, 2019.
Yang et al. "Subblock-Based Motion Derivation and Interprediction Refinement in the Versatile Video Coding Standard," IEEE Transactions on Circuits and Systems for Video Technology, Oct. 31, 2021(10):3862-3877.
Zhang et al. "CE4-related: Interweaved Prediction for Affine Motion Compensation," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0102, 2018.
Zhang et al. "CE2-5.5: History-Parameter-based Affine Model Inheritance," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0263, 2019.
https://vcgit.hhi.fraunhofer.de/jvet/VVCSoftware_VTM/tags/VTM-6.0.
JEM-7.0: https://jvet.hhi.fraunhofer.de/svn/svn_HMJEMSoftware/tags/ HM-16.6-JEM-7.0.
International Search Report and Written Opinion from International Patent Application No. PCT/CN2020/116468 dated Nov. 25, 2020 (10 pages).
International Search Report and Written Opinion from International Patent Application No. PCT/CN2020/116469 dated Dec. 4, 2020 (13 pages).
International Search Report and Written Opinion from International Patent Application No. PCT/CN2020/119912 dated Jan. 12, 2021 (12 pages).
International Search Report and Written Opinion from International Patent Application No. PCT/CN2020/119913 dated Jan. 14, 2021 (10 pages).
International Search Report and Written Opinion from International Patent Application No. PCT/CN2020/120288 dated Dec. 30, 2020 (10 pages).
International Search Report and Written Opinion from International Patent Application No. PCT/CN2020/120289 dated Dec. 31, 2020 (8 pages).
International Search Report and Written Opinion from International Patent Application No. PCT/CN2020/120554 dated Jan. 12, 2021 (12 pages).
International Search Report and Written Opinion from International Patent Application No. PCT/CN2020/140044 dated Mar. 31, 2021 (10 pages).

Non Final Office Action from U.S. Appl. No. 17/699,014 dated Jun. 24, 2022.
Non Final Office Action from U.S. Appl. No. 17/699,021 dated Jul. 1, 2022.
Non Final Office Action from U.S. Appl. No. 17/713,063 dated Jul. 15, 2022.
Non Final Office Action from U.S. Appl. No. 17/718,880 dated Jul. 19, 2022.
Non Final Office Action from U.S. Appl. No. 17/713,104 dated Jul. 22, 2022.
Non Final Office Action from U.S. Appl. No. 17/718,785 dated Aug. 4, 2022.
Non Final Office Action from U.S. Appl. No. 17/719,708 dated Aug. 12, 2022.
Examination Report from Indian Patent Application No. 202247020262 dated Aug. 25, 2022 (5 pages.).
Chen et al. "Resampling Process of the Scalable High Efficiency Video Coding," IEEE 2015 Data Compression Conference, Apr. 7-9, 2015. pp. 23-32.
Chen et al. "Decoder-Side Motion Vector Refinement Based on Bilateral Template Matching," Joint Video Exploration Team (JVET) of ITU-T SG 16 WP 3 and ISO/IEC JTC 1/SC 29/WG 11 4th Meeting, Chengdu, CN, Oct. 15-21, 2016, document JVET-D0029, 2016.
Chen et al. "CE1-Related: Enable PROF for RPR," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0409, 2019.
Deng et al. "AHG9: PH and SH Syntax Cleanups," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0116, 2020.
"Information Technology—Generic Coding of Moving Pictures and Associated Audio Information—Part 2: Video," ISDO/IEC 13818-2: 2013, IEC 3, Rue De Varembe, Geneva CH, Sep. 27, 2013, pp. 1-225, XP082007972.
Sullivan et al. "Meeting Report of nthe 15th Meeting of the Joint Video Experts Team (JVET), Gothenburg, SE, Jul. 3-12, 2019," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2000, 2019.
Wang et al. "AHG9: Cleanups on Signaling for CC-ALF, BDPCM, ACT and Palette," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0520, 2020.
Xu et al. "AHG 9: Picture Header Syntax Cleanups" Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0428, 2020.
Zhang et al. "Non-CE1: A Fix on Reference Sample Offset for RPR," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0381, 2019.
Zhou et al. "JVET AHG Report: Implementation Studies (AHG16)," Joint Video Exploration Team (JVET) of ITU-T SG 16 WP 3 and ISO/IEC JTC 1/SC 29/WG 11 16th Meeting: Geneva, CH, Oct. 1-11, 2019, document JVET-P0016, 2019.
Extended European Search Report from European Patent No. 20866342.7dated Oct. 31, 2022 (12 pages).
Extended European Search Report from European Patent No. 20866741.0 dated Nov. 7, 2022 (11 pages).
Extended European Search Report from European Patent No. 20874792.3 dated Nov. 3, 2022 (9 pages).
Extended European Search Report from European Patent No. 20876825.9 dated Oct. 31, 2022 (10 pages).
Extended European Search Report from European Patent No. 20874449.0 dated Dec. 21, 2022 (12 pages).
Extended European Search Report from European Patent No. 20906207.4 dated Dec. 20, 2022 (12 pages).
Final Office Action from U.S. Appl. No. 17/699,021 dated Nov. 15, 2022.
Final Office Action from U.S. Appl. No. 17/713,063 dated Nov. 25, 2022.

(56) References Cited

OTHER PUBLICATIONS

Notice of Allowance from U.S. Appl. No. 17/718,785 dated Dec. 7, 2022.

Notice of Allowance from U.S. Appl. No. 17/719,708 dated Dec. 23, 2022.

Bross et al. "Versatile Video Coding (Draft 10)," Joint Video Experts Team (JVET) of ITU-T SG 16 WP 3 and ISO/IEC JTC 1/SC 29/WG 11 19th Meeting, by teleconference, Jun. 22-Jul. 1, 2020, document JVET-S2001, 2020.

Hendry et al. "AHG8: Support for Reference Picture Resampling—Handling of Picture Size Signalling, Conformative Windows, and DPB Management," Joint Video Experts Team (JVET) of ITU-T SG 16 WP 3 and ISO/IEC JTC 1/SC 29/WG 11 15th Meeting, Gothenburgm SE, Jul. 3-12, 2019, document JVET-O0133, 2019.

Liu et al. "CE2: Adaptive Motion Vector Resolution for Affine Inner Mode (test 2.1.2)," Joint Video Experts Team (JVET) of ITU-T SG 16 WP 3 and ISO/IEC JTC 1/SC 29/WG 11 13th Meeting, Marrakech, MA, Jan. 9-18, 2019, document JVET-M0246, 2019.

Suehring et al. "AHG17: Conformance Window," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0352, 2019.

Notice of Allowance from U.S. Appl. No. 17/699,021 dated Mar. 29, 2023.

Advanced Video Coding for Generic Audiovisual Services, Series H: Audiovisual and Multimedia Systems, Infrastructure of Audiovisual Services—Coding of Moving Video, ITU-T Telecommunication Standardization Sector of ITU, H.264, Jan. 2012. pp. 19,20,42,43,72, Table 6-1; 8 lines just after Table 6-1; p. 72, lines 32-47.

Notice of Allowance from U.S. Appl. No. 17/713,063 dated Apr. 27, 2023.

Gao et al. "CE4: CE4-1.1, CE4-1.2 and CE4-1.14: Geometric Merge Mode (GEO)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0068, 2019.

\* cited by examiner

FIG. 3B
FIG. 3C

SIGNALING OF SLICE TYPES IN VIDEO PICTURES HEADERS

CROSS-REFERENCE TO RELATED APPLICATION

This application is a continuation of International Application No. PCT/CN2020/140044, filed on Dec. 28, 2020, which claims the priority to and benefits of International Patent Application No. PCT/CN2019/129069 filed on Dec. 27, 2019. For all purposes under the law, the entire disclosures of the aforementioned applications are incorporated by reference as part of the disclosure of this application.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to signaling of slice types in video picture headers are described. The described methods may be applied to existing video coding standards (e.g., High Efficiency Video Coding (HEVC) or Versatile Video Coding) and future video coding standards or video codecs.

In a representative aspect, the disclosed technology may be used to provide a method for video processing. This method includes performing a conversion between a video comprising one or more video pictures comprising one or more slices and a bitstream of the video, wherein the bitstream conforms to a format rule, and wherein the format rule specifies that for a video picture of the one or more video pictures having all slices coded as I slices, P slice and B slice related syntax elements are omitted from a picture header for the video picture.

In another representative aspect, the disclosed technology may be used to provide a method for video processing. This method includes performing a conversion between a video comprising one or more video pictures comprising one or more slices and a bitstream of the video, wherein the bitstream conforms to a format rule, and wherein the format rule specifies that a picture header for each video picture comprises a syntax element indicating whether all slices in the video picture are coded with an identical coding type.

In yet another representative aspect, the disclosed technology may be used to provide a method for video processing. This method includes performing a conversion between a video comprising one or more video pictures and a bitstream of the video, wherein the bitstream conforms to a format rule, and wherein the format rule specifies that a picture header for each of the one or more video pictures comprises a syntax element indicating a picture type thereof.

In yet another representative aspect, the disclosed technology may be used to provide a method for video processing. This method includes performing a conversion between a video comprising one or more video pictures and a bitstream of the video, wherein the bitstream conforms to a format rule, and wherein the format rule specifies that a syntax element indicating a picture type for a picture is signaled in an access unit (AU) delimiter raw byte sequence payload (RBSP), and wherein the syntax element indicates whether all slices in the picture are I-slices.

In yet another representative aspect, the disclosed technology may be used to provide a method for video processing. This method includes performing a conversion between a video comprising a video picture comprising one or more video slices and a bitstream of the video, wherein the bitstream conforms to a format rule, and wherein, for a picture having each of a plurality of slices in the picture be an I-slice, the format rule specifies that an indication of a slice type is excluded from slice headers of the plurality of slices in the bitstream during encoding or inferred to be an I-slice during decoding.

In yet another representative aspect, the disclosed technology may be used to provide a method for video processing. This method includes making a determination, for a conversion between a video comprising a W-slice or a W-picture and a bitstream of the video, regarding whether one or more non-W related syntax elements are signaled in a slice header of the W-slice or a picture header of the W-picture, wherein W is I, B, or P, and performing, based on the determination, the conversion.

In yet another representative aspect, a video encoder apparatus is disclosed. The video encoder comprises a processor configured to implement above-described methods.

In yet another representative aspect, a video decoder apparatus is disclosed. The video decoder comprises a processor configured to implement above-described methods.

In yet another representative aspect, a computer readable medium having code stored thereon is disclose. The code embodies one of the methods described herein in the form of processor-executable code.

These, and other, features are described throughout the present document.

BRIEF DESCRIPTION OF THE DRAWINGS

FIGS. 3A-3C show examples of a specific position in a sample.

DETAILED DESCRIPTION

1. Video Coding in HEVC/H.265

Figure 1:
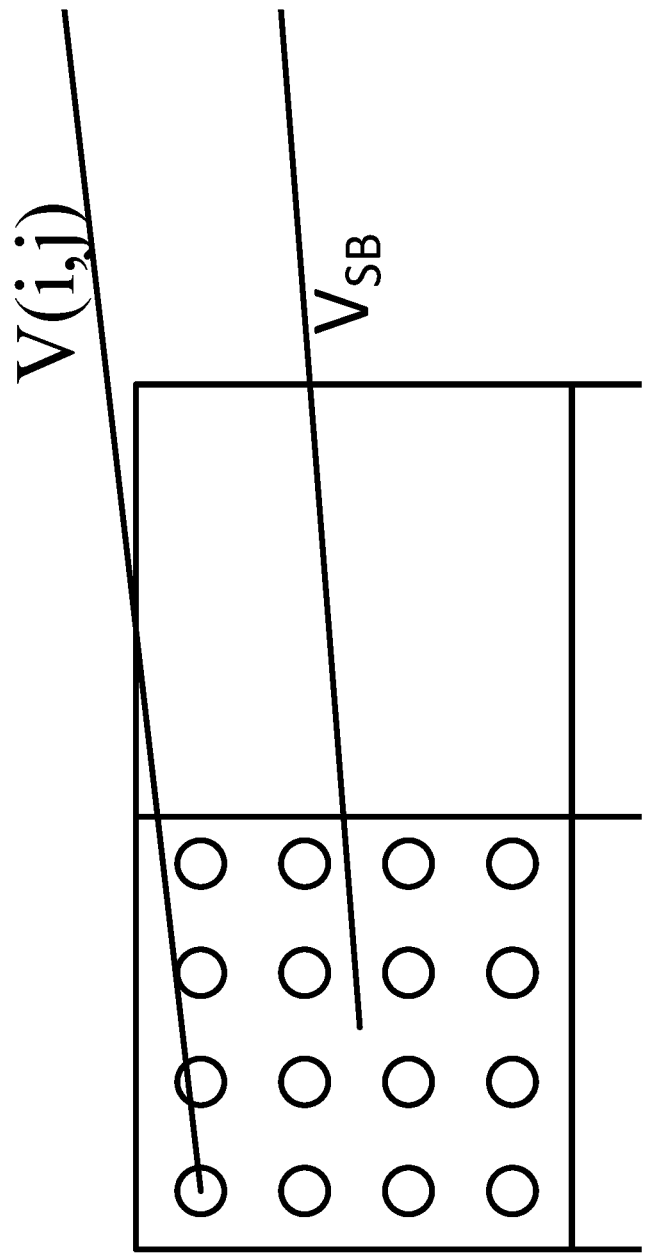
FIG. 1 shows an example of sub-block motion vector (VSB) and motion vector difference.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 6) could be found at: http://phenix.it-sudparis.eu/jvet/doc_end_user/documents/15_Gothenburg/wg11/JVET-O2001-v14.zip. The latest reference software of VVC, named VTM, could be found at: https://vcgit.hhi.fraunhofer.de/jvet/VVCSoftware_VTM/tags/VTM-6.0.

AVC and HEVC does not have the ability to change resolution without having to introduce an IDR or intra random access point (TRAP) picture; such ability can be referred to as adaptive resolution change (ARC). There are use cases or application scenarios that would benefit from an ARC feature, including the following:

Rate adaption in video telephony and conferencing: For adapting the coded video to the changing network conditions, when the network condition gets worse so that available bandwidth becomes lower, the encoder may adapt to it by encoding smaller resolution pictures. Currently, changing picture resolution can be done only after an TRAP picture; this has several issues. An TRAP picture at reasonable quality will be much larger than an inter-coded picture and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This can give a poor user experience.

Active speaker changes in multi-party video conferencing: For multi-party video conferencing it is common that the active speaker is shown in bigger video size than the video for the rest of conference participants. When the active speaker changes, picture resolution for each participant may also need to be adjusted. The need to have ARC feature becomes more important when such change in active speaker happens frequently.

Fast start in streaming: For streaming application, it is common that the application would buffer up to certain length of decoded picture before start displaying. Starting the bitstream with smaller resolution would allow the application to have enough pictures in the buffer to start displaying faster.

Adaptive stream switching in streaming: The Dynamic Adaptive Streaming over HTTP (DASH) specification includes a feature named @mediaStreamStructureId. This enables switching between different representations at open-GOP random access points with non-decodable leading pictures, e.g., CRA pictures with associated RASL pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching-at CRA pictures can be decoded with acceptable quality hence enabling seamless switching. With ARC, the @mediaStreamStructureId feature would also be usable for switching between DASH representations with different spatial resolutions.

ARC is also known as Dynamic resolution conversion.

ARC may also be regarded as a special case of Reference Picture Resampling (RPR) such as H.263 Annex P.

2.1. Reference Picture Resampling in 11.263 Annex P

This mode describes an algorithm to warp the reference picture prior to its use for prediction. It can be useful for resampling a reference picture having a different source format than the picture being predicted. It can also be used for global motion estimation, or estimation of rotating motion, by warping the shape, size, and location of the reference picture. The syntax includes warping parameters to be used as well as a resampling algorithm. The simplest level of operation for the reference picture resampling mode is an implicit factor of 4 resampling as only an FIR filter needs to be applied for the upsampling and downsampling processes. In this case, no additional signaling overhead is required as its use is understood when the size of a new picture (indicated in the picture header) is different from that of the previous picture.

2.2. Contributions on ARC to VVC

Several contributions have been proposed addressing ARC, as listed below: JVET-M10135, JVET-M0259, JVET-N0048, JVET-N0052, JVET-N0118, JVET-N0279.

2.3. Conformance Window in VVC

Conformance window in VVC defines a rectangle. Samples inside the conformance window belongs to the image of interest. Samples outside the conformance window may be discarded when output.

When conformance window is applied, the scaling ration in RPR is derived based on conformance windows.

Picture parameter set RBSP syntax

| pic_parameter_set_rbsp( ) { | Descriptor |
|---|---|
| pps_pic_parameter_set_id | ue(v) |
| pps_seq_parameter_set_id | ue(v) |
| pic_width_in_lumas_amples | ue(v) |

-continued

| | |
|---|---|
| pic_height_in_luma_samples | ue(v) |
| conformance_window_flag | u(1) |
| if( conformance window flag ) { | |
|    conf win left offset | ue(v) |
|    conf win right offset | ue(v) |
|    conf win top offset | ue(v) |
|    conf win bottom offset | ue(v) |
| } | | pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1, the value of pic_width_in_luma_samples shall be equal to pic_width_max_in_luma_samples. pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:

pic_width_in_luma_samples*2 shall be greater than or equal to refPicWidthInLumaSamples.
   pic_height_in_luma_samples*2 shall be greater than or equal to refPicHeightInLumaSamples.
   pic_width_in_luma_samples shall be less than or equal to refPicWidthInLumaSamples*8.
   pic_height_in_luma_samples shall be less than or equal to refPicHeightInLumaSamples*8.

conformance_window_flag equal to 1 indicates that the conformance cropping window offset parameters follow next in the SPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

$$PicOutputWidthL = pic\_width\_in\_luma\_samples - SubWidthC*(conf\_win\_right\_offset + conf\_win\_left\_offset) \quad (7\text{-}43)$$

$$PicOutputHeightL = pic\_height\_in\_pic\_size\_units - SubHeightC*(conf\_win\_bottom\_offset + conf\_win\_top\_offset) \quad (7\text{-}44)$$

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE – *The conformance cropping window offset parameters are only applied at the output. All internal decoding processes are applied to the uncropped picture size.*

Let ppsA and ppsB be any two PPSs referring to the same SPS. It is a requirement of bitstream conformance that, when ppsA and ppsB have the same the values of pic_width_in_luma_samples andpic_height_in_luma_samples, respectively, ppsA and ppsB shall have the same values of conf_win_left_offset, conf_win_right_offset, conf_win_top_offset, and conf_win_bottom_offset, respectively.

2.4. RPR in JVET-O2001-v14

ARC, a.k.a. RPR (Reference Picture Resampling) is incorporated in JVET-O2001-v14.

With RPR in JVET-O2001-v14, TMVP is disabled if the collocated picture has a different resolution to the current picture. Besides, BDOF and DMVR are disabled when the reference picture has a different resolution to the current picture.

To handle the normal MC when the reference picture has a different resolution than the current picture, the interpolation section is defined as below:

8.5.6.3 Fractional Sample Interpolation Process
8.5.6.3.1 General
Inputs to this process are:
   a luma location (xSb, ySb) specifying the top-left sample of the current coding subblock relative to the top-left luma sample of the current picture,
   a variable sbWidth specifying the width of the current coding subblock,
   a variable sbHeight specifying the height of the current coding subblock,
   a motion vector offset mvOffset,
   a refined motion vector refMvLX,
   the selected reference picture sample array refPicLX,
   the half sample interpolation filter index hpelIfIdx,
   the bi-directional optical flow flag bdofFlag,
   a variable cIdx specifying the colour component index of the current block.
Outputs of this process are:
   an (sbWidth+brdExtSize)×(sbHeight+brdExtSize) array predSamplesLX of prediction sample values.
The prediction block border extension size brdExtSize is derived as follows:

$$brdExtSize = (bdofFlag \| (inter\_affine\_flag[xSb][ySb] \&\& sps\_affine\_prof\_enabled\_flag))?2:0 \quad (8\text{-}752)$$

The variable fRefWidth is set equal to the PicOutputWidthL of the reference picture in luma samples.

The variable fRefHeight is set equal to PicOutputHeightL of the reference picture in luma samples.

The motion vector mvLX is set equal to (refMvLX−mvOffset).

If cIdx is equal to 0, the following applies:
  The scaling factors and their fixed-point representations are defined as hori_scale_fp=((fRefWidth<<14)+(PicOutputWidthL>>1))/PicOutputWidthL  (8-753)

vert_scale_fp=((fRefHeight<<14)+(PicOutputHeightL>>1))/PicOutputHeightL  (8-754)

Let ($xInt_L$, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding ($xSbInt_L$, $ySbInt_L$) is set equal to (xSb+(mvLX[0]>>4), ySb+(mvLX[1]>>4)).

For each luma sample location ($x_L$=0 . . . sbWidth−1+brdExtSize, $y_L$=0 . . . sbHeight−1+brdExtSize) inside the prediction luma sample array predSamplesLX, the corresponding prediction luma sample value predSamplesLX[$x_L$][$y_L$] is derived as follows:
    Let ($refxSb_L$, $refySb_L$) and ($refx_L$, $refy_L$) be luma locations pointed to by a motion vector (refMvLX[0], refMvLX[1]) given in 1/16-sample units. The variables $refxSb_L$, $refx_L$, $refySb_L$, and $refy_L$ are derived as follows:

$$refxSb_L = ((xSb \ll 4) + refMvLX[0]) * \text{hori\_scale\_fp} \quad (8-755)$$

$$refx_L = ((\text{Sign}(refxSb) * ((\text{Abs}(refxSb) + 128) \gg 8) + \quad (8-756)$$
$$x_L * ((\text{hori\_scale\_fp} + 8) \gg 4)) + 32) \gg 6$$

$$refySb_L = ((ySb \ll 4) + refMvLX[1]) * \text{vert\_scale\_fp} \quad (8-757)$$

$$refyL = ((\text{Sign}(refySb) * ((\text{Abs}(refySb) + 128) \gg 8) + \quad (8-758)$$
$$yL * ((\text{vert\_scale\_fp} + 8) \gg 4)) + 32) \gg 6$$

The variables $xInt_L$, $yInt_L$, $xFrac_L$ and $yFrac_L$ are derived as follows:

$xInt_L$=$refx_L$>>4  (8-759)

$yInt_L$=$refy_L$>>4  (8-760)

$xFrac_L$=$refx_L$ & 15  (8-761)

$yFrac_L$=$refy_L$ & 15  (8-762)

If bdofFlag is equal to TRUE or (sps_affineprof_enabled_flag is equal to TRUE and inter_affine_flag [xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with ($xInt_L$+($xFrac_L$>>3)−1), $yInt_L$+($yFrac_L$>>3)−1) and refPicLX as inputs.
    $x_L$ is equal to 0.
    $x_L$ is equal to sbWidth+1.
    $y_L$ is equal to 0.
    $y_L$ is equal to sbHeight+1.

Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), ($xSbInt_L$, $ySbInt_L$), refPicLX, hpelIfIdx, sbWidth, sbHeight and (xSb, ySb) as inputs.

Otherwise (cIdx is not equal to 0), the following applies:
  Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
    Let ($refxSb_C$, $refySb_C$) and ($refx_C$, $refy_C$) be chroma locations pointed to by a motion vector (mvLX[0], mvLX[1]) given in 1/32-sample units. The variables $refxSb_C$, $refySb_C$, $refx_C$ and $refy_C$ are derived as follows:

$$refxSb_C = ((xSb/SubWidthC \ll 5) + mvLX[0]) * \text{hori\_scale\_fp} \quad (8-763)$$

$$refx_C = ((\text{Sign}(refxSb_C) * ((\text{Abs}(refxSb_C) + 256) \gg 9) + \quad (8-764)$$
$$xC * ((\text{hori\_scale\_fp} + 8) \gg 4)) + 16) \gg 5$$

$$refySb_C = ((ySb/SubHeightC \ll 5) + mvLX[1]) * \text{vert\_scale\_fp} \quad (8-765)$$

$$refy_C = ((\text{Sign}(refySb_C) * ((\text{Abs}(refySb_C) + 256) \gg 9) + \quad (8-766)$$
$$yC * ((\text{vert\_scale\_fp} + 8) \gg 4)) + 16) \gg 5$$

The variables $xInt_C$, $yInt_C$, $xFrac_C$ and $yFrac_C$ are derived as follows:

$xInt_C$=$refx_C$>>5  (8-767)

$yInt_C$=$refy_C$>>5  (8-768)

$xFrac_C$=$refy_C$ & 31  (8-769)

$yFrac_C$=$refy_C$ & 31  (8-770)

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight and refPicLX as inputs.

8.5.6.3.2 Luma Sample Interpolation Filtering Process
Inputs to this process are:
  a luma location in full-sample units ($xInt_L$, $yInt_L$),
  a luma location in fractional-sample units ($xFrac_L$, $yFrac_L$),
  a luma location in full-sample units ($xSbInt_L$, $ySbInt_L$) specifying the top-left sample of the bounding block for reference sample padding relative to the top-left luma sample of the reference picture,
  the luma reference sample array $refPicLX_L$,
  the half sample interpolation filter index hpelIfIdx, a variable sbWidth specifying the width of the current subblock, a variable sbHeight specifying the height of the current subblock, a luma location (xSb, ySb) specifying the top-left sample of the current subblock relative to the top-left luma sample of the current picture, Output of this process is a predicted luma sample value predSampleLX$_L$ The variables shift1, shift2 and shift3 are derived as follows:

The variable shift1 is set equal to Min(4, BitDepth$_Y$−8), the variable shift2 is set equal to 6 and the variable shift3 is set equal to Max(2, 14−BitDepth$_Y$).

The variable picW is set equal to pic_width_in_luma_samples and the variable picH is set equal to pic_height_in_luma_samples.

The luma interpolation filter coefficients f$_L$[p] for each 1/16 fractional sample position p equal to xFrac$_L$ or yFrac$_L$ are derived as follows:

If MotionModelIdc[xSb][ySb] is greater than 0, and sbWidth and sbHeight are both equal to 4, the luma interpolation filter coefficients f$_L$[p] are specified in Table 2.

Otherwise, the luma interpolation filter coefficients f$_L$[p] are specified in Table 1 depending on hpelIfIdx.

The luma locations in full-sample units (xInt$_i$, yInt$_i$) are derived as follows for i=0 . . . 7:

If subpic_treated_as_pic_flag[SubPicIdx] is equal to 1, the following applies:

xInt$_i$=Clip3(SubPicLeftBoundaryPos,SubPicRight-BoundaryPos,xInt$_L$+i−3)  (8-771)

yInt$_i$=Clip3(SubPicTopBoundaryPos,SubPicBot-BoundaryPos,yInt$_L$+i−3)  (8-772)

Otherwise (subpic_treated_as_pic_flag[SubPicIdx] is equal to 0), the following applies:

xInt$_i$=Clip3(0,picW−1,sps_ref_wraparound_enabled_flag?ClipH((sps_ref_wraparound_offset_minus1+1)*MinCbSizeY,picW,xInt$_L$+i−3):  (8-773)

yInt$_i$=Clip3(0,picH−1,yInt$_L$+i−3)  (8-774)

The luma locations in full-sample units are further modified as follows for i=0 . . . 7:

xInt$_i$=Clip3(xSbInt$_L$−3,xSbInt$_L$+sbWidth+4,xInt$_i$)  (8-775)

yInt$_i$=Clip3(ySbInt$_L$−3,ySbInt$_L$+sbHeight+4,yint$_i$)  (8-776)

The predicted luma sample value predSampleLX$_L$ is derived as follows:

If both xFrac$_L$ and yFrac$_L$ are equal to 0, the value of predSampleLX$_L$ is derived as follows:

predSampleLX$_L$=refPicLX$_L$[xInt$_3$][yInt$_3$]<<shift3  (8-777)

Otherwise, if xFrac$_L$ is not equal to 0 and yFrac$_L$ is equal to 0, the value of predSampleLX$_L$ is derived as follows:

predSampleLX$_L$=($\Sigma_{i=0}^{7}$f$_L$[xFrac$_L$][i]*refPicLX$_L$[xInt$_i$][yInt$_3$])>>shift1  (8-778)

Otherwise, if xFrac$_L$ is equal to 0 and yFrac$_L$ is not equal to 0, the value of predSampleLX$_L$ is derived as follows:

predSampleLX$_L$=($\Sigma_{i=0}^{7}$f$_L$[yFrac$_L$][i]*refPicLX$_L$[xInt$_3$][yInt$_i$])>>shift1  (8-779)

Otherwise, if xFrac$_L$ is not equal to 0 and yFrac$_L$ is not equal to 0, the value of predSampleLX$_L$ is derived as follows:

The sample array temp[n] with n=0 . . . 7, is derived as follows:

temp[n]=($\Sigma_{i=0}^{7}$f$_L$[xFrac$_L$][i]*refPicLX$_L$[xInt$_i$][yInt$_n$])>>shift1  (8-780)

The predicted luma sample value predSampleLX$_L$ is derived as follows:

predSampleLX$_L$=($\Sigma_{i=0}^{7}$f$_L$[xFrac$_L$][i]*temp[i])>>shift2  (8-781)

TABLE 1

Specification of the luma interpolation filter coefficients f$_L$[p] for each 1/16 fractional sample position p.

| Fractional sample position P | interpolation filter coefficients | | | | | | | |
|---|---|---|---|---|---|---|---|---|
| | f$_L$[p][0] | f$_L$[p][1] | f$_L$[p][2] | f$_L$[p][3] | f$_L$[p][4] | f$_L$[p][5] | f$_L$[p][6] | f$_L$[p][7] |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 2

Specification of the luma interpolation filter coefficients $f_L[p]$ for each 1/16 fractional sample position p for affine motion mode.

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

8.5.6.3.3 Luma Integer Sample Fetching Process
Inputs to this process are:
  a luma location in full-sample units ($xInt_L$, $yInt_L$),
  the luma reference sample array $refPicLX_L$,
Output of this process is a predicted luma sample value $predSampleLX_L$
The variable shift is set equal to Max(2, 14-$BitDepth_Y$).
The variable picW is set equal to pic_width_in_luma_samples and the variable picH is set equal to pic_height_in_luma_samples.
The luma locations in full-sample units (xInt, yInt) are derived as follows:

xInt=Clip3(0,picW−1,sps_ref_wraparound_enabled_flag?ClipH((sps_ref_wraparound_minus1+1)*MinCbSizeY,picW,$xInt_L$): $xInt_L$)    (8-782)

yInt=Clip3(0,picH−1,$yInt_L$)    (8-783)

The predicted luma sample value $predSampleLX_L$ is derived as follows:

$predSampleLX_L$=$refPicLX_L$[xInt][yInt]<<shift3    (8-784)

8.5.6.3.4 Chroma Sample Interpolation Process
Inputs to this process are:
  a chroma location in full-sample units ($xInt_C$, $yInt_C$),
  a chroma location in 1/32 fractional-sample units ($xFrac_C$, $yFrac_C$),
  a chroma location in full-sample units (xSbIntC, ySbIntC) specifying the top-left sample of the bounding block for reference sample padding relative to the top-left chroma sample of the reference picture,
  a variable sbWidth specifying the width of the current subblock,
  a variable sbHeight specifying the height of the current subblock,
  the chroma reference sample array $refPicLX_C$.
Output of this process is a predicted chroma sample value $predSampleLX_C$
The variables shift1, shift2 and shift3 are derived as follows:
  The variable shift1 is set equal to Min(4, $BitDepth_C$−8), the variable shift2 is set equal to 6 and the variable shift3 is set equal to Max(2, 14-$BitDepth_C$).
  The variable $picW_C$ is set equal to pic_width_in_luma_samples/SubWidthC and the variable $picH_C$ is set equal to pic_height_in_luma_samples/SubHeightC.

The chroma interpolation filter coefficients $f_C[p]$ for each 1/32 fractional sample position p equal to $xFrac_C$ or $yFrac_C$ are specified in Table 3.
The variable xOffset is set equal to (sps_ref_wraparound_offset_minus1+1)*MinCbSizeY)/SubWidthC.
The chroma locations in full-sample units ($xInt_i$, $yInt_i$) are derived as follows for i=0 . . . 3:
  If subpic_treated_as_pic_flag[SubPicIdx] is equal to 1, the following applies:

$xInt_i$=Clip3(SubPicLeftBoundaryPos/SubWidthC,
  SubPicRightBoundaryPos/SubWidthC,$xInt_L$+i)    (8-785)

$yInt_i$=Clip3(SubPicTopBoundaryPos/SubHeightC,
  SubPicBotBoundaryPos/SubHeightC,$yInt_L$+i)    (8-786)

Otherwise (subpic_treated_as_pic_flag[SubPicIdx] is equal to 0), the following applies:

$xInt_i$=Clip3(0,$picW_C$−1,sps_ref_wraparound_
  enabled_flag?ClipH(xOffset,$picW_C$,$xInt_C$+i−1):    (8-787)

$xInt_C$+i−1)$yInt_i$=Clip3(0,$picH_C$−1,$yInt_C$+i−1)    (8-788)

The chroma locations in full-sample units ($xInt_i$, $yInt_i$) are further modified as follows for i=0 . . . 3:

$xInt_i$=Clip3(xSbIntC−1,xSbIntC+sbWidth+2,$xInt_i$)    (8-789)

$yInt_i$=Clip3(ySbIntC−1,ySbIntC+sbHeight+2,$yInt_i$)    (8-790)

The predicted chroma sample value $predSampleLX_C$ is derived as follows:
  If both $xFrac_C$ and $yFrac_C$ are equal to 0, the value of $predSampleLX_C$ is derived as follows:

$predSampleLX_C$=$refPicLX_C$[$xInt_1$][$yInt_1$]<<shift3    (8-791)

Otherwise, if $xFrac_C$ is not equal to 0 and $yFrac_C$ is equal to 0, the value of $predSampleLX_C$ is derived as follows:

$predSampleLX_C$=($\Sigma_{i=0}^{3}$$f_C$[$xFrac_C$][i]*$refPicLX_C$
  [$xInt_i$][$yInt_1$])>>shift1    (8-792)

Otherwise, if $xFrac_C$ is equal to 0 and $yFrac_C$ is not equal to 0, the value of $predSampleLX_C$ is derived as follows:

$predSampleLX_C$=($\Sigma_{i=0}^{3}$$f_C$[$yFrac_C$][i]*$refPicLX_C$
  [$xInt_1$][$yInt_i$])>>shift1    (8-793)

Otherwise, if xFrac$_C$ is not equal to 0 and yFrac$_C$ is not equal to 0, the value of predSampleLX$_C$ is derived as follows:

The sample array temp[n] with n=0 . . . 3, is derived as follows:

temp[n]=($\Sigma_{i=0}^{3}$f$_C$[xFrac$_C$][i]*refPicLX$_C$[xInt$_i$][yInt$_n$])>>shift1 (8-794)

The predicted chroma sample value predSampleLX$_C$ is derived as follows:

predSampleLX$_C$=(f$_C$[yFrac$_C$][0]*temp[0]+f$_C$[yFrac$_C$][1]*temp[1]+f$_C$[yFrac$_C$][2]*temp[2]+f$_C$[yFrac$_C$][3]*temp[3]+)>>shift2 (8-795)

TABLE 3

Specification of the chroma interpolation filter coefficients f$_C$[p] for each 1/32 fractional sample position p.

| Fractional sample position p | interpolation filter coefficients | | | |
|---|---|---|---|---|
| | f$_C$[p][0] | f$_C$[p][1] | f$_C$[p][2] | f$_C$[p][3] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

2.5. JVET-N0236

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i, j).

Step2) The spatial gradients $g_x(i, j)$ and $g_y(i, j)$ of the sub-block prediction are calculated at each sample location using a 3-tap filter [−1, 0, 1].

$g_x(i,j)=I(i+1,j)-I(i-1,j)$ $g_x(i,j)=I(i,j+1)-I(i,j-1)$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Step 3) The luma prediction refinement (denoted ΔI) as is calculated by the optical flow equation.

$\Delta I(i,j)=g_x(i,j)*\Delta v_x(i,j)+g_y(i,j)*\Delta v_y(i,j)$ where the delta MV (denoted as Δv(i, j)) is the difference between pixel MV computed for sample location (i, j), denoted by v(i, j), and the sub-block MV of the sub-block to which pixel (i, j) belongs, as shown in FIG. 1.

Since the affine model parameters and the pixel location relative to the sub-block center are not changed from sub-block to sub-block, Δv(i, j) can be calculated for the first sub-block, and reused for other sub-blocks in the same CU. Let x and y be the horizontal and vertical offset from the pixel location to the center of the sub-block, Δv(x, y) can be derived by the following equation, $$\begin{cases} \Delta v_x(x, y) = c*x + d*y \\ \Delta v_y(x, y) = e*x + f*y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where ($v_{0x}$, $v_{0y}$), ($v_{1x}$, $v_{1y}$), ($v_{2x}$, $v_{2y}$) are the top-left, top-right and bottom-left control point motion vectors, w and h are the width and height of the CU.

Step 4) Finally, the luma prediction refinement is added to the sub-block prediction I(i, j). The final prediction I' is generated as the following equation.

I'(i,j)=I(i,j)+ΔI(i,j)

Some Details in JVET-N0236 a) How to derive the gradients for PROF

In JVET-N0263, the gradients are calculated for each sub-block (4×4 sub-block in VTM-4.0) for each reference list. For each sub-block, the nearest integer samples of the reference block are fetched to pad the four side outer lines of samples.

Suppose the MV for the current sub-block is (MVx, MVy). Then the fractional part is calculated as (FracX, FracY)=(MVx& 15, MVy& 15). The integer part is calculated as (IntX, IntY)=(MVx>>4, MVy>>4). The offsets (OffsetX, OffsetY) are derived as:

OffsetX=FracX>7?1:0;

OffsetY=FracY>7?1:0;

Suppose the top-left coordinate of the current sub-block is (xCur, yCur) and the dimensions of the current sub-block is W×H.
Then (xCor0, yCor0), (xCor1, yCor1), (xCor2, yCor2) and (xCor3, yCor3) are calculated as (xCor0,yCor0)=(xCur+IntX+OffsetX−1,yCur+IntY+OffsetY−1);

(xCor1,yCor1)=(xCur+IntX+OffsetX−1,yCur+IntY+OffsetY+H);

(xCor2,yCor2)=(xCur+IntX+OffsetX−1,yCur+IntY+OffsetY);

(xCor3,yCor3)=(xCur+IntX+OffsetX+W,yCur+IntY+OffsetY);

Suppose PredSample[x][y] with x=0 . . . W−1, y=0 . . . H−1 stores the prediction samples for the sub-block. Then the padding samples are derived as PredSample[x][−1]=(Ref(xCor0+x,yCor0)<<Shift0)−Rounding, for x=−1 . . . W;

PredSample[x][H]=(Ref(xCor1+x,yCor1)<<Shift0)−Rounding, for x=−1 . . . W;

PredSample[−1][y]=(Ref(xCor2+x,yCor2)<<Shift0)−Rounding, for y=0 . . . H−1;

PredSample[W][y]=(Ref(xCor3,yCor3+y)<<Shift0)−Rounding, for y=0 . . . H−1:

where Rec represents the reference picture. Rounding is an integer, which is equal to $2^{13}$ in the exemplary PROF implementation. Shift0=Max(2, (14−BitDepth));
PROF attempts to increase the precision of the gradients, unlike BIO in VTM-4.0, where the gradients are output with the same precision as input luma samples.
The gradients in PROF are calculated as below:

Shift1=Shift0-4.

gradientH[x][y]=(predSamples[x+1][y]−predSample[x−1][y])>>Shift1 gradientV[x][y]=(predSamples[x][y+1]−predSample[x][y−1])>>Shift1

It should be noted that predSamples[x][y] keeps the precision after interpolation.
b) How to derive Δv for PROF
The derivation of Δv (denoted as dMvH[posX][posY] and dMvV[posX][posY] with posX=0 . . . W−1, posY=0 . . . H−1) can be described as below
Suppose the dimensions of the current block is cbWidth×cbHeight, the number of control point motion vectors is numCpMv, and the control point motion vectors are cpMvLX[cpIdx], with cpIdx=0 . . . numCpMv−1 and X being 0 or 1 representing the two reference lists.
The variables log 2CbW and log 2CbH are derived as follows:

log 2CbW=Log 2(cbWidth)

log 2CbH=Log 2(cbHeight)

The variables mvScaleHor, mvScaleVer, dHorX and dVerX are derived as follows:

mvScaleHor=cpMvLX[0][0]<<7 mvScaleHor=cpMvLX[0][1]<<7 dHorX=(cpMvLX[1][0]−cpMvLX[0][0])<<(7−log 2CbW)

dVerX=(cpMvLX[1][1]−cpMvLX[0][1])<<(7−log 2CbW)

The variables dHorY and dVerY are derived as follows:
If numCpMv is equal to 3, the following applies:

dHorY=(cpMvLX[2][0]−cpMvLX[0][0])<<(7−log 2CbW)

dVerY=(cpMvLX[2][1]−cpMvLX[0][1])<<(7−log 2CbW)

Otherwise (numCpMv is equal to 2), the following applies:

dHorY=−dVerX dVerY=dHorX

The variable qHorX, qVerX, qHorY and qVerY are derived as qHorX=dHorX<<2;

qVerX=dVerX<<2;

qHorY=dHorY<<2;

qVerY=dVerY<<2;

dMvH[0][0] and dMvV[0][0] are calculated as dMvH[0][0]=((dHorX+dHorY)<<1)−((qHorX+qHorY)<<1);

dMvV[0][0]=((dVerX+dVerY)<<1)−((qVerX+qVerY)<<1);

dMvH[xPos][0] and dMvV[xPos][0] for xPos from 1 to W−1 are derived as:

dMvH[xPos][0]=dMvH[xPos−1][0]+qHorX;

dMvV[xPos][0]=dMvV[xPos−1][0]+qVerX;

For yPos from 1 to H−1, the following applies:

dMvH[xPos][yPos]=dMvH[xPos][yPos-1]+qHorY with xPos=0 . . . W−1 dMvV[xPos][yPos]=dMvV[xPos][yPos-1]+qVerY with xPos=0 . . . W−1

Finally, dMvH[xPos][yPos] and dMvV[xPos][yPos] with posX=0 . . . W−1, posY=0 . . . H−1 are right shifted as dMvH[xPos][yPos]=SatShift(dMvH[xPos][yPos],7+2−1);

dMvV[xPos][yPos]=SatShift(dMvV[xPos][yPos],7+2−1);

where SatShift(x, n) and Shift (x,n) is defined as $$SatShift(x, n) = \begin{cases} (x + offset0) >> n & \text{if } x \geq 0 \\ -((-x + offset1) >> n) & \text{if } x < 0 \end{cases}$$

Shift(x, n) = (x + offset0) >> n

In one example, offset0 and/or offset1 are set to $(1<<n)>>1$.

c) How to derive ΔI for PROF

For a position (posX, posY) inside a sub-block, its corresponding Δv(i, j) is denoted as (dMvH[posX][posY], dMvV[posX][posY]). Its corresponding gradients are denoted as (gradientH[posX][posY], gradientV[posX][posY]).

Then ΔI(posX, posY) is derived as follows. (dMvH[posX][posY], dMvV[posX][posY]) are clipped as dMvH[posX][posY]=Clip3(−32768,32767,dMvH[posX][posY]);

dMvV[posX][posY]=Clip3(−32768,32767,dMvV[posX][posY]);

ΔI(posX,posY)=dMvH[posX][posY]×gradientH[posX][posY]+dMvV[posX][posY]×gradientV[posX][posY];

ΔI(posX,posY)=Shift(ΔI(posX,posY),1+1+4);

ΔI(posX,posY)=Clip3(−($2^{13}$−1),$2^{13}$−1,ΔI(posX,posY));

d) How to derive I' for PROF

If the current block is not coded as bi-prediction or weighted-prediction,

I'(posX,posY)=Shift((I(posX,posY)+ΔI(posX,posY)), Shift0),

I'(posX,posY)=Clip Sample(I'(posX,posY)), where Clip Sample clips a sample value to a valid output sample value.

Then I'(posX, posY) is output as the inter-prediction value.

Otherwise (the current block is coded as bi-prediction or weighted-prediction) I'(posX, posY) will be stored and used to generate the inter-prediction value according to other prediction values and/or weighting values.

2.6. Slice Header in JVET-O2001-vE

| slice_header( ) { | Descriptor |
|---|---|
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   non_reference_picture_flag | u(1) |
|   slice_type | ue(v) |
|   if( separate_colour_plane_flag = = 1 ) | |
|     colour_plane_id | u(2) |
|   slice_pic_order_cnt_lsb | u(v) |
|   if( nal_unit_type = = GDR_NUT ) | |
|     recovery_poc_cnt | ue(v) |
|   if( nal_unit_type = = IDR_W_RADL \|\| nal_unit_type = = IDR_N_LP \|\| | |
|     nal_unit_type = = CRA_NUT \|\| NalUnitType = = GDR_NUT ) | |
|     no_output_of_prior_pics_flag | u(1) |
|   if( output_flag_present_flag ) | |
|     pic_output_flag | u(1) |
|   if(( nal_unit_type != IDR_W_RADL && nal_unit_type != IDR_N_LP ) \|\| | |
|     sps_idr_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \|\| (i = = 1 && rpl1_idx_present_flag ) ) ) | |
|         ref_pic_list_sps_flag[ i ] | u(1) |
|       if( ref_pic_list_sps_flag[ i ] ) { | |
|         if( num_ref_pic_lists_in_sps[ i ] > 1 && | |
|           ( i = = 0 \|\| (i = = 1 && rpl1_idx_present_flag ) ) ) | |
|         ref_pic_list_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|     if( ( slice_type != 1 && num_ref_entries[ 0 ][ RplsIdx 0 ] ] > 1 ) \|\| | |
|       ( slice_type = = B && num_ref_entries[ 1 ][ RplsIdx[ 1 ] ] > 1 ) ) { | |
|       num_ref_idx_active_override_flag | u(1) |
|       if( num_ref_idx_active_override_flag ) | |
|         for( i = 0; i < (slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
|     } | |
|   } | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |

```
    if( slice_max_mtt_hierarchy_depth_luma != 0 )
      slice_log2_diff_max_bt_min_qt_luma                                                  ue(v)
      slice_log2_diff_max_tt_min_qt_luma                                                  ue(v)
    }
    if( slice_type = = 1 && qtbtt_dual_tree_intra_flag ) {
      slice_log2_diff_min_qt_min_cb_chroma                                                ue(v)
      slice_max_mtt_hierarchy_depth_chroma                                                ue(v)
      if( slice_max_mtt_hierarchy_depth_chroma != 0 )
      slice_log2_diff_max_bt_min_qt_chroma                                                ue(v)
      slice_log2_diff_max_tt_min_qt_chroma                                                ue(v)
      }
    }
  }
}
if ( slice_type != I ) {
  if( sps_temporal_mvp_enabled_flag && !pps_temporal_mvp_enabled_idc )
    slice_temporal_mvp_enabled_flag                                                       u(1)
  if( slice_type = = B && !pps_mvd_l1_zero_idc )
    mvd_l1_zero_flag                                                                      u(1)
  if( cabac_init_present_flag )
    cabac_init_flag                                                                       u(1)
  if( slice temporal mvp enabled flag ) {
    if( slice type = = B && !pps_collocated_from_l0_idc )
      collocated_from_l0_flag                                                             u(1)
    if( ( collocated_from_l0_flag && NumRefIdxActive[ 0 ] > 1 ) ||
      (! collocated_from_l0_flag && NumRefIdx Active[ 1 ] > 1 ) )
      collocated_ref_idx                                                                  ue(v)
  }
  if( (pps_weighted_pred_flag && slice_type = = P ) ||
    (pps_weighted_bipred_flag && slice_type = = B ) )
    pred_weight_table( )
  if( !pps_six_minus_max_num_merge_cand_plus1 )
    six_minus_max_num_merge_cand                                                          ue(v)
  if( sps_affine_enabled_flag &&
    !pps_five_minus_max_num_subblock_merge_cand_plus1 )
    [Ed. (YK): There is a syntax element name subsetting issue here.]
    five_minus_max_num_subblock_merge_cand                                                ue(v)
  if( sps_fpel_mmvd_enabled_flag )
    slice_fpel_mmvd_enabled_flag                                                          u(1)
  if( sps_bdof_dmvr_slice_present_flag )
    slice_disable_bdof_dmvr_flag                                                          u(1)
  if( sps_triangle_enabled_flag && MaxNumMergeCand  >=  2  &&
    ! pps_max_num_merge_cand_minus_max_num_triangle_cand_minus1    )
    [Ed. (YK): There is a syntax element name subsetting issue here.]
    max_num_merge_cand_minus_max_num_triangle_cand                                        ue(v)
}
if (sps_ibc_enabled_flag)
  slice_six_minus_max_num_ibc_merge_cand                                                  ue(v)
if( sps_joint_cber_enabled_flag )
  slice_joint_cbcr_sign_flag                                                              u(1)
slice_qp_delta                                                                            se(v)
if( pps_slice_chroma_qp_offsets_present_flag ) {
  slice_cb_qp_offset                                                                      se(v)
  slice_cr_qp_offset                                                                      se(v)
  if( sp_sjoint_cbcr_enabled_flag )
    slice_joint_cb_crq_poffset                                                            se(v)
}
if( sps_sao_enabled_flag ) {
  slice_sao_luma_flag                                                                     u(1)
  if( ChromaArrayType != 0 )
    slice_sao_chroma_flag                                                                 u(1)
}
if( sps_alf_enabled_flag ) {
  slice_alf_enabled_flag                                                                  u(1)
  if( slice_alf_enabled_flag ) {
    slice_num_alf_aps_ids_luma                                                            u(3)
    for( i = 0; i < slice_num_alf_aps_ids_luma; i++ )
      slice_alf_aps_id_luma[ i ]                                                          u(3)
    if( ChromaArrayType != 0 )
      slice_alf_chroma_idc                                                                u(2)
    if( slice_alf_chroma_idc )
      slice_alf_aps_id_chroma                                                             u(3)
  }
}
if           (             !pps_dep_quant_enabled_flag )
  [Ed. (YK): There is a syntax element name subsetting issue here.]
  dep_quant_enabled_flag                                                                  u(1)
```

| | |
|---|---|
| -continued | |
| if( !dep_quant_enabled_flag ) | |
|   sign_data_hiding_enabled_flag | u(1) |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( sps_lmcs_enabled_flag ) { | |
|   slice_lmcs_enabled_flag | u(1) |
|   if( slice_lmcs_enabled_flag ) { | |
|     slice_lmcs_aps_id | u(2) |
|     if( ChromaArrayType != 0 ) | |
|       slice_chroma_residual_scale_flag | u(1) |
|   } | |
| } | |
| if( sps_scaling_list_enabled_flag ) { | |
|   slice_scaling_list_present_flag | u(1) |
|   if( slice_scaling_list_present_flag ) | |
|     slice_scaling_list_aps_id | u(3) |
| } | |
| if( entry _point_offsets_present_flag && NumEntryPoints > 0 ) { | |
|   offset_len_minus 1 | ue(v) |
|   for( i = 0; i < NumEntryPoints; i++ ) | |
|     entry_point_offset_minus1[ i ] | u(v) |
| } | |
| if( slice_header_extension_present_flag ) { | |
|   slice_header_extension_length | ue(v) |
|   for( i = 0; i < slice_header_extension_length; i++ ) | |
|     slice_header_extension_data_byte[ i ] | u(8) |
| } | |
| byte_alignment( ) | |
| } | |

2.7. Sequence Parameter Set in JVET-O2001-vE

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   min_qp_prime_ts_minus4 | ue(v) |
|   log2_max_pic_order_cnt_lsb_minus4 | ue(v) |
|   if( sps_max_sub_layers_minus1 > 0 ) | |
|     sps_sub_layer_ordering+info present flag | u(1) |
|   for( i = ( sps_sub_layer_ordering_info_present_flag ? 0 : sps_max_sub_layers_minus1 ); | |

| | |
|---|---|
| i <= sps_max_sub_layers_minus1; i++ ) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++ ) | |
|     ref_pic_list_struct( i, j ) | |
| } | |
| if( ChromaArrayType != 0 ) | |
|   qtbtt_dual_tree_intra_flag | u(1) |
| log2_ctu_size_minus5 | u(2) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if(sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if(sps_max_mtt_hierarchy_depth_inter_slices != 0 ){ | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag) { | |
|   sps_log2_diff_min_qt_min_cb_intra_slice_chroma | ue(v) |
|   sps_max_mtt_hierarchy_depth_intra_slice_chroma | ue(v) |
|   if (sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1 [ i ]; j++ ) { | |
|       delta_qp_in_val_minus1[ i ][ j ] | ue(v) |
|       delta_qp_out_val[ i ] [ j ] | ue(v) |
|     } | |
|   } | |
| } | |
| sps_weighted_pred_flag | u(1) |
| sps_weighted_bipred_flag | u(1) |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| sps_joint_cbcr_enabled_flag | u(1) |
| sps_ref_wraparound_enabled_flag | u(1) |
| if( sps_ref wraparound_enabled_flag) | |
|   sps_ref_wraparound_offset_minus1 | ue(v) |
| sps_temporal_mvp_enabled_flag | u(1) |
| if( sps_temporal_mvp_enabled_flag ) | |
|   sps_sbtmvp_enabled_flag | u(1) |
| spsamvr_enabled_flag | u(1) |
| sps_bdof_enabled_flag | u(1) |
| sps_smvd_enabled_flag | u(1) |
| sps_dmvr_enabled_flag | u(1) |
| if( sps_bdof_enabled_flag sps_dmvr_enabled_flag) | |
|   sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |

| | |
|---|---|
| if( ChromaArrayType != 0 ) | |
|   sps_cclm_enabled_flag | u(1) |
|   if( sps_cclm_enabled_flag && chroma_format_idc = = 1 ) [Ed. (JC): should sps_cclm_colocated_chroma_flag also be signalled for 422 case since it's used in the decoding process, to be confirmed] | |
|     sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
| } | |
| if( chroma_format_idc = = 3 ) | |
|   sps_palette_enabled_flag | u(1) |
| sps_bcw_enabled_flag | u(1) |
| sps_ibc_enabled_flag | u(1) |
| sps_ciip_enabled_flag | u(1) |
| if( sps_mmvd_enabled_flagm) | |
|   sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if (sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_scaling_list_enabled_flag | u(1) |
| hrd_parameters_present_flag | u(1) |
| if( general_hrd_parameters_present_flag ) { | |
|   num_units_in_tick | u(32) |
|   time_scale | u(32) |
|   sub_layer_cpb_parameters_present_flag | u(1) |
|   if( sub_layer_cpb_parameters_present_flag ) | |
|     general_hrd_parameters( 0, sps_max_sub_layers_minus1 ) | |
|   else | |
|   general_hrd_parameters( sps_max_sub_layers_minus1, sps_max_sub_layers_minus1 ) | |
| } | |
| vui_parameters_present_flag | u(1) |
| if( vui_parameters_present_flag) | |
|   vui_parameters( ) | |
| sps_extension_flag | u(1) |
| if( sps_extension_flag) | |
|   while( more_rbsp_data( ) ) | |
|     sps_extension_data_flag | u(1) |
| rbsp_trailing_bits( ) | |
| } | |

2.8 Picture Parameter Set in JVET-O2001-vE

| | Descriptor |
|---|---|
| pic_parameter_set_rbsp( ) { | |
|   pps_pic_parameter_set_id | ue(v) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |

```
-continued output_flag_present_flag                                                              u(1)
single_tile_in_pic_flag                                                               u(1)
if( !single_tile_in_pic_flag ) {
    uniform_tile_spacing_flag                                                         u(1)
    if( uniform_tile_spacing_flag ) {
        tile_cols_width_minus1                                                        ue(v)
        tile_rows_height_minus1                                                       ue(v)
    } else {
        num_tile_columns_minus1                                                       ue(v)
        num_tile_rows_minus1                                                          ue(v)
        for( i = 0; i < num_tile_columns_minus1; i++ )
            tile_column_width_ininusl[ i ]                                            ue(v)
        for( i = 0; i < num_tile_rows_minus1; i++ )
            tile_row_height_minus1[ i ]                                               ue(v)
    }
    brick_splitting_present_flag                                                      u(1)
    if( uniform_tile_spacing_flag && brick_splitting_present_flag )
        num_tiles_in_pic_minus1                                                       ue(v)
    for( i = 0; brick_splitting_present_flag && i <= num_tiles_in_pic_minus1 + 1;
1++) {
        if( RowHeight[ i ] > 1 )
            brick_split_flag[ i ]                                                     u(1)
        if( brick_split_flag[ i ] ) {
            if( RowHeight[ i ] > 2 )
                uniform_brick_spacing_flag[ i ]                                       u(1)
            if( uniform_brick_spacing_flag[ i ] )
                brick_height_minus1[ i ]                                              ue(v)
            else {
                num_brick_rows_minus2[ i ]                                            ue(v)
                for( j = 0; j <= num_brick_rows_minus2[ i ]; j++ )
                    brick_row_height_minus1[ i ][ j ]                                 ue(v)
            }
        }
    }
    single brick per slice flag                                                       u(1)
    if( !single_brick_per_slice_flag)
    rectsliceflag                                                                     u(1)
    if(rect_slice_flag && !single_brick_per_slice_flag ) {
        num_slices_in_pic_minus1                                                      ue(v)
        bottom_right_brick_idx_length_minus1                                          ue(v)
        for( i = 0; i < num_slices_in_pic_minus1; i++ ) {
            bottom_right_brick_idx_delta[ i ]                                         u(v)
            brick_idx_delta_sign_flag[ i ]                                            u(1)
        }
    }
    loop_filter_across_bricks_enabled_flag                                            u(1)
    if( loop_filter_across_bricks_enabled_flag )
        loop_filter_across_slices_enabled_flag                                        u(1)
}
if( rect_slice_flag ) {
    signalled_slice_id_flag                                                           u(1)
    if( signalled_slice_id_flag ) {
        signalled_slice_id_length_minus1                                              ue(v)
        for(i = 0;i <= num_slices_in_pic_minus1; i++ )
            slice_id[ i ]                                                             u(v)
    }
}
entropy_coding_sync_enable_flag                                                       u(1)
if( !single_tile_in_pic_flag || entropy_coding_sync_enabled_flag)
    entry_point_offsets_present_flag                                                  u(1)
cabac_init_present_flag                                                               u(1)
for( i = 0; i < 2; i++ )
    num_ref_idx_default_active_minus1[ i ]                                            ue(v)
rpl1_idx_present_flag                                                                 u(1)
init_qp_minus26                                                                       se(v)
if( sps_transform_skip_enabled_flag )
    log2_transform_skip_max_size_minus2                                               ue(v)
cu_qp_delta_enabled_flag                                                              u(1)
if( cu_qp_delta_enabled_flag )
    cu_qp_delta_sub_div                                                               ue(v)
pps_cb_qp_offset                                                                      se(v)
pps_cr_qp_offset                                                                      se(v)
pps_joint_cbcr_qp_offset                                                              se(v)
pps_slice_chroma_qp_offsets_present_flag                                              u(1)
cu_chroma_qp_offset_enabled_flag                                                      u(1)
if( cu_chroma_qp_offset_enabled_flag ) {
    cu_chroma_qp_offset_subdiv                                                        ue(v)
    chroma_qp_offset_list_len_minus 1                                                 ue(v)
```

```
for( i = 0; i <= chroma_qp_offset_list_len_minus1; i++ ) {
   cb_qp_offset_list[ i ]                                                    se(v)
   cr_qp_offset_list[ i ]                                                    se(v)
   joint_cbcr_qp_offset_list[ i ]                                            se(v)
  }
}
pps_weighted_pred_flag                                                       u(1)
pps_weighted_bipred_flag                                                     u(1)
deblocking_filter_control_present_flag                                       u(1)
if( deblocking_filter_control_present_flag ) {
   deblocking_filter_override_enabled_flag                                   u(1)
   pps_deblocking_filter_disabled_flag                                       u(1)
   if( !pps_deblocking_filter_disabled_flag ) {
      pps_beta_offset_div2                                                   se(v)
      pps_tc_offset_div2                                                     se(v)
   }
}
constant_slice_header_params_enabled_flag                                    u(1)
if( constant_slice_header_params_enabled_flag ) {
   pps_dep_quant_enabled_idc                                                 u(2)
   for( i = 0; i < 2; i++ )
      pps_ref_pic_list_sps_idc[ i ]                                          u(2)
   pps_temporal_mvp_enabled_idc                                              u(2)
   pps_mvdl1_zero_idc                                                        u(2)
   pps_collocated_from_l0_idc                                                u(2)
   pps_six_minus_max_num_merge_cand_plus1                                    ue(v)
   pps_five_minus_max_num_subblock_merge_cand_plus1                          ue(v)
   pps_max_num_merge_cand_minus_max_num_triangle_cand_minus1                 ue(v)
}
pps_loop_filter_across_virtual_boundaries_disabled_flag                      u(1)
if( pps_loop_filter_across_virtual_boundaries_disabled_flag ) {
   pps_num_ver_virtual_boundaries                                            u(2)
   for( i = 0; i < pps_num_ver_virtual_boundaries; i++ )
      pps_virtual_boundaries_pos_x[ i ]                                      u(13)
   pps_num_hor_virtual_boundaries                                            u(2)
   for( i = 0; i < pps_num_hor_virtual_boundaries; i++ )
      pps_virtual_boundaries_pos_y[ i ]                                      u(13)
}
slice_ header_extension_present_flag                                         u(1)
pps_extension_flag                                                           u(1)
if( pps_extension_flag)
   while( more_rbsp_data( ) )
      pps_extension_data_flag                                                u(1)
rbsp_trailing_bits( )
}
```

2.9. Adaptive Parameter Set in JVET-O2001-vE

```
adaptation_parameter_set_rbsp( ) {                                           Descriptor
   adaptation_parameter_set_id                                               u(5)
   aps_params_type                                                           u(3)
   if( aps_params_type = = ALF_APS )
      alf_data( )
   else if( aps_params_type = = LMCS_APS )
      lmcs_data( )
   else if( aps_params_type = = SCALING_APS )
      scaling_list_data( )
   aps_extension_flag                                                        u(1)
   if( aps_extension_flag)
      while( more_rbsp_data( ))
         aps_extension_data_flag                                             u(1)
   rbsp_trailing_bits( )
}
alf_data( ) {                                                                Descriptor
   alf_luma_filter_signal_flag                                               u(1)
   alf_chroma_filter_signal_flag                                             u(1)
   if( alf_luma_filter_signal_flag) {
      alf_luma_clip_flag                                                     u(1)
      alf_luma_num_filters_signalled_minus1                                  ue(v)
      if( alf_luma_num_filters_signalled_minus1 > 0 ) {
         for( filtIdx = 0; filtidx < NumAlfFilters; filtIdx++ )
            alf_luma_coeff_delta_idx[ filtIdx ]                              u(v)
      }
```

```
  alf_luma_coeff_signalled_flag                                              u(1)
     if( alf_luma_coeff_signalled_flag) {
        for( sfIdx = 0; sfidx <= alf_luma_num_filters_signalled_minus1; sfIdx++ )
           alf_luma_coeff_flag[ sfIdx ]                                      u(1)
     }
     for( sfidx = 0; sfidx <= alf_luma_num_filters_signalled_minus1; sfIdx++ ) {
        if( alf_luma_coeff_flag[ sfIdx ]) {
           for( j = 0; j < 12;j++ )
              alf_luma_coeff_abs[ sfIdx ] [ j ]                              uek(v)
              if( alf_luma_coeff_abs[ sfIdx ] [ j ] )
                 alf_luma_coeff_sign[ sfIdx ] [ j ]                          u(1)
           }
        }
     }
     if( alf luma clip flag) {
        for( sfIdx = 0; sfIdx <= alf_luma_num_filters_signalled_minus1; sfIdx++ )
{
           if( alf_luma_coeff_flag[ sfIdx ]) {
              for(j = 0; j < 12; j++ )
                 alf_luma_clip_idx[ sfIdx ] [ j ]                            u(2)
              }
           }
        }
     }
     if( alf_chroma_filter_signal_flag ) {
        alf_chroma_num_alt_filters_minus1                                    ue(v)
           for( altIdx = 0; altIdx <= alf_chroma_num_alt_filters_minus1; altIdx++ ) {
              alf_chroma_clip_flag[ altIdx ]                                 u(1)
              for(j = 0;j <6;j++) {
                 alf_chroma_coeff_abs[ altIdx ] [ j ]                        uek(v)
                 if( alf_chroma_coeff_abs[ altIdx ][ j ] > 0 )
                    alf_chroma_coeff_sign[ altIdx ] [ j ]                    u(1)
              }
              if( alf_chroma_clip_flag[ altIdx ] ) {
                 for(j = 0; j < 6;j++ )
                    alf_chroma_clip_idx[ altIdx ] [ j ]                      u(2)
              }
           }
        }
     }
}
lmcs_data( ) {                                                               Descriptor
  lmcs_min_bin_idx                                                           ue(v)
  lmcs_delta_max_bin_idx                                                     ue(v)
  lmcs_delta_cw_prec_minus1                                                  ue(v)
  for ( i = lmcs min bin idx; i <= LmcsMaxBinIdx; i++ ) {
     lmcs_delta_abs_cw[ i ]                                                  u(v)
     if (lmcs_delta_abs_cw[ i ] ) > 0 )
        lmcs_delta_sign_cw_flag[ i ]                                         u( )
  }
}
scaling_list_data( ) {
  for( sizeId = 1; sizeId < 7; sizeId++ )
     for( matrixId = 0; matrixId < 6; matrixId ++ ) {
        if(! ( ( ( sizeId = = 1 ) && ( matrixId % 3 = = 0 ) )
           ( ( sizeId = = 6 ) && ( matrixId % 3 != 0 ) ) ) ) {
           scaling_list_pred_mode_flag sizeId ][ matrixId ]                  u(1)
           if(! scaling_list_pred_mode_flag[ sizeId ] [ matrixId ] )
              scaling_list_pred_matrix_id_delta[ sizeId ] [ matrixId ]       ue(v)
           else {
              nextCoef = 8
              coefNum = Min( 64, ( 1 << ( sizeId << 1 ) ) )
              if( sizeId > 3 ) {
                 scaling_list_dc_coef_minus8[ sizeId − 4 ][ matrixId]        se(v)
                 nextCoef =
scaling_list_dc_coef_minus8[ sizeId − 4 ] [ matrixId ] + 8
              }
              for( i = 0; i < coefNum; i++ ) {
                 x = DiagScanOrder[ 3 ] [ 3 ] [ i ] [ 0 ]
                 y = DiagScanOrder[ 3 ] [ 3 ] [ i ] [ 1 ]
```

```
            if (! ( sizeId = = 6 && x >= 4 && y >= 4 ) ) {
                scaling_list_delta_coef                                            se(v)
                nextCoef = ( nextCoef + scaling_list_delta_coef + 256 ) % 256
                ScalingList[ sizeId ] [ matrixId ] [ i ] = nextCoef
            }
        }
    }
  }
 }
 }
}
```

2.10. Picture Header Proposed in VVC

Picture header is proposed to VVC in JVET-P0120 and JVET-P0239.

In JVET-P0120, The picture header is designed to have the following properties:
1. Temporal Id and layer Id of picture header NAL unit are the same as temporal Id and layer Id of layer access unit that contains the picture header.
2. Picture header NAL unit shall precede NAL unit containing the first slice of its associated picture. This established the association between a picture header and slices of picture associated with the picture header without the need of having picture header Id signalled in picture header and referred to from slice header.
3. Picture header NAL unit shall follow picture level parameter sets or higher level such as DPS, VPS, SPS, PPS, etc. This consequently requires those parameter sets to be not repeated/present within a picture or within an access unit.
4. Picture header contains information about picture type of its associated picture. The picture type may be used to define the following (not an exhaustive list)
   a. The picture is an IDR picture
   b. The picture is a CRA picture
   c. The picture is a GDR picture
   d. The picture is a non-IRAP, non-GDR picture and contains I-slices only
   e. The picture is a non-IRAP, non-GDR picture and may contain P- and I-slices only
   f. The picture is a non-IRAP, non-GDR picture and contains any of B-, P-, and/or I-slices
5. Move signalling of picture level syntax elements in slice header to picture header.
6. Signal non-picture level syntax elements in slice header that are typically the same for all slices of the same picture in picture header. When those syntax elements are not present in picture header, they may be signalled in slice header.

In JVET-P0239, a mandatory picture header concept is proposed to be transmitted once per picture as the first VCL NAL unit of a picture. It is also proposed to move syntax elements currently in the slice header to this picture header. Syntax elements that functionally only need to be transmitted once per picture could be moved to the picture header instead of being transmitted multiple times for a given picture, e.g., syntax elements in the slice header are transmitted once per slice. The authors claim there is a benefit to moving syntax elements from the slice header as the computation required for slice header processing can be a limiting factor to overall throughput.

Moving slice header syntax elements constrained to be the same within a picture

The syntax elements in this section are already constrained to be the same in all slices of a picture. It is asserted that moving these fields to the picture header so they are signalled only once per picture instead of once per slice avoids unnecessary redundant transmission of bits without any change to the functionality of these syntax elements.
1. In section 7.4.7.1 of the current draft JVET-O2001-vE, there is the following semantic constraint:
   When present, the value of each of the slice header syntax elementsslice_pic_parameter_set_id, non_reference_picture_flag, colour_plane_id, slice_pic_order_cnt_lsb, recovery_poc_cnt, no_output_of_prior_pics_flag, pic_output_flag, andslice_temporal_mvp_enabled_flag shall be the same in all slice headers of a coded picture.
   Thus each of these syntax elements could be moved to the picture header to avoid unnecessary redundant bits.
   The recovery_poc_cnt and no_output_of_prior_pics_flag are not moved to the picture header in this contribution. Their presence in the slice header is dependent on a conditional check of the slice header nal_unit_type, so they are suggested to be studied if there is a desire to move these syntax elements to the picture header.
2. In section 7.4.7.1 of the current draft JVET-O2001-vE, there are the following semantic constraints:
   When present, the value of slice_lmcs_aps_id shall be the same for all slices of a picture.
   When present, the value of slice_scaling_list_aps_id shall be the same for all slices of a picture. Thus each of these syntax elements could be moved to the picture header to avoid unnecessary redundant bits.

Moving Slice Header Syntax Elements Not Constrained to be the Same Within a Picture The syntax elements in this section are not currently constrained to be the same in all slices of a picture. It is suggested to assess the anticipated usage of these syntax elements to determine which can be moved into the picture header to simplify the overall VVC design as it is claimed there is a complexity impact to processing a large number of syntax elements in every slice header.
1. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. six_minus_max_num_merge_cand
   b. five_minus_max_num_subblock_merge_cand
   c. slice_fpel_mmvd_enabled_flag
   d. slice_disable_bdof_dmvr_flag
   e. max_num_merge_cand_minus_max_num_triangle_cand
   f. slice_six_minus_max_num_ibc_merge_cand 2. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. partition_constraints_override_flag
   b. slice_log 2_diff_min_qt_min_cb_luma
   c. slice_max_mtt_hierarchy_depth_luma
   d. slice_log 2_diff_max_bt_min_cb_luma
   e. slice_log 2_diff_max_tt_min_qt_luma
   f. slice_log 2_diff_min_qt_min_cb_chroma
   g. slice_max_mtt_hierarchy_depth_chroma
   h. slice_log 2_diff_max_bt_min_qt_chroma
   i. slice_log 2_diff_max_tt_min_qt_chroma The conditional check "slice_type=I" associated with some of these syntax elements has been removed with the move to the picture header.

3. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. mvd_l1_zero_flag The conditional check "slice_type=B" associated with some of these syntax elements has been removed with the move to the picture header.

4. The following syntax elements are proposed to be moved to the picture header. There are currently no restrictions on them having different values for different slices but it is claimed there is no/minimal benefit and coding loss to transmitting them in every slice header as their anticipated usage would change at the picture level:
   a. dep_quant_enabled_flag
sign_data_hiding_enabled_flag

2.10.1. Syntax Tables Defined in JVET-P1006

7.3.2.8 Picture Header RBSP Syntax

| picture_header_rbsp( ) { | Descriptor |
|---|---|
| non_reference_picture_flag | u(1) |
| gdr_pic_flag | u(1) |
| no_output_of_prior_pics_flag | u(1) |
| if( gdr_pic_flag ) | |
|   recovery_poc_cnt | ue(v) |
| ph_pic_parameter_set_id | ue(v) |
| if( sps_subpic_id_present_flag && | |
| !sps_subpic_id_signalling_flag ) { | |
|   ph_subpic_id_signalling_present_flag | u(1) |
|   if( ph_subpics_id_ | |
| signalling_present_flag ) { | |
|     ph_subpic_id_len_minus1 | ue(v) |
|     for( i = 0; i < NumSubPics; i++ ) | |
|       ph_subpic_id[ i ] | u(v) |
|   } | |
| } | |
| if( !sps_loop_filter_across_virtual_ | |
| boundaries_disabled_present_flag ) { | |
|   ph_loop_filter_across_virtual_ boundaries_disabled_present_flag | u(1) |
|   if( ph_loop_filter_across_virtual_ boundaries_disabled_present_flag ) { | |
|     ph_num_ver_virtual_boundaries | u(2) |
|     for( i = 0; i < ph_num_ver_ virtual_boundaries; i++ ) | |
|       ph_virtual_boundaries_pos_x[ i ] | u(13) |
|     ph_num_hor_virtual_boundaries | u(2) |
|     for( i = 0; i < ph_num_ hor_virtual_boundaries; i++ ) | |
|       ph_virtual_boundaries_pos_y[ i ] | u(13) |
|   } | |
| } | |
| if( separate_colour_plane_flag = = 1 ) | |
|   colour_plane_id | u(2) |
| if( output_flag_present_flag ) | |
|   pic_output_flag | u(1) |
| pic_rpl_present_flag | u(1) |
| if( pic_rpl_present_flag ) { | |
|   for( i = 0; i < 2; i++ ) { | |
|     if( num_ref_pic_lists_in_sps [ i ] > 0 && | |
| !pps_ref_pic_list_sps_idc[ i ] && | |
| ( i = = 0 | | ( i = = 1 && | |
| rpl1_idx_present_flag ) ) ) | |
|       pic_rpl_sps_flag[ i ] | u(1) |
|     if( pic_rpl_sps_flag[ i ] ) { | |
|       if( num_ref_pic_lists_ in_sps[ i ] > 1 && | |
| ( i = = 0 | | ( i = = 1 && | |
| rpl1_idx_present_flag ) ) ) | |
|         pic_rpl_idx[ i ] | u(v) |
|     } else | |
|       ref_pic_list_struct( i, num_ ref_pic_lists_in_sps[ i ] ) | |
|     for( j = 0; j < NumLtrpEntries [ i ][ RplsIdx[ i ] ]; j++ ) { | |
|       if( ltrp_in_slice_header_ flag[ i ][ RplsIdx[ i ] ] ) | |
|         pic_poc_lsb_lt[ i ][ j ] | u(v) |
|       pic_delta_poc_msb_ present_flag[ i ][ j ] | u(1) |
|       if( pic_delta_poc_ msb_present_flag[ i ][ j ] ) | |
|         pic_delta_poc_ msb_cycle_lt[ i ][ j ] | ue(v) |
|     } | |
|   } | |
| } | |
| if( partition_constraints_ override_enabled_flag ) { | |
|   partition_constraints_override_flag | ue(v) |
|   if( partition_constraints_ override_flag ) { | |
|     pic_log2_diff_min_qt_ min_cb_intra_slice_luma | ue(v) |
|     pic_log2_diff_min_qt_ min_cb_inter_slice | ue(v) |
|     pic_max_mtt_hierarchy_ depth_inter_slice | ue(v) |
|     pic_max_mtt_hierarchy_ depth_intra_slice_luma | ue(v) |
|     if( pic_max_mtt_hierarchy_ depth_intra_slice_luma != 0 ) { | |
|       pic_log2_diff_max_bt_ min_qt_intra_slice_luma | ue(v) |
|       pic_log2_diff_max_tt_ min_qt_intra_slice_luma | ue(v) |
|     } | |
|     if( pic_max_mtt_hierarchy_ depth_inter_slice != 0 ) { | |
|       pic_log2_diff_max_ bt_min_qt_inter_slice | ue(v) |
|       pic_log2_diff_max_ tt_min_qt_inter_slice | ue(v) |
|     } | |
|     if( qtbtt_dual_tree_intra_flag ) { | |
|       pic_log2_diff_min_qt_min_ cb_intra_slice_chroma | ue(v) |
|       pic_max_mtt_hierarchy_ depth_intra_slice_chroma | |
|       if( pic_max_mtt_hierarchy_ depth_intra_slice_chroma != 0 ) { | |
|         pic_log2_diff_max_bt_ min_qt_intra_slice_chroma | ue(v) |

```
picture_header_rbsp( ) {                                 Descriptor
    pic_log2_diff_max_tt_                                ue(v)
      min_qt_intra_slice_chroma
    }
  }
 }
}
if( cu_qp_delta_enabled_flag ) {
  pic_cu_qp_delta_subdiv_intra_slice                     ue(v)
  pic_cu_qp_delta_subdiv_inter_slice                     ue(v)
}
if( cu_chroma_qp_offset_
  enabled_flag ) {
  pic_cu_chroma_qp_                                      ue(v)
    offset_subdiv_intra_slice
  pic_cu_chroma_qp_                                      ue(v)
    offset_subdiv_inter_slice
}
if( sps_temporal_mvp_enabled_flag &&
  !pps_temporal_mvp_enabled_idc )
  pic_temporal_mvp_enabled_flag                          u(1)
if(!pps_mvd_l1_zero_idc )
  mvd_l1_zero_flag                                       u(1)
if( !pps_six_minus_max_
  num_merge_cand_plus1 )
  pic_six_minus_max_num_merge_cand                       ue(v)
if( sps_affine_enabled_flag &&
  !pps_five_minus_max_num_
  subblock_merge_cand_plus1 )
  pic_five_minus_max_num_                                ue(v)
    subblock_merge_cand
if( sps_fpel_mmvd_enabled_flag )
  pic_fpel_mmvd_enabled_flag                             u(1)
if( sps_bdof_dmvr_slice_present_flag )
  pic_disable_bdof_dmvr_flag                             u(1)
if( sps_triangle_enabled_flag &&
MaxNumMergeCand >= 2 &&
  !pps_max_num_merge_cand_minus_
  max_num_triangle_cand_minus1 )
  pic_max_num_merge_cand_                                ue(v)
    minus_max_num_triangle_cand
if ( sps_ibc_enabled_flag )
  pic_six_minus_max_                                     ue(v)
    num_ibc_merge_cand
if( sps_joint_cbcr_enabled_flag )
  pic_joint_cbcr_sign_flag                               u(1)
if( sps_sao_enabled_flag ) {
  pic_sao_enabled_present_flag                           u(1)
  if( pic_sao_enabled_present_flag ) {
    pic_sao_luma_enabled_flag                            u(1)
    if(ChromaArrayType != 0 )
      pic_sao_chroma_enabled_flag                        u(1)
  }
}
if( sps_alf_enabled_flag ) {
  pic_alf_enabled_present_flag                           u(1)
  if( pic_alf_enabled_present_flag ) {
    pic_alf_enabled_flag                                 u(1)
    if( pic_alf_enabled_flag ) {
      pic_num_alf_aps_ids_luma                           u(3)
      for( i = 0; i < pic_num_
        alf_aps_ids_luma; i++ )
        pic_alf_aps_id_luma[ i ]                         u(3)
      if( ChromaArrayType != 0 )
        pic_alf_chroma_idc                               u(2)
      if( pic_alf_chroma_idc )
        pic_alf_aps_id_chroma                            u(3)
    }
  }
}
if ( !pps_dep_quant_enabled_flag )
  pic_dep_quant_enabled_flag                             u(1)
if( !pic_dep_quant_enabled_flag )
  sign_data_hiding_enabled_flag                          u(1)
if( deblocking_filter_
  override_enabled_flag ) {
  pic_deblocking_filter_                                 u(1)
    override_present_flag
```

```
picture_header_rbsp( ) {                                 Descriptor
  if( pic_deblocking_filter_
    override_present_flag ) {
    pic_deblocking_filter_override_flag                  u(1)
    if( pic_deblocking_filter_
      override_flag ) {
      pic_deblocking_filter_disabled_flag                u(1)
      if( !pic_deblocking_
        filter_disabled_flag ) {
        pic_beta_offset_div2                             se(v)
        pic_tc_offset_div2                               se(v)
      }
    }
  }
}
if( sps_lmcs_enabled_flag ) {
  pic_lmcs_enabled_flag                                  u(1)
  if( pic_lmcs_enabled_flag ) {
    pic_lmcs_aps_id                                      u(2)
    if( ChromaArrayType != 0 )
      pic_chroma_residual_scale_flag                     u(1)
  }
}
if( sps_scaling_list_enabled_flag ) {
  pic_scaling_list_present_flag                          u(1)
  if( pic_scaling_list_present_flag )
    pic_scaling_list_aps_id                              u(3)
}
if( picture_header_
  extension_present_flag ) {
  ph_extension_length                                    ue(v)
  for( i = 0; i < ph_
    extension_length; i++)
    ph_extension_data_byte[ i ]                          u(8)
}
rbsp_trailing_bits( )
}
```

2.11. DMVR in VVC draft 6

Figure 5:
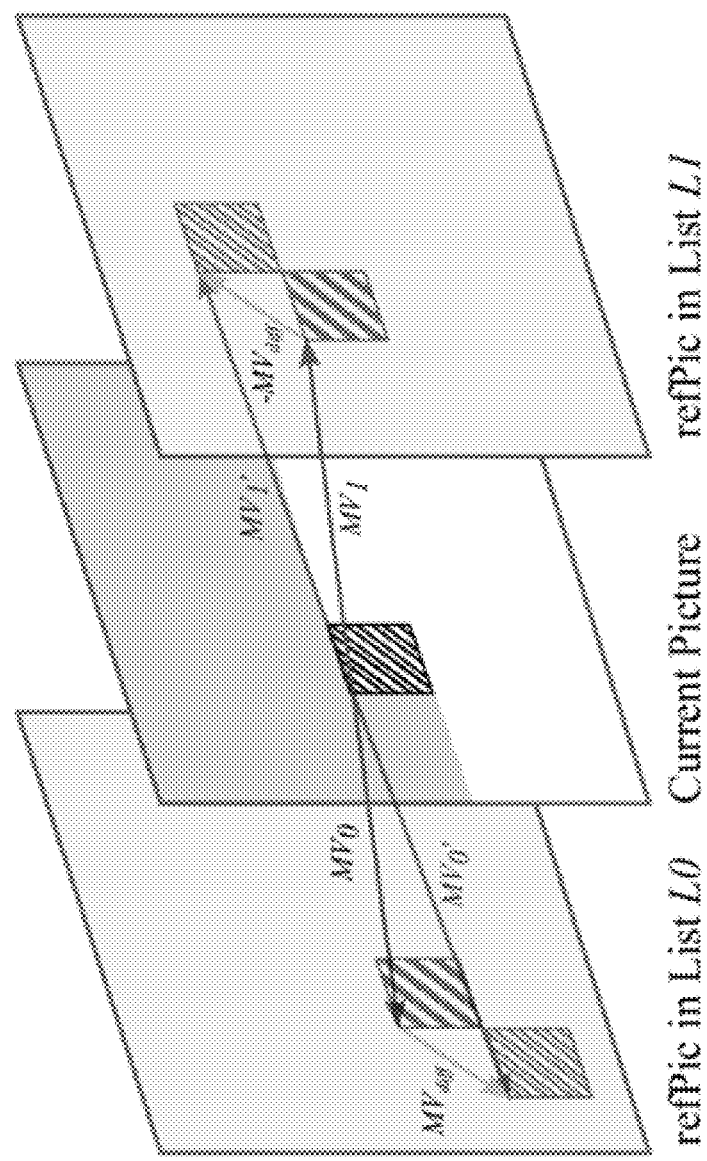
FIG. 5 shows an example of decoder side motion vector refinement.

Decoder-side Motion Vector Refinement (DMVR) utilizes the bilateral matching (BM) to derive motion information of the current CU by finding the closest match between two blocks along the motion trajectory of the current CU in two different reference pictures. The BM method calculates the distortion between the two candidate blocks in the reference picture list L0 and list L1. As illustrated in FIG. 1, the SAD between the red blocks based on each MV candidate around the initial MV is calculated. The MV candidate with the lowest SAD becomes the refined MV and used to generate the bi-predicted signal. The cost function used in the matching process is row-subsampled SAD (sum of absolute difference). An example of DMVR is shown in FIG. 5.

In VTM5.0, DMVR is adopted to refine motion vectors (MVs) at the decoder for a coding unit (CU) when the CU is coded with regular merge/skip mode and bi-prediction, one reference picture is before the current picture and the other reference picture is after the current picture in display order, the temporal distance between the current picture and one reference picture is equal to that between the current picture and the other reference picture, and the bi-prediction with CU weights (BCW) selects equal weights. When DMVR is applied, one luma coding block (CB) is divided into several independently processed subblocks of size min (cb Width, 16)×min(cbHeight, 16). DMVR refines MVs of each subblock by minimizing the SAD between ½-subsampled 10-bit L0 and L1 prediction samples generated by bilinear interpolation. For each subblock, integer ΔMV search around the initial MVs (i.e., the MVs of the selected regular merge/skip candidate) is first performed using SAD, and then fractional ΔMV derivation is performed to obtain the final MVs.

BDOF refines the luma prediction samples for a CU when the CU is coded with bi-prediction, one reference picture is before the current picture and the other reference picture is after the current picture in display order, and BCW selects equal weights. The eight-tap interpolation is used for generating the initial L0 and L1 prediction samples according to the input MVs (e.g., final MVs of DMVR in case of enabling DMVR). Next, a two-level early termination process is performed. The first early termination is at subblock level, and the second early termination is at 4×4 block level and is checked when the first early termination does not occur. At each level, the SAD between full-sampled 14-bit L0 and L1 prediction samples in each subblock/4×4 block is calculated first. If the SAD is smaller than one threshold, BDOF is not applied to the subblock/4×4 block. Otherwise, BDOF parameters are derived and used to generate the final luma sample predictors for each 4×4 block. In BDOF, the subblock size is the same as that in DMVR, i.e., min(cbWidth, 16)×min(cbHeight,16).

Figure 6:
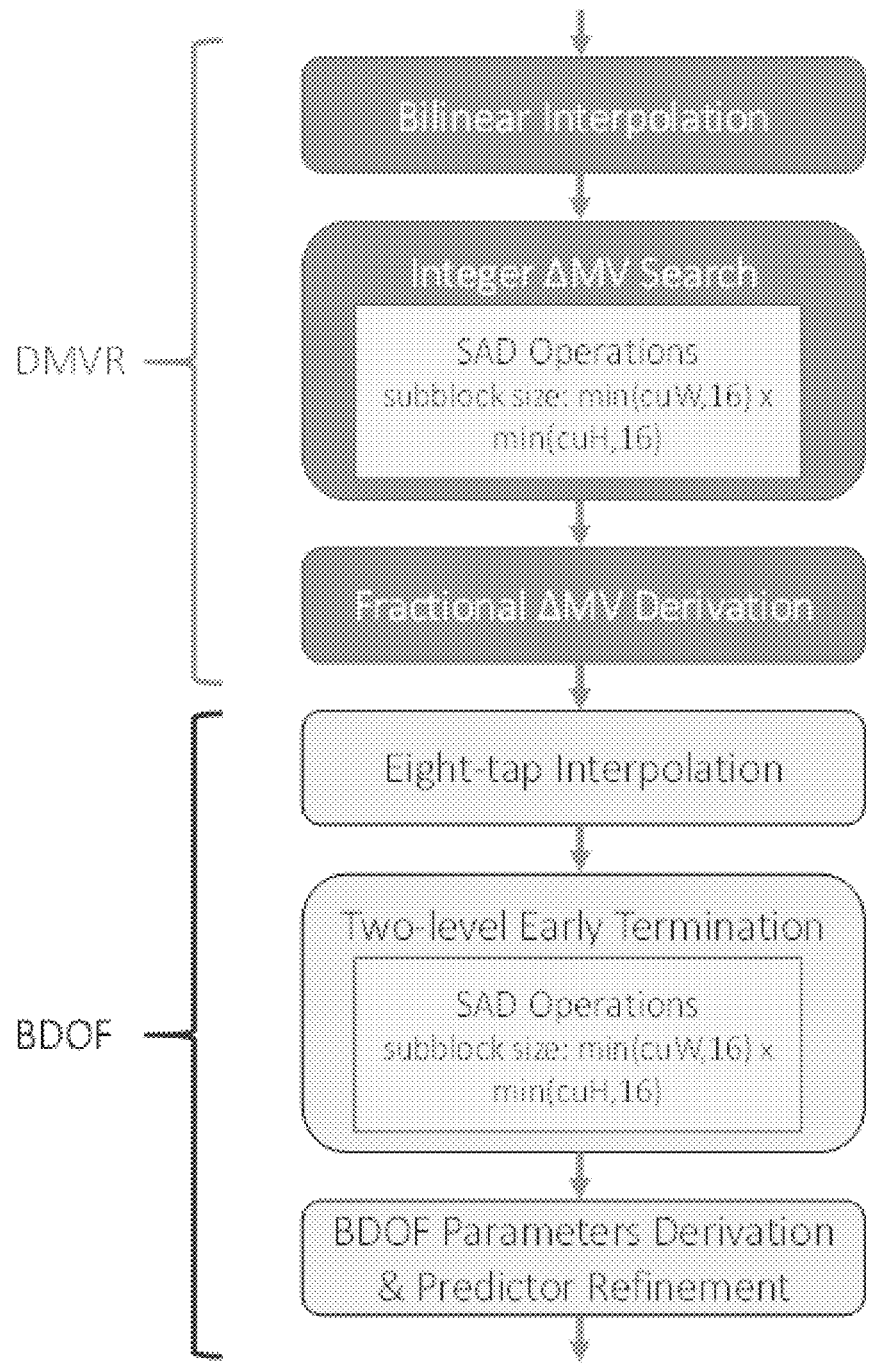
FIG. 6 shows an example of flow of cascading DMVR and BDOF processes in VTM5.0. The DMVR SAD operations and BDOF SAD operations are different and not shared.

When the CU is coded with regular merge/skip mode, one reference picture is before the current picture and the other reference picture is after the current picture in display order, the temporal distance between the current picture and one reference picture is equal to that between the current picture and the other reference picture, and BCW selects equal weights, DMVR and BDOF are both applied. The flow of cascading DMVR and BDOF processes is shown in FIG. 6. FIG. 6 shows the flow of cascading DMVR and BDOF processes in VTM5.0. The DMVR SAD operations and BDOF SAD operations are different and not shared.

In order to reduce the latency and operations in this critical path, when DMVR and BDOF are both applied, the latest VVC working draft has been revised to reuse the subblock SAD calculated in DMVR for the subblock early termination in BDOF.

The SAD calculation is defined as follows:

$$\text{sad} = \sum_{x=0}^{nSbW-1} \sum_{y=0}^{nSbH/2-1} \text{abs}$$

$$(pL0[x+2+dX][2*y+2+dY] - pL1[x+2-dX][2*y+2-dY])$$

wherein two variables nSbW and nSbH specifying the width and the height of the current subblock, two (nSbW+4)×(nSbH+4) arrays pL0 and pL1 containing the predicted samples for L0 and L1 respectively, and the integer sample offset (dX, dY) in prediction list L0.

To reduce the penalty of the uncertainty of DMVR refinement, it is proposed to favor the original MV during the DMVR process. The SAD between the reference blocks referred by the initial (or called original) MV candidate is decreased by ¼ of the SAD value. That is, when both dX and dY in above equation are equal to 0, the value of sad is modified as follows:

sad=sad−(sad>>2)

When the SAD value is smaller than a threshold (2*subblock width*subblock height), there is no need to perform BDOF anymore.

3. Drawbacks of Existing Implementations

DMVR and BIO do not involve the original signal during refining the motion vectors, which may result in coding blocks with inaccurate motion information. Also, DMVR and BIO sometimes employ the fractional motion vectors after the motion refinements while screen videos usually have integer motion vectors, which makes the current motion information more inaccurate and make the coding performance worse.

When RPR is applied in VVC, RPR (ARC) may have the following problems:

1. With RPR, the interpolation filters may be different for adjacent samples in a block, which is undesirable in SIMD (Single Instruction Multiple Data) implementation.
2. The bounding region does not consider RPR
3. It is noted that "The conformance cropping window offset parameters are only applied at the output. All internal decoding processes are applied to the uncropped picture size." However, those parameters may be used in the decoding process when RPR is applied.
4. When deriving the reference sample position, RPR only considers the ratio between two conformance windows. But the top-left offset difference between two conformance windows should also be considered.
5. The ratio between the width/height of a reference picture and that of the current picture is constrained in VVC. However, the ratio between the width/height of the conformance window of a reference picture and that of the conformance window of the current picture is not constrained.
6. Not all the syntax elements are handled properly in the picture header.
7. In current VVC, for TPM, GEO prediction mode, the chroma blending weights are derived regardless of the chroma sample location type of a video sequence. For example, in TPM/GEO, if chroma weights are derived from luma weights, the luma weights may be needed to be downsampled to match the sampling of the chroma signal. The chroma downsampling are normally applied assumes the chroma sample location type 0, which is widely used in ITU-R BT.601 or ITU-R BT.709 container. However, if a different chroma sample location type is used, this could result in a misalignment between the chroma samples and the downsampled luma samples, which may reduce the coding performance.
8. It is noted that the SAD calculation/SAD threshold doesn't consider the bit-depth impact. Therefore, for higher bit-depth (e.g., 14 or 16 bits input sequences), the threshold for the early termination may be too small.
9. For the non-RPR case, AMVR with ½-pel MV precision (i.e., alternative interpolation filter/switchable interpolation filter) is applied with a 6-tap motion compensation filter but 8-tap is applied to other cases (e.g., 1/16-pel). However, forthe RPR case, the same interpolation filter is applied to all cases without considering the mv/mvd precision. Therefore, the signaling of ½-pel case (alternative interpolation filter/switchable interpolation filter) is wasting bits.
10. The decision of partition tree splitting is allowed or not is dependent on the coded picture resolution instead of output picture resolution.
11. SMVD/MMVD are applied which doesn't consider RPR cases. These methods are based on the assumption that symmetric MVD are applied for two reference pictures. However, when output picture resolution are different, such an assumption is not true.

12. Pairwise merge candidate is generated by averaging two MVs from two merge candidates in the same reference picture list. However, when the two reference pictures associated with two merge candidates are with different resolution, the averaging doesn't make sense.
13. Several inter slice related syntax elements in the picture header may be not required to be coded if all the slices in current picture are I (intra) slices. Conditionally signal them can save syntax overhead especially for low resolution sequences with all intra coding.
14. In current VVC, there is no limitation on the dimension of a tile/slice. Adding appropriate limitation is helpful for parallel processing of a real-time software/hardware decoder, especially for ultra-high resolution sequences that each frame may be larger than 4K/8K.

4. ExampleTtechniques and Embodiments

The detailed embodiments described belowshouldbe considered as examples to explain general concepts. These embodiments should not be interpreted narrowly way. Furthermore, these embodiments can be combined in any manner.

The methods described below may be also applicable to other decoder motion information derivation technologies in addition to the DMVR and BIO mentioned below.

A motion vector is denoted by (mv_x, mv_y) wherein mv_x is the horizontal component and mv_y is the vertical component.

In this disclosure, the resolution (or dimensions, or width/height, or size) of a picture may refer to the resolution (or dimensions, or width/height, or size) of the coded/decoded picture, or may refer to the resolution (or dimensions, or width/height, or size) of the conformance window in the coded/decoded picture. In one example, the resolution (or dimensions, or width/height, or size) of a picture may refer to that parameters that related to RPR (reference picture resampling) process, such as the scaling window/phase offset window. In one example, the resolution (or dimensions, or width/height, or size) of a picture is related to that associated with the output picture.

Motion Compensation in RPR

Figure 3A:
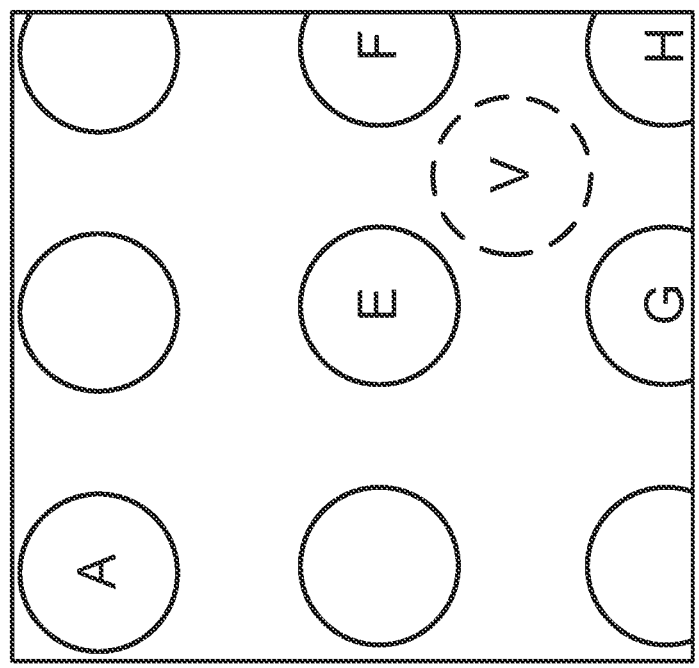
Figure 2:
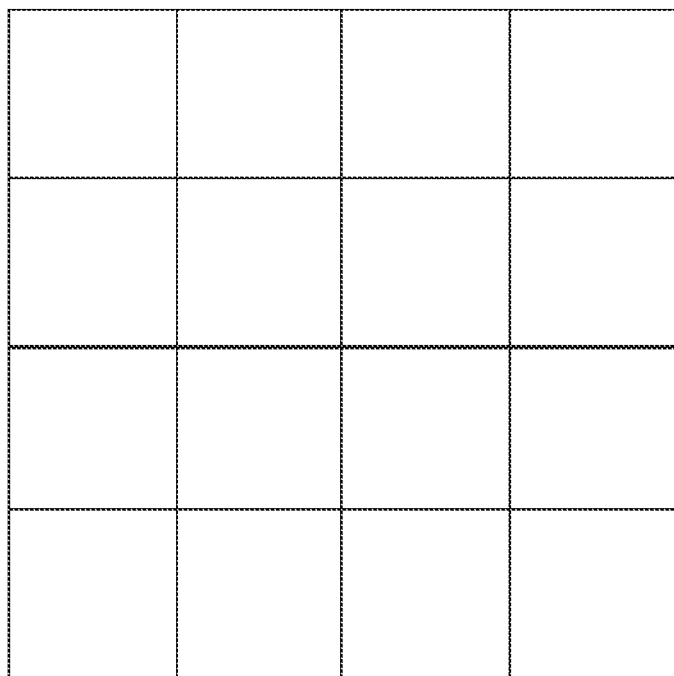
FIG. 2 shows an example of a 16×16 video block divided into 16 4×4 regions.

1. When the resolution of the reference picture is different to the current picture, or when the width and/or height of the reference picture is larger that of the current picture, predicted values for a group of samples (at least two samples) of a current block may be generated with the same horizontal and/or vertical interpolation filter.
   a. In one example, the group may comprise all samples in a region of the block.
      i. For example, a block may be divided into S M×N rectangles not overlapped with each other. Each M×N rectangle is a group. In an example as shown in FIG. 2, a 16×16 block can be divided into 16 4×4 rectangles, each of which is a group.
      ii. For example, a row with N samples is a group. N is an integer no larger than the block width. In one example, N is 4 or 8 or the block width.
      iii. For example, a column with N samples is a group. N is an integer no larger than the block height. In one example, N is 4 or 8 or the block height.
      iv. M and/or N may be pre-defined or derived on-the-fly, such as based on block dimension/coded information or signaled.
   b. In one example, samples in the group may have the same MV (denoted as shared MV).
   c. In one example, samples in the group may have MVs with the same horizontal component (denoted as shared horizontal component).
   d. In one example, samplesin the group may have MVs with the same vertical component (denoted as shared vertical component).
   e. In one example, samples in the group may have MVs with the same fractional part of the horizontal component (denoted as shared fractional horizontal component).
      i. For example, suppose the MV for a first sample is (MV1x, MV1y) and the MV for a second sample is (MV2x, MV2y), it should be satisfied that MV1x & $(2^m-1)$ is equal to MV2x & $(2^m-1)$, where M denotes MV precision. For example, M=4.
   f. In one example, samples in the group may have MVs with the same fractional part of the vertical component (denoted as shared fractional vertical component).
      i. For example, suppose the MV for a first sample is (MV1x, MV1y) and the MV for a second sample is (MV2x, MV2y), it should be satisfied that MV1y & $(2^M-1)$ is equal to MV2y & $(2^m-1)$, where M denotes MV precision. For example, M=4.
   g. In one example, for a sample in the group to be predicted, the motion vector, denoted by $MV_b$, may be firstly derived according to the resolutions of the current picture and the reference picture (e.g. ($refx_L$, $refy_L$) derived in 8.5.6.3.1 in JVET-O2001-v14). Then, $MV_b$ may be further modified (e.g., being rounded/truncated/clipped) to MV' to satisfy the requirements such as the above bullets, and MV' will be used to derive the prediction sample for the sample.
      i. In one example, MV' has the same integer part as $MV_b$, and the fractional part of the MV' is set to be the shared fractional horizontal and/or vertical component.
      ii. In one example, MV' is set to be the one with the shared fractional horizontal and/or vertical component, and closest to $MV_b$.
   h. The shared motion vector (and/or shared horizontal component and/or shared vertical component and/or shared fractional vertical component and/or shared fractional vertical component) may be set to be the motion vector (and/or horizontal component and/or vertical component and/or fractional vertical component and/or fractional vertical component) of a specific sample in the group.
      i. For example, the specific sample may be at a corner of a rectangle-shaped group, such as "A", "B', "C" and "D" shown in FIG. 3A.
      ii. For example, the specific sample may be at a center of a rectangle-shaped group, such as "E", "F', "G" and "H" shown in FIG. 3A.
      iii. For example, the specific sample may be at an end of a row-shaped or column-shaped group, such as "A" and "D" shown in FIGS. 3B and 3C.
      iv. For example, the specific sample may be at a middle of a row-shaped or column-shaped group, such as "B" and "C" shown in FIGS. 3B and 3C.
      v. In one example, the motion vector of the specific sample may be the $MV_b$ mentioned in bullet g.
   i. The shared motion vector (and/or shared horizontal component and/or shared vertical component and/or shared fractional vertical component and/or shared fractional vertical component) may be set to be the motion vector (and/or horizontal component and/or vertical component and/or fractional vertical component and/or fractional vertical component) of a virtual sample located at a different position compared to all samples in this group.
  i. In one example, the virtual sample is not in the group, but it locates in the region covering all samples in the group.
    1) Alternatively, the virtual sample is located outside the region covering all samples in the group, e.g., next to the bottom-right position of the region.
  ii. In one example, the MV of a virtual sample is derived in the same way as a real sample but with different positions.
  iii. "V" in FIGS. 3A-3C shows three examples of virtual samples.
j. The shared MV (and/or shared horizontal component and/or shared vertical component and/or shared fractional vertical component and/or shared fractional vertical component) may be set to be a function of MVs (and/or horizontal components and/or vertical components and/or fractional vertical components and/or fractional vertical components) of multiple samples and/or virtual samples.
  i. For example, the shared MV (and/or shared horizontal component and/or shared vertical component and/or shared fractional vertical component and/or shared fractional vertical component) may be set to be the average of MVs (and/or horizontal components and/or vertical components and/or fractional vertical components and/or fractional vertical components) of all or partial of samples in the group, or of sample "E", "F", "G", "H" in FIG. 3A, or of sample "E", "H" in FIG. 3A, or of sample "A", "B", "C", "D" in FIG. 3A, or of sample "A", "D" in FIG. 3A, or of sample "B", "C" in FIG. 3B, or of sample "A", "D" in FIG. 3B, or of sample "B", "C" in FIG. 3C, or of sample "A", "D" in FIG. 3C, 2. It is proposed that only integer MVs are allowed to perform the motion compensation process to derive the prediction block of a current block when the resolution of the reference picture is different to the current picture, or when the width and/or height of the reference picture is larger that of the current picture.
  a. In one example, the decoded motion vectors for samples to be predicted are rounded to integer MVs before being used.
  ab. In one example, the decoded motion vector for samples to be predicted are rounded to the integer MV that is closest to the decoded motion vector.
  ac. In one example, the decoded motion vector for samples to be predicted are rounded to the integer MV that is closest to the decoded motion vector in horizontal direction.
  ad. In one example, the decoded motion vector for samples to be predicted are rounded to the integer MV that is closest to the decoded motion vector in vertical direction.
3. The motion vectors used in the motion compensation process for samples in a current block (e.g., shared MV/shared horizontal or vertical or fractional component/MV' mentioned in above bullets) may be stored in the decoded picture buffer and utilized for motion vector prediction of succeeding blocks in current/different pictures.
  aa. Alternatively, the motion vectors used in the motion compensation processfor samples in a current block (e.g., shared MV/shared horizontal or vertical or fractional component/MV' mentioned in above bullets) may be disallowed to be utilized for motion vector prediction of succeeding blocks in current/different pictures.
    i. In one example, the decoded motion vectors (e.g., $MV_b$ in above bullets) may be utilized for motion vector prediction of succeeding blocks in current/different pictures.
  ab. In one example, the motion vectors used in the motion compensation process for samples in a current block may be utilized in the filtering process (e.g., deblocking filter/SAO/ALF).
    i. Alternatively, the decoded motion vectors (e.g., $MV_b$ in above bullets) may be utilized in the filtering process.
  c. In one example, such MV may be derived at sub-block level and may be stored for each sub-block.
4. It is proposed that the interpolation filters used in the motion compensation process to derive the prediction block of a current block may be selected depending on whether the resolution of the reference picture is different to the current picture, or whether the width and/or height of the reference picture is larger that of the current picture.
  a. In one example, the interpolation filters with less taps may be applied when condition A is satisfied, wherein condition A depends on the dimensions of the current picture and/or the reference picture.
    i. In one example, condition A is the resolution of the reference picture is different to the current picture.
    ii. In one example, condition A is the width and/or height of the reference picture is larger than that of the current picture.
    iii. In one example, condition A is W1>a*W2 and/or H1>b*H2, wherein (W1, H1) represents the width and height of the reference picture and (W2, H2) represents the width and height of the current picture, a and b are two factors, e.g. a=b=1.5.
    iv. In one example, condition A may also depend on whetherbi-prediction is used.
    v. In one example, 1-tap filters are applied. In other words, an integer pixel without filtering is output as the interpolation result.
    vi. In one example, bi-linear filters are applied when the resolution of the reference picture is different to the current picture.
    vii. In one example, 4-tap filters or 6-tap filters are applied when the resolution of the reference picture is different to the current picture, or the width and/or height of the reference picture is larger than that of the current picture.
      1) The 6-tap filters may also be used for the affine motion compensation.
      2) The 4-tap filters may also be used for interpolation for chroma samples.
  b. In one example, padding samples are usedto perform interpolation when the resolution of the reference picture is different to the current picture, or the width and/or height of the reference picture is larger that of the current picture.

c. Whether to and/or how to apply the methods disclosed in bullet 4 may depend on the color components.
   i. For example, the methods are only applied on the luma component.
d. Whether to and/or how to apply the methods disclosed in bullet 4 may depend on the interpolation filtering direction.
   i. For example, the methods are only applied on horizontal filtering.
   ii. For example, the methods are only applied on vertical filtering.
5. It is proposed that a two-stage process for prediction block generation is applied when the resolution of the reference picture is different to the current picture, or when the width and/or height of the reference picture is larger that of the current picture.
   a. In the first stage, a virtual reference block is generated by up-sampling or down-sampling a region in the reference picture depending on width and/or height of the current picture and the reference picture.
   b. In the second stage, the prediction samples are generated from the virtual reference block by applying interpolation filtering, independent of width and/or height of the current picture and the reference picture.
6. It is proposed that the calculation of top-left coordinate of the bounding block for reference sample padding ($xSbInt_L$, $ySbInt_L$) as defined in 8.5.6.3.1 in JVET-O2001-v14 may be derived depending on width and/or height of the current picture and the reference picture.
   a. In one example, the luma locations in full-sample units are modified as:

$xInt_i = Clip3(xSbInt_L - Dx, xSbInt_L + sbWidth + Ux, xInt_i)$, $yInt_i = Clip3(ySbInt_L - Dy, ySbInt_L + sbHeight + Uy, yInt_i)$, where Dx and/or Dy and/or Ux and/or Uy may depend on width and/or height of the current picture and the reference picture.
   b. In one example, the chroma locations in full-sample units are modified as:

$xInti = Clip3(xSbInt_C - Dx, xSbInt_C + sbWidth + Ux, xInti)$ $yInti = Clip3(ySbInt_C - Dy, ySbInt_C + sbHeight + Uy, yInti)$ where Dx and/or Dy and/or Ux and/or Uy may depend on width and/or height of the current picture and the reference picture.
7. Instead of storing/using the motion vectors for a block based on the same reference picture resolution as current picture, it is proposed to use the real motion vectors with the resolution difference taken into consideration.
   a. Alternatively, furthermore, when using the motion vector to generate the prediction block, there is no need to further change the motion vector according to the resolutions of the current picture and the reference picture (e.g. ($refx_L$, $refy_L$) derived in 8.5.6.3.1 in JVET-O2001-v14).

Interaction Between RPR and Other Coding Tools
8. Whether to/how to apply filtering process (e.g., deblocking filter) may depend on the resolutions of reference pictures and/or the resolution of the current picture.
   a. In one example, the boundary strength (BS) settings in the deblocking filters may take the resolution differences into consideration in addition to motion vector differences.
      i. In one example, the scaled motion vector difference according to the current and reference pictures' resolutions may be used to determine the boundary strength.
   b. In one example, the strength of deblocking filter for a boundary between block A and block B may be set differently (e.g., being increased/decreased) if the resoltuion of at least one reference picture of block A is different to (or smllar than or larger than) the resoltuion of at least one reference picture of block B compared to the case that same reoslutions are utilized for the two blocks.
   c. In one example, a boundary between block A and block B is marked as to be filtered (e.g., BS is set to 2) if the resolution of at least one reference picture of block A is different to (or smllar than or larger than) the resolution of at least one reference picture of block B.
   d. In one example, the strength of deblocking filter for a boundary between block A and block B may be set differently (e.g., being increased/decreased) if the resoltuion of at least one reference picture of block A and/or block B is different to (or smllar than or larger than) the resoltuion of the current picture compared to the case same resolution is utilized of the reference picture and current picture.
   e. In one example, a boundary between two blocks is marked to be filtered (e.g., BS is set to 2) if at least one reference picture of at least one block of the two has a resolution different to that of the current picture.
9. When a sub-picture exists, a conformance bitstream may should satisfy the reference picture must have the same resolution as the current picture.
   a. Alternatively, when a reference picture has a different resolution to the current picture, there must be no sub-picture in the current picture.
   b. Alternatively, for a sub-picture in the current picture, it is disallowed to use a reference picture that is with different resolution as the current picture.
      i. Alternatively, furthermore, the reference picture management may be invoked to exclude those reference pictures with different resolutions.
10. In one example, sub-pictures (e.g., how to split one picture to multiple sub-pictures) may be defined separately for pictures with different resolutions.

In one example, the corresponding sub-picture in the reference picture can be derived by scaling and/or offsetting a sub-picture of the current picture, if the reference picture has a different resolution to the current picture.

11. PROF (prediction refinement with optical flow) may be enabled when the reference picture has a resolution different to that of the current picture.
   a. In one example, one set of MV (denoted as $MV_g$) may be generated for a group of samples and may be used for motion compensation as described in bullet 1. On the other hand, MV (denoted as $MV_p$) may be derived for each sample, and the difference (e.g., corresponds to the $\Delta v$ used in PROF) between the $MV_p$ and $MV_g$ together with the gradients (e.g., spatial gradients of the motion compensated blocks) may be used for deriving the prediction refinement.

b. In one example, $MV_p$ may be with a different precision from $MV_g$. For example, $MV_p$ may be with 1/N-pel (N>0) precision, N=32, 64 etc.

c. In one example, $MV_g$ may be with a different precision form the internal MV precision (e.g., 1/16-pel).

d. In one example, the prediction refinement is added to the prediction block to generate refined prediction block.

e. In one example, such method may be applied in each prediction direction.

f. In one example, such method may be applied only in uni-prediction case.

g. In one example, such method may be applied in uni-prediction or/and bi-prediction.

h. In one example, such method may be applied only when the reference picture has a different resolution from the current picture.

12. It is proposed that only one MV may be utilized for a block/sub-block to perform the motion compensation process to derive the prediction block of a current block when the resolution of the reference picture is different to that of the current picture.

a. In one example, the only MV for the block/sub-block may be defined as a function (e.g., average) of all MVs associated with each sample within the block/sub-block.

b. In one example, the only MV for the block/sub-block may be defined as a selected MV associated with a selected sample (e.g., center sample) within the block/sub-block.

c. In one example, only one MV may be utilized a 4×4 block or subblock (e.g., 4×1).

d. In one example, BIO may be further applied to compensate the precision loss due to a block-based motion vector.

13. A lazy mode without signalling any block-based motion vectors may be applied when the width and/or height of the reference picture is different from that of the current picture.

a. In one example, no motion vectors may be signaled and the motion compensation process is to approximate the case of a pure resolution change of a still image.

b. In one example, only a motion vector at picture/tile/brick/CTU level may be signal and related blocks may use the motion vector when resolution changes.

14. PROF may be applied to approximate motion compensation when the width and/or height of the reference picture is different to that of the current picture for blocks coded with affine prediction mode and/or non-affine prediction mode.

a. In one example, PROF may be enabled when the width and/or height of the reference picture and that of the current picture are different. b. In one example, a set of affine motions may be generated by combining the indicated motion and resolution scaling and used by PROF.

15. Interweaved prediction (e.g. as proposed in JVET-K0102) may be applied to approximate motion compensation when the width and/or height of the reference picture is different to that of the current picture.

a. In one example, resolution change (zooming) is represented as an affine motion, and interweaved motion prediction may be applied.

16. LMCS and/or chroma residual scaling may be disabled when the width and/or height of the current picture is different to that of the IRAP picture in a same IRAP period.

a. In one example, when LMCS is disabled, the slice level flags such as slice_lmcs_enabled_flag, slice_lmcs_aps_id, and slice_chroma_residual_scale_flag may be not signaled and inferred to be 0.

b. In one example, when chroma residual scaling is disabled, the slice level flags such as slice_chroma_residual_scale_flag may be not signaled and inferred to be 0.

Constrains on RPR

17. RPR may be applied to coding blocks with block dimensions constrains.

a. In one example, for an M×N coding block, with M as the block width and N as the block height, when M*slice_chroma_residual_scale_flag T or M*slice_chroma_residual_scale_flag=T (such as T=256), RPR may be not used.

b. In one example, when M<K (or M<=K) (such as K=16) and/or slice_chroma_residual_scale_flag L (or slice_chroma_residual_scale_flag=L) (such as L=16), RPR may be not used.

18. Bitstream conformance may be added to restrict the ratio between the width and/or height of an active reference picture (or its conformance window) and that of the current picture (or its conformance window). Suppose refPicW and refPicH denote the width and height of reference picture, curPicW and curPicH denote the width and height of current picture, a. In one example, when (refPicW÷curPicW) is equal to an integer number, the reference picture may be marked as active reference picture.

i. Alternatively, when (refPicW÷curPicW) is equal to a factional number, the reference picture may be marked as not available.

b. In one example, when (refPicW÷curPicW) is equal to (X*n), where X denotes a fractional number such as X=½, and n denotes an integer number such as n=1, 2, 3, 4 . . . , the reference picture may be marked as active reference picture.

i. In one example, when (refPicW÷curPicW) is not equal to (X*n), the reference picture may be marked as not available.

19. Whether to and/or how to enable a coding tool (e.g., bi-prediction/the whole triangular prediction mode (TPM)/blending process in TPM) for a M×N block may depend on the resolutions of reference pictures (or their conformance windows) and/or that of the current picture (or its conformance window).

a. In one example, M*N<T or M*N<=T (such as T=64).

b. In one example, M<K (or M<=K) (such as K=16) and/or N<L (or N<=L) (such as L=16).

c. In one example, the coding tool is not allowed when width/height of at least one reference picture is different to the current picture, i. In one example, the coding tool is not allowed when width/height of at least one reference picture of the block is larger that of the current picture.

d. In one example, the coding tool is not allowed when width/height of each reference picture of the block is different to that of the current picture, i. In one example, the coding tool is not allowed when width/height of each reference pictures is larger that of the current picture.

e. Alternatively, furthermore, when the coding tool is not allowed, motion compensation may be conducted with one MV as a uni-prediction. Conformance window related 20. The conformance cropping window offset parameters (e.g.,conf_win_left_offset) are signaled in N-pel precision instead of 1-pel wherein N is an positive interger greater than 1.
   a. In one example, the actual offset may be derived as the signaled offset multiplied by N.
   b. In one example, N is set to 4 or 8.

21. It is proposed that the conformance cropping window offset parameters are not only applied at the output. Certian internal decoding processes may depend on the cropped picture size (i.e., the resolution of a conformance window in a picture).

22. It is proposed that the conformance cropping window offset parameters in a first video unit (e.g. PPS) and in a second video unit may be different when the width and/or height of a picture denoted as (pic_width_in_luma_samples, pic_height_in_luma_samples) in the first video unit and second video unit are the same.

23. It is proposed that the conformance cropping window offset parameters in a first video unit (e.g. PPS) and in a second video unit should be the same in a conformance bitstream when the width and/or height of a picture denoted as (pic_width_in_luma_samples, pic_height_in_luma_samples) in the first video unit and second video unit are different.
   a. It is proposed that the conformance cropping window offset parameters in a first video unit (e.g. PPS) and in a second video unit should be the same in a conformance bitstream no matter the width and/or height of a picture denoted as (pic_width_in_luma_samples, pic_height_in_luma_samples) in the first video unit and second video unit are the same or not.

24. Suppose the width and height of the conformance window defined in a first video unit (e.g. PPS) are denoted as W1 and H1, respectively. The width and height of the conformance window defined in a second video unit (e.g. PPS) are denoted as W2 and H2, respectively. The top-left position of the conformance window defined in a first video unit (e.g. PPS) are denoted as X1 and Y1. The top-left position of the conformance window defined in a second video unit (e.g. PPS) are denoted as X2 and Y2. The width and height of the coded/decoded picture (e.g. pic_width_in_luma_samples and pic_height_in_luma_samples) defined in a first video unit (e.g. PPS) are denoted as PW1 and PH1, respectively. The width and height of the coded/decoded picture defined in a second video unit (e.g. PPS) are denoted as PW2 and PH2.
   a. In one example, W1W/2 should be equal to X1/X2 in a conformance bitstream.
      i. Alternatively, W1/X1 should be equal to W2/X2 in a conformance bitstream.
      ii. Alternatively, W1*X2 should be equal to W2*X1 in a conformance bitstream.
   b. In one example, H1/H2 should be equal to Y1/Y2 in a conformance bitstream.
      i. Alternatively, H1/Y1 should be equal to H2/Y2 in a conformance bitstream.
      ii. Alternatively, H1*Y2 should be equal to H2*Y1 in a conformancebitstream.
   c. In one example, PW1/PW2 should be equal to X1/X2 in a conformance bitstream.
      i. Alternatively, PW1/X1 should be equal to PW2/X2 in a conformance bitstream.
      ii. Alternatively, PW1*X2 should be equal to PW2*X1 in a conformance bitstream.
   d. In one example, PH1/PH2 should be equal to Y1/Y2 in a conformance bitstream.
      i. Alternatively, PH1/Y1 should be equal to PH2/Y2 in a conformancebitstream.
      ii. Alternatively, PH1*Y2 should be equal to PH2*Y1 in a conformance bitstream.
   e. In one example, PW1/PW2 should be equal to W1/W2 in a conformance bitstream.
      i. Alternatively, PW1/W1 should be equal to PW2/W2 in a conformance bitstream.
      ii. Alternatively, PW1*W2 should be equal to PW2*W1 in a conformance bitstream.
   f. In one example, PH1/PH2 should be equal to H1/H2 in a conformance bitstream.
      i. Alternatively, PH1/H1 should be equal to PH2/H2 in a conformancebitstream.
      ii. Alternatively, PH1*H2 should be equal to PH2*H1 in a conformance bitstream.
   g. In a conformance bitstream, if PW1 is greater than PW2, W1 must be greater than W2.
   h. In a conformance bitstream, if PW1 is smaller than PW2, W1 must be smaller than W2.
   i. In a conformance bitstream, (PW1−PW2)*(W1−W2) must be no smaller than 0.
   j. In a conformance bitstream, if PH1 is greater than PH2, H1 must be greater than H2.
   k. In a conformance bitstream, if PH1 is smaller than PH2, H1 must be smaller than H2.
   l. In a conformance bitstream, (PH1−PH2)*(H1−H2) must be no smaller than 0.
   m. In a conformance bitstream, W1/W2 must be no larger than (or smaller than) PW 1/PW2 if PW1>=PW2.
   n. In a conformance bitstream, H1/H2 must be no larger than (or smaller than) PH1/PH2 if PHI>=PH2.

25. Suppose the width and height of the conformance window of the current picture are denoted as W and H, respectively. The width and height of the conformance window of a reference picture are denoted as W' and H', respectively. Then at least one constraint below should be followed by a conformance bit-stream.
   a. W*pw>=W'; pw is an integer such as 2.
   b. W*pw>W'; pw is an integer such as 2.
   c. W'*pw'>=W; pw' is an integer such as 8.
   d. W'*pw'>W; pw' is an integer such as 8.
   e. H*ph>=H'; ph is an integer such as 2.
   f. H*ph>H'; ph is an integer such as 2.
   g. H'*ph'>=H; ph' is an integer such as 8.
   h. H'*ph'>H; ph' is an integer such as 8.
   i. In one example, pw is equal to pw'.
   j. In one example, ph is equal to ph'.
   k. In one example, pw is equal to ph.
   l. In one example, pw' is equal to ph'.
   m. In one example, the above sub-bullets may be required to be satisfied by a conformance bitstream when W and H represent the width and height of the current picture, respectively. W' and H' represent the width and height of a reference picture.

26. It is proposed that the conformance window parameters are partially signaled.
   a. In one example, the top-left sample in a conformance window of a picture is the same one as that in the picture.

b. For example, conf_win_left_offset as defined in VVC is not signaled and inferred to be zero.

c. For example, conf_win_top_offset as defined in VVC is not signaled and inferred to be zero.

Figure 4A:
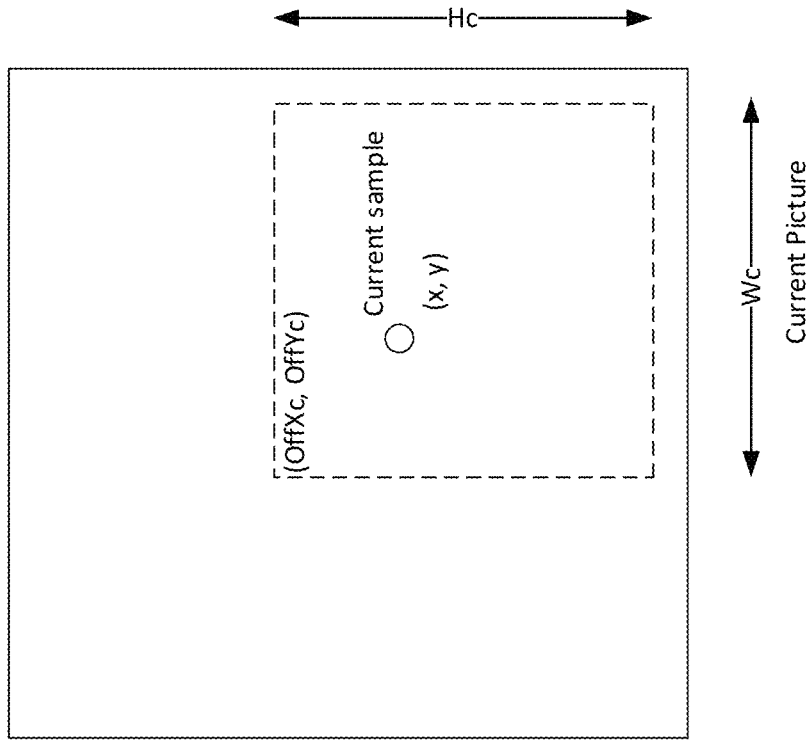
FIGS. 4A and 4B show examples of positions of the current sample in the current picture and its reference sample in a reference picture.
Figure 4A:
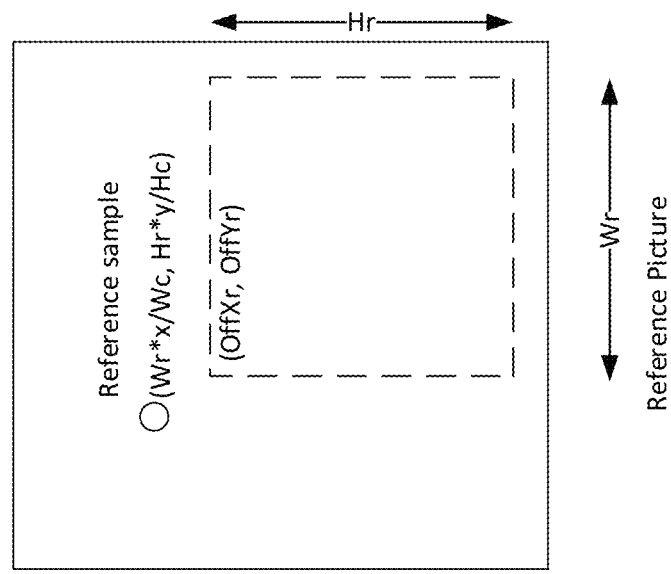
Figure 4B:
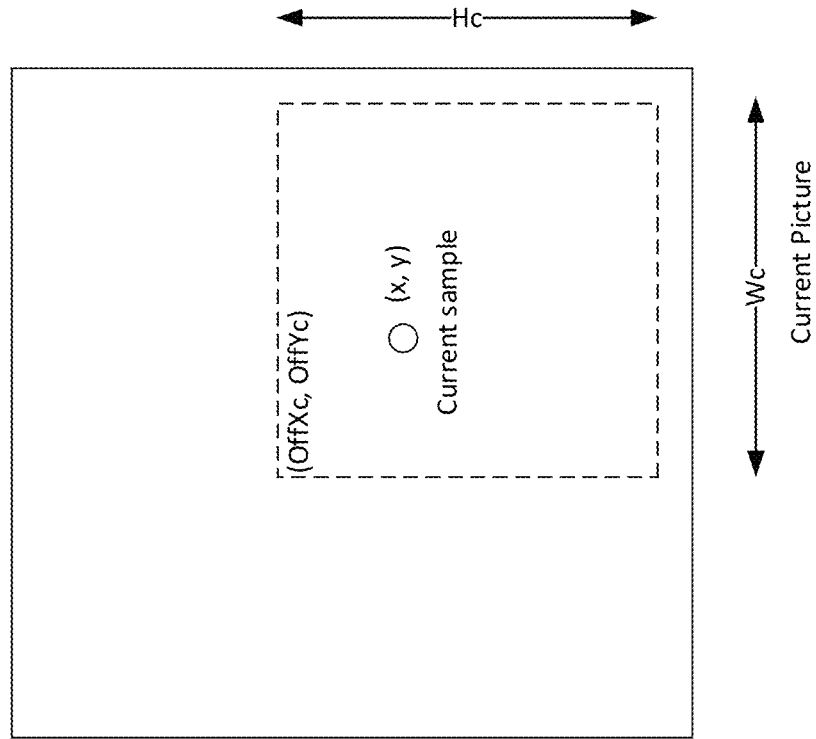
Figure 4B:
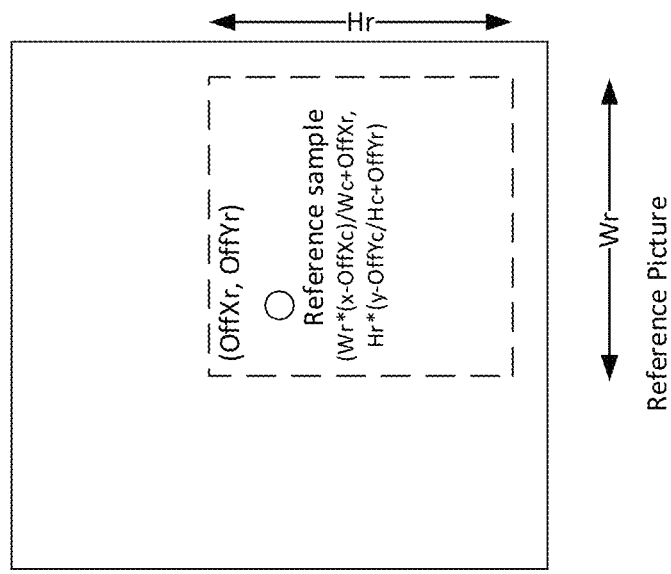

27. It is proposed that the derivation of the position (e.g. (refx$_L$, refy$_L$) as defined in VVC) of a reference sample may depend on the top-left position (e.g. (conf_win_left_offset, conf_win_top_offset) as defined in VVC) of the conformance window of the current picture and/or the reference picture. FIGS. 4A and 4B show examples of the samples positions derived as in VVC (a) and in a proposed method (b). Dashed rectangles represent the conformance windows.

a. In one example, the dependency exists only when the width and/or the height of the current picture and that of the reference picture are different.

b. In one example, the derivation of the horizontal position (e.g. refx$_L$ as defined in VVC) of a reference sample may depend on the left position (e.g..conf_win_left_offset as defined in VVC) of the conformance window of the current picture and/or the reference picture.

i. In one example, the horizontal position (denoted as xSb') of the current sample relative to the top-left position of the conformance window in the current picture is calculated and used to derive the position of the reference sample.

1) For example, xSb'=xSb−(conf_win_left_offset<<Prec) is calculated and used to derive the position of the reference sample, wherein xSb represents the horizontal position of the current sample in the current picture. conf_win_left_offset represents the horizontal position of the top-left sample in the conformance window of the current picture. Prec presents the precision of xSb and xSb' wherein (xSb>>Prec) may show the actual horizotnal coordinate of current sample relative to the current picture. For example, Prec=0 or Prec=4.

ii. In one example, horizontal position (denoted as Rx') of the reference sample relative to the top-left position of the conformance window in the reference picture is calculated.

1) The calculation of Rx' may depend on xSb', and/or a motion vector, and/or a resampling ratio.

iii. In one example, horizontal position (denoted as Rx) of the reference sample relative in the reference picture is calculated depending on Rx'.

1) For example, Rx=Rx'+(conf_win_left_offset ref<<Prec) is calculated, wherein conf_win_left_offset ref represents the horizontal position of the top-left sample in the conformance window of the reference picture. Prec presents the precision of Rx and Rx'. For example, Prec=0 or Prec=4.

iv. In one example, Rx may be calcuated directly depending on xSb', and/or a motion vector, and/or a resampling ratio. In other words, the two steps of derivation on Rx' and Rx are combined into a one-step calculation.

v. Whether to and/or how to use the left position (e.g. conf_win_left_offset as defined in VVC) of the conformance window of the current picture and/or the reference picture may depend on the color components and/or color formats.

1) For example,conf_win_left_offset may be revised as conf_win_left_offset=conf_win_left_offset*SubWidthC, wherein SubWidthC defines the horizontal sampling step of a color component E.g., SubWidthC is equal to 1 for the luma component. SubWidthC is eqaul to 2 fora chroma component when the color format is 4:2:0 or 4:2:2.

2) For example,conf_win_left_offset may be revised as conf_win_left_offset=conf_win_left_offset/SubWidthC, wherein SubWidthC defines the horizontal sampling step of a color component E.g., SubWidthC is equal to 1 for the luma component. SubWidthC is eqaul to 2 fora chroma component when the color format is 4:2:0 or 4:2:2.

c. In one example, the derivation of the vertical position (e.g. refy$_L$ as defined in VVC) of a reference sample may depend on the top position (e.g. conf_win_top_offset as defined in VVC) of the conformance window of the current picture and/or the reference picture.

i. In one example, the vertical position (denoted as ySb') of the current sample relative to the top-left position of the conformance window in the current picture is calculated and used to derive the position of the reference sample.

1) For example, ySb'=ySb−(conf_win_top_offset<<Prec) is calculated and used to derive the position of the reference sample, wherein ySb represents the vertical position of the current sample in the current picture. conf_win_top_offset represents the vertical position of the top-left sample in the conformance window of the current picture. Prec presents the precision of ySb and ySb'. For example, Prec=0 or Prec=4.

ii. In one example, the vertical position (denoted as Ry') of the reference sample relative to the top-left position of the conformance window in the reference picture is calculated.

1) The calculation of Ry' may depend on ySb', and/or a motion vector, and/or a resampling ratio.

iii. In one example, the vertical position (denoted as Ry) of the reference sample relative in the reference picture is calculated depending on Ry'.

1) For example, Ry=Ry'+(conf_win_top_offset ref<<Prec) is calculated, wherein conf_win_top_offset ref represents the vertical position of the top-left sample in the conformance window of the reference picture. Prec presents the precision of Ry and Ry'. For example, Prec=0 or Prec=4.

iv. In one example, Ry may be calcuated directly depending on ySb', and/or a motion vector, and/or a resampling ratio. In other words, the two steps of derivation on Ry' and Ry are combined into a one-step calculation.

v. Whether to and/or how to use the top position (e.g. conf_win_top_offset as defined in VVC) of the conformance window of the current picture and/or the reference picture may depend on the color components and/or color formats.

1) For example, conf_win_top_offset may be revised as conf_win_top_offset=conf_win_ top_offset*SubHeightC, wherein SubHeightC defines the vertical sampling step of a color component E.g., SubHeightC is equal to 1 for the luma component. SubHeightC is eqaul to 2 for a chroma component when the color format is 4:2:0.

2) For example, conf_win_top_offset may be revised as conf_win_top_offset=conf_win_top_offset/SubHeightC, wherein SubHeightC defines the vertical sampling step of a color component E.g., SubHeightC is equal to 1 for the luma component. SubHeightC is eqaul to 2 for a chroma component when the color format is 4:2:0.

28. It is proposed that the integer part of the horizontal coordinate of a reference sample may be clipped to [minW, maxW]. Suppose the width and height of the conformance window of the reference picture are denoted as W and H, respectively. The width and height of the conformance window of a reference picture are denoted as W' and H'. The top-left position of the conformance window in the reference picture are denoted as (X0, Y0).
  a. In one example, minW is equal to 0.
  b. In one example, minW is equal to X0.
  c. In one example, maxW is equal to W−1.
  d. In one example, maxW is equal to W'−1.
  e. In one example, maxW is equal to X0+W'−1.
  f. In one example, minW and/or maxW may be modified based on color format and/or color component.
    i. For example, minW is modified to be minW*SubC.
    ii. For example, minW is modified to be minW/SubC.
    iii. For example, maxW is modified to be maxW*SubC.
    iv. For example, maxW is modified to be maxW/SubC.
    v. In one example, SubC is equal to 1 for the luma component.
    vi. In one example, SubC is eqaul to 2 for a chroma component when the color format is 4:2:0.
    vii. In one example, SubC is eqaul to 2 for a chroma component when the color format is 4:2:2.
    viii. In one example, SubC is eqaul to 1 for a chroma component when the color format is 4:4:4.
  g. In one example, the whether to and/or how to do the clippling may depend on the dimenstions of the current picture (or the conformance window in it) and the dimenstions of the reference picture (or the conformance window in it).
    i. In one exmaple, the clipping is done only when the dimenstions of the current picture (or the conformance window in it) and the dimenstions of the reference picture (or the conformance window in it) are different.

29. It is proposed that the integer part of the vertical coordinate of a reference sample may be clipped to [minH, maxH]. Suppose the width and height of the conformance window of the reference picture are denoted as W and H, respectively. The width and height of the conformance window of a reference picture are denoted as W' and H'. The top-left position of the conformance window in the reference picture are denoted as (X0, Y0).
  a. In one example, minH is equal to 0.
  b. In one example, minH is equal to Y0.
  c. In one example, maxH is equal to H−1.
  d. In one example, maxH is equal to H'−1.
  e. In one example, maxH is equal to Y0+H'−1.
  f. In one example, minH and/or maxH may be modified based on color format and/or color component.
    i. For example, minH is modified to be minH*SubC.
    ii. For example, minH is modified to be minH/SubC.
    iii. For example, maxH is modified to be maxH*SubC.
    iv. For example, maxH is modified to be maxH/SubC.
    v. In one example, SubC is equal to 1 for the luma component.
    vi. In one example, SubC is eqaul to 2 for a chroma component when the color format is 4:2:0.
    vii. In one example, SubC is eqaul to 1 for a chroma component when the color format is 4:2:2.
    viii. In one example, SubC is eqaul to 1 for a chroma component when the color format is 4:4:4.
  g. In one example, the whether to and/or how to do the clippling may depend on the dimenstions of the current picture (or the conformance window in it) and the dimenstions of the reference picture (or the conformance window in it).
    i. In one exmaple, the clipping is done only when the dimenstions of the current picture (or the conformance window in it) and the dimenstions of the reference picture (or the conformance window in it) are different.

In the following discussion, a first syntax element is asserted to be "corresponding" to a second syntax element, if the two syntax elements have an equivalent functionality but may be signaled at different video unit (e.g. VPS/SPS/PPS/slice header/picture header etc.)

30. It is proposed that a syntax element may be signaled in a first video unit (e.g. picture header or PPS) and no corresponding syntax element is signaled in a second video unit at a higher level (such as SPS) or a lower level (such as slice header).
  a. Alternatively, a first syntax element may be signaled in the first video unit (e.g. picture header or PPS) and a corresponding second syntax element may be signaled in a second video unit at a lower level (such as slice header).
    i. Alternatively, an indicator may be signaled in the second video unit to inform whether the second syntax element is signaled thereafter.
    ii. In one example, the slice associated with the second video unit (such as slice header) may follow the indication of the second syntax element instead of the first one if the second one is signaled.
    iii. An indicator associated with the first syntax element may be signaled in the first video unit to inform whether the second syntax element is signaled in any slice (or other video unit) associated with the first video unit.
  b. Alternatively, a first syntax element may be signaled in a first video unit at a higher level (such as VPS/SPS/PPS), and a corresponding second syntax element may be signaled in the second video unit (such as picture header).
    i. Alternatively, an indicator may be signaled to inform whether the second syntax element is signaled thereafter.

ii. In one example, the picture (which may be partitioned into slices) associated with the second video unit may follow the indication of the second syntax element instead of the first one if the second one is signaled.
c. A first syntax element in the picture header may have an equivalent functionality as a second syntax element in the slice header as specified in section 2.6 (such as but limited to slice_temporal_mvp_enabled_flag, cabac_init_flag, six_minus_max_num_merge_cand, five_minus_max_num_subblock_merge_cand, slice_fpel_mmvd_enabled_flag, slic_disable_bdof_dmvr_flag, max_num_merge_cand_minus_max_num_triangle_cand, slice_fpel_mmvd_enabled_flag, slice_six_minus_max_num_ibc_merge_cand, slice_joint_cbcr_sign_flag, slice_qp_delta, . . . ) but control all slices of the picture.
d. A first syntax element in SPS as specified in section 2.6 may have an equivalent functionality as a second syntax element in the picture header (such as but limited to sps_bdof_dmvr_slice_present_flag, sps_mmvd_enabled_flag, sps_isp_enabled_flag, sps_mrl_enabled_flag, sps_mip_enabled_flag, sp_cclm_enabled_flag, sps_mts_enabled_flag . . . ) but control only the associated picture (which may be partitioned into slices).
e. A first syntax element in PPS as specified in section 2.7 may have an equivalent functionality as a second syntax element in the picture header (such as but limited to entropy_coding_sync_enabled_flag, entry_point_offsets_present_flag, cabac_init_present_flag, rpl1_idx_present_flag . . . ) but control only the associated picture (which may be partitioned into slices).
31. Syntax elements signaled in the picture header are decoupled from other syntax elements signaled or derived in the SPS/VPS/DPS.
32. Indications of enabling/disabling of DMVR and BDOF may be signaled separately in picture header, instead of being controlled by the same flag (e.g, pic_disable_bdof_dmvr_flag).
33. Indications of enabling/disabling of PROF/cross-component ALF/inter prediction with geometric partitioning (GEO) may be signaled in picture headers.
a. Alternatively, the indication of enabling/disabling PROF in picture header may be conditionally signaled according to the PROF enabling flag in SPS.
b. Alternatively, the indication of enabling/disabling cross-component ALF (CCALF) in picture header may be conditionally signaled according to the CCALF enabling flag in SPS.
c. Alternatively, the indication of enabling/disabling GEO in picture header may be conditionally signaled according to the GEO enabling flag in SPS.
d. Alternatively, furthermore, indications of enabling/disabling of PROF/cross-component ALF/inter prediction with geometric partitioning (GEO) in slice headers may be conditionally signaled according to those syntax elements signaled in picture header instead of SPS.
34. Indications of prediction types of slices/bricks/tiles (or other video units smaller than a picture) in the same picture may be signaled in picture header.
a. In one example, an indication of whether all slices/bricks/tiles (or other video units smaller than a picture) are all intra-coded (e.g., all I slices) may be signaled in the picture header.
i. Alternatively, furthermore, the slice types may not be signaled in slice header if the indication tells all slices within the picture are I slices.
b. Alternatively, an indication of whether at least one of slices/bricks/tiles (or other video units smaller than a picture) is not intra-coded (e.g., at least one non-I slices) may be signaled in the picture header.
c. Alternatively, an indication of whether all slices/bricks/tiles (or other video units smaller than a picture) are all with the same prediction types (e.g., I/P/B slices) may be signaled in the picture header.
i. Alternatively, furthermore, the slice types may not be signaled in slice header.
ii. Alternatively, furthermore, indication of tools which are allowed for specific prediction types (e.g, DMVR/BDOF/TPM/GEO are only allowed for B slices; dual tree is only allowed for I slices) may be conditionally signaled according to the indication of prediction types.
d. Alternatively, furthermore, signaling of indications of enabling/disabling tools may depend on the indications of prediction types mentioned in above sub-bullets.
i. Alternatively, furthermore, indications of enabling/disabling tools may be derived according to the indications of prediction types mentioned in above sub-bullets.
35. In this disclosure (bullet 1-bullet 29), the term "conformance window" may be replaced by other terms such as "scaling window". A scaling window may be signaled differently to the conformance window and is used to derive the scaling ratio and/or top-left offset used to derive the reference sample position for RPR.
a. In one example, the scaling window may be constrained by the conformance window.
For example, in a conformance bit-stream, the scaling window must be contained by the conformance window.
36. Whether and/or how to signal the allowed max block size for transform-skip-coded blocks may depend on the max block size for transform-coded blocks.
a. Alternatively, the max block size for transform-skip-coded blocks cannot be larger than max block size for transform-coded blocks in a conformance bit-stream.
37. Whether and how to signal the indication of enabling Joint Cb-Cr Residue (JCCR) coding (such as sps_joint_cbcr_enabled_flag) may depend the color format (such as 4:0:0, 4:2:0 etc.)
a. For example, the indication of enabling Joint Cb-Cr Residue (JCCR) may not be signaled if the color format is 4:0:0. An exemplary syntax design is as below:

```
if( ChromaArrayType ! = 0 )
   sps_joint_cbcr_enabled_flag          u(1)
```

Downsampling Filter Type for Chroma Blending Mask Generation in TPM/GEO
38. The type of downsampling filter used for blending weights derivation for chroma samples may be signalled at video unit level (such as SPS/VPS/PPS/Picture header/Subpicture/Slice/Slice header/Tile/Brick/CTU/VPDU level).

a. In one example, a high level flag may be signaled to switch between different chroma format types of content.
   i. In one example, a high level flag may be signaled to switch between chroma format type 0 and chroma format type 2.
   ii. In one example, a flag may be signaled for specifying whether the top-left downsampled luma weights in TPM/GEO prediction mode is collocated with the top-left luma weights (i.e., chroma sample location type 0).
   iii. In one example, a flag may be signaled for specifying whether the top-left downsampled luma sample in TPM/GEO prediction mode is horizontally co-sited with the top-left luma sample but vertically shifted by 0.5 units of luma samples relatively to the top-left luma sample (i.e., chroma sample location type 2).
b. In one example, the type of downsampling filter may be signaled for 4:2:0 chroma format and/or 4:2:2 chroma format.
c. In one example, a flag may be signaled for specifying the type of chroma downsampling filter used for TPM/GEO prediction.
   i. In one example, the flag may be signaled for whether to use downsampling filter A or downsampling filter B for the chroma weights derivation in TPM/GEO prediction mode. 39. The type of downsampling filter used for blending weights derivation for chroma samples may be derived at video unit level (such as SPS/VPS/PPS/Picture header/Subpicture/Slice header/Tile/Brick/CTUNPDU level).
   a. In one example, a look up table may be defined to specify the correspondence relationship between the chroma sub sampling filter type and the chroma format types of content.
40. A specified downsampling filter may be used for TPM/GEO prediction mode in case of different chroma sample location type.
   a. In one example, chroma weights of TPM/GEO may be sub sampled from the collocated top-left luma weights in case of a certain chroma sample location type (e.g., chroma sample location type 0).
   b. In one example, in case of a certain chroma sample location type (e.g., chroma sample location type 0 or 2), a specified X-tap filter (X is a constant such as X=6 or 5) may be used for chroma weights sub sampling in TPM/GEO prediction mode.
41. In a video unit (e.g. SPS,PPS, picture header, slice header etc.), a first syntax element (such as a flag) may be signaled to indicate whether MTS is disabled for all blocks (slices/pictures).
   a. A second syntax element indicating how to apply MTS (such as enable MTS/disable MTS/implicit MTS/explicit MTS) on intra-coding blocks (slices/pictures) is signaled conditionally on the first syntax element. For example, the second syntax element is signaled only when the first syntax element indicates that MTS is not disabled for all blocks (slices/pictures).
   b. A third syntax element indicating how to apply MTS (such as enable MTS/disable MTS/implicit MTS/explicit MTS) on inter-coding blocks (slices/pictures) is signaled conditionally on the first syntax element. For example, the third syntax element is signaled only when the first syntax element indicates that MTS is not disabled for all blocks (slices/pictures).
   c. An exemplary syntax design is as below

```
...
enable_mts_flag
if( enable_mts_flag){
  mts_control_intra
  mts_control_inter
}
...
``` d. The third syntax element may be signaled conditionally on whether Sub-Block Transform (SBT) is applied or not. An exemplary syntax design is as below

```
...
if (sps_sbt_enabled_flag)
  mts_control_inter
...
``` e. An exemplary syntax design is as below

```
if (sps_isp_enabled_flag)
  sps_isp_non_dct2_enabled_flag //         u(1)
  JVET-O0495/JVET-O0569
...
sps_intra_mts_selection //                 ue(v)
JVET-O0501
sps_inter_mts_selection                    ue(v)
```

Determination of Usage of a Coding Tool X
42. The determination of whether to and/or how to enable a coding tool X may depend on the width and/height of a considering picture of one or multiple reference pictures and/or current picture.
   a. The width and/height of a considering picture of one or multiple reference pictures and/or current picture may be modified to make the determination.
   b. The considering picture may be defined by the conformance window or the scaling window as defined in JVET-P0590.
      i. The considering picture may be the whole picture.
   c. In one example, whether to and/or how to enable a coding tool X may depend on the width of a picture minus one or multiple offsets in the horizontal and/or height of a picture minus an offset in the vertical direction.
      i. In one example, the horizontal offset may be defined as the scaling_win_left_offset wherein scaling_win_left_offset may be defined as in JVET-P0590.
      ii. In one example, the vertical offset may be defined as the scaling_win_top_offset wherein scaling_win_top_offset may be defined as in JVET-P0590.
      iii. In one example, the horizontal offset may be defined as (scaling_win_right_offset+scaling_win_left_offset), wherein (scaling_win_right_offset and scaling_win_left_offset may be defined as in JVET-P0590.
      iv. In one example, the vertical offset may be defined as (scaling_win_bottom_offset+scaling_win_ top_offset), wherein scaling_win_bottom_offset and scaling_win_top_offset may be defined as in JVET-P0590.
  v. In one example, the horizontal offset may be defined as SubWidthC*(scaling_win_right_offset+scaling_win_left_offset), wherein SubWidthC, scaling_win_right_offset and scaling_win_left_offset may be defined as in JVET-P0590.
  vi. In one example, the vertical offset may be defined as SubHeightC*(scaling_win_bottom_offset+scaling_win_top_offset), wherein SubHeightC, scaling_win_bottom_offset and scaling_win_top_offset may be defined as in JVET-P0590.
d. In one example, if at least one of the two considering reference pictures have different resolution (either width or height) with current picture, the coding tool X is disabled.
  i. Alternatively, if at least one of the two output reference pictures have a dimension (either width or height) larger than that of the current picture, the coding tool X is disabled.
e. In one example, if one considering reference picture fora reference picture list L has different resolution with current picture, the coding tool X is disabled for the reference picture list L.
  i. Alternatively, if one considering reference picture fora reference picture list L has a dimension (either width or height) larger than that of the current picture, the coding tool X is disabled for the reference picture list L.
f. In one example, if two considering reference pictures of two reference picture lists are with different resolutions, the coding tool may be disabled.
  i. Alternatively, the indications of the coding tool may be conditionally signalled according to resolutions.
  ii. Alternatively, signalling of the indications of the coding tool may be skipped.
g. In one example, if two considering reference pictures of two merge candidates utilized to derive a first pairwise merge candidate for at least one reference picture list, the coding tool may be disabled, i.e. the first pairwise merge candidate is marked as unavailable.
  i. Alternatively, if two considering reference pictures of two merge candidates utilized to derive a first pairwise merge candidate for both reference picture lists, the coding tool may be disabled, i.e. the first pairwise merge candidate is marked as unavailable.
h. In one example, the decoding process of the coding tool may be modified with the consideration of picture dimension.
  i. In one example, the derivation of MVD for another reference picture list (e.g, list 1) in SMVD may be based on the resolution differences (e.g., scaling factors) of at least one of the two target SMVD reference pictures.
  ii. In one example, the derivation of pairwise merge candidate may be based on the resolution differences (e.g., scaling factors) of at least one of the two reference pictures associated with two reference pictures, e.g., linear weighted average may be applied instead of equal weights.
  i. In one example, X may be:
    i. DMVR/BDOF/PROF/SMVD/MMVD/other coding tools that refine motion/prediction at the decoder side
    ii. TMVP/other coding tools rely on temporal motion information
    iii. MTS or other transform coding tools
    iv. CC-ALF
    v. TPM
    vi. GEO
    vii. Switchable interpolation filter (e.g., alternative interpolation filter for half-pel motion compensation)
    viii. The blending process in TPM/GEO/other coding tools that split one block into multiple partitions.
    ix. A coding tool that replies on the stored information in a picture different from current picture
    x. Pairwise merge candidate (when certain conditions related to resolution are not satisfied, pairwise merge candidate is not generated)
    xi. Bi-prediction with CU-level Weights (BCW).
    xii. Weighted prediction.
    xiii. Affine prediction
    xiv. Adaptive Motion Vector Resolution (AMVR)
43. Whether to and/or how to signal the usage of a coding tool may depend on the width and/height of an considering picture of one or multiple reference pictures and/or current picture.
  j. The width and/height of a considering picture of one or multiple reference pictures and/or current picture may be modified to make the determination.
  k. The considering picture may be defined by the conformance window or the scaling window as defined in JVET-P0590.
    i. The considering picture may be the whole picture.
  l. In one example, X may be the adaptive motion vector resolution (AMVR).
  m. In one example, X may be the merge with MV differences (MMVD) method.
    i. In one example, the construction of symmetric motion vector difference reference indices may depend on the picture resolutions/indications of RPR cases for different reference pictures.
  n. In one example, X may be the symmetric MVD (SMVD) method.
  o. In one example, X may be the QT/BT/TT or other partitioning types.
  p. In one example, X may be Bi-prediction with CU-level Weights (BCW).
  q. In one example, X may be Weighted prediction.
  r. In one example, X may be Affine prediction.
  s. In one example, whether to signal the indication of usage of half-pel motion vector precision/switchable interpolation filter may depend on the resolution information/whether RPR is enabled for current block.
  t. In one example, the signalling of amvr_precision_idx may depend on the resolution information/whether RPR is enabled for current block.
  u. In one example, the signalling of sym_mvd_flag/mmvd_merge_flag may depend on the resolution information/whether RPR is enabled for current block.
  v. A conformance bitstream shall satisfy that the ½-pel MV and/or MVD precision (e.g, the alternative interpolation filter/switchable interpolation filter) is disallowed when the width and/height of a considering picture of one or multiple reference pictures is different from that of current output picture.
44. It is proposed that AMVR with ½-pel MV and/or MVD precision (or alternative interpolation filter/switchable interpolation filter) may be still enabled for a block in RPR.
   w. Alternatively, furthermore, a different interpolation filter may be applied for blocks with ½-pel or other precisions.
45. The condition check of same/different resolutions in above bullets may be replaced by adding a flag for a reference picture and checking the flags associated with reference pictures.
   x. In one example, the process of setting the flag to be true or false (i.e., to indicate whether the reference picture is RPR case or non-RPR case) may be invoked during the reference picture list construction process.
      i. For example, the following may be applied:
         fRefWidth is set equal to PicOutputWidthL of the reference picture
         RefPicList[i][j] in luma samples, where PicOutputWidthL represents the width of the considering picture of the reference picture.
         fRefWidth is set equal to PicOutputHeightL of the reference picture
         RefPicList[i][j] in luma samples, where PicOutputHeightL represents the height of the considering picture of the reference picture.

RefPicScale[i][j][0]=((fRefWidth<<14)+(PicOutputWidthL>>1))/PicOutputWidthL, where
   PicOutputWidthL represents the width of the considering picture of the current picture.

RefPicScale[i][j][1]=((fRefHeight<<14)+(PicOutputHeight>>1))/PicOutputHeightL, where PicOutputWidthL represents the height of the considering picture of the current picture RefPicIsScaled[i][j]=(RefPicScale[i][j][0]!=(1<<14))||(RefPicScale[i][j][1]!=(1<<14))

wherein RefPicList[i][j] represents the j-th reference picture in reference picture list i.
   y. In one example, when either RefPicIsScaled[0][refIdxL0] is unequal to 0 or RefPicIsScaled[1][refIdxL1] is unequal to 0, a coding tool X (e.g., DMVR/BDOF/SMVD/MMVD/SMVD/PROF/those mentioned in above bullets) may be disabled.
   z. In one example, when both RefPicIsScaled[0][refIdxL0] and RefPicIsScaled[1][refIdxL1] are unequal to 0, a coding tool X (e.g., DMVR/BDOF/SMVD/MMVD/SMVD/PROF/those mentioned in above bullets) may be disabled.
   aa. In one example, when RefPicIsScaled[0][refIdxL0] is unequal to 0, a coding tool X (e.g., PROF or those mentioned in above bullets) may be disabled for reference picture list 0.
   bb. In one example, when RefPicIsScaled[1][refIdxL1] is unequal to 0, a coding tool X (e.g., PROF or those mentioned in above bullets) may be disabled for reference picture list 1.
46. The SAD and/or threshold used by BDOF/DMVR may be dependent on the bit-depth.
   a. In one example, the calculated SAD value may be firstly shifted by a function of bit-depth before being utilized to be compared to a threshold.
   b. In one example, the calculated SAD value may be directly compared with a modified threshold which may depend on a function of bit-depth.
42. If slice_type values for all slices of a picture are equal to I (I slice), the PB slice related syntax elements may be not signaled in the picture header.
   a. In one example, syntax element (s) may be added to picture header to indicate whether the slice_type of all slices included in the specified picture are equal to I (I slice).
      i. In one example, a first syntax element may be signaled in the picture header. Whether to and/or how to signal/interpret a second syntax element informing the slice type information in the slice header of a slice associated with the picture header may depend on the first syntax element.
         1) In one example, the second syntax element may not be signaled and inferred to be a slice type, depending on the first syntax element.
         2) In one example, the second syntax element may be signaled, but it is a conformance requirement that the second syntax element must be one of several given values, depending on the first syntax element.
         3) Alternatively, the first syntax element may be signaled in the AU delimiter RBSP associated with the slice.
      ii. In one example, a new syntax element (e.g. pic_all_X_slices_flag) may be signaled in the picture header to indicate whether only X slice is allowed for this picture, or, whether all slices in this picture are X slices. For example, X may be I, or P or B.
         1) In one example, slice type information is not signaled in the slice header and inferred to be I-slice if the it is indicated that all slices are I-slices in the associated picture header.
      iii. In one example, a new syntax element (e.g. ph_pic_type) may be signaled in the picture header to indicate the picture type of this picture.
         1) For example, if ph_pic_type is equal to I-picture (e.g. equal to 0), slice_type of the slices in the picture may be allowed only to be equal to I.
         2) For another example, if ph_pic_type is equal to non-I picture (such as 1 or 2), slice_type of the slices in the picture may be allowed to be equal to I and/or P and/or B.
   b. In one example, the syntax element pic_type in the AU delimiter RBSP may be used to indicate whether all slices of the specified picture are equal to I.
   c. In one example, if all slices in the picture are I slices, for all slices in this picture, the syntax element slice_type in the slice header may be not signaled and inferred to be I slice (such as 2).
      i. In one example, if the syntax element (such as but not limited to pic_all_I_slices_flag, ph_pic_type, pic_type) indicates all slices included in the specified picture are equal to I, a bitstream constraint may be added to specify that the slice_type of every slice in the specified picture shall be equal to I slice.
      ii. Alternatively, if the syntax element (such as but not limited to pic_all_I_slices_flag, ph_pic_type, pic_type) indicates all slices included in the specified picture are equal to I, a bitstream constraint may be added to specify that P or B slice shall be not allowed in the specified picture.

d. If a slice/picture are W-slice/W-picture, one or multiple syntax elements (denoted as syntax element set X as specified below) in the slice header/picture header which are allowed for non-W slices may not be signalled. For example, W may be I, non-W may be B or P. In another example, W may be B, non-W may be I or P.

i. In one example, if all slices in the picture are W slices, syntax element set X in the picture header which are allowed for non-W slices may not be signalled.

ii. Alternatively, several syntax elements (denoted as set X as specified below) in the picture header may be conditionally signalled according to whether all slices in the picture are W slices.

iii. The syntax element set X may be one or more of below.
    1) In one example, X may be reference picture related syntax elements in the picture header, such as but not limited to pic_rpl_present_flag, pic_rpl_sps_flag, pic_rpl_idx, pic_poc_lsb_lt, pic_delta_poc_msb_present_flag, pic_delta_poc_msb_cycle_lt, . . . X may not be signaled and inferred to be not used if the slice/picture is signaled or inferred to be non-inter slice/picture.
    2) In one example, X may be inter slice related syntax elements in the picture header, such as but not limited to pic_log 2_diff_min_qt_min_cb_inter_slice pic_max_mtt_hierarchy_depth_inter_slice, pic_log 1_diff_max_bt_min_qt_inter_slice, pic_log 1_diff_max_tt_min_qt_inter-slice, . . . X may not be siganled and inferred to be not used if the slice/picture is signaled or inferred to be non-inter slice/picture.
    3) In one example, X may be inter prediction related syntax elements in the picture header, such as but not limited to pic_temporal_mvp_enabled_flag, mvd_l1_zero_flag, pic_six_minus_max_num_merge_cand, pic_five_minus_max_num_subblock_merge_cand, pic_fpel_mmvd_enabled_flag, pic_disable_bdog_flag, pic_disable_dmvr_flag, pic_disable prof_flag, pic_max_num_merge_cand_minus_max_num_triangle_cand, . . . X may not be siganled and inferred to be not used if the slice/picture is signaled or inferred to be non-inter slice/picture.
    4) In one example, X may be Bi-prediction related syntax elements in the picture header, such as but not limited to pic_disable_bdof_flag, pic_disable_dmvr_flag, mvd_l1_zero_flag . . . X may not be siganled and inferred to be not used if the slice/picture is signaled or inferred to be non-B slice/picture.

Limitations on Dimensions of Tile/Slice Related

43. The max tile width may be specified in the specification.
  a. For example, the max tile width may be defined as the max luma tile width in CTBs.
  b. In one example, in a video unit (e.g. SPS, PPS, picture header, slice header etc.), new syntax element(s) may be signalled to indicate the max tile width allowed in the current sequence/picture/slice/sub-picture.
  c. In one example, the max luma tile width, or max luma tile width in CTBs may be signalled.
  d. In one example, the max luma tile width may be fixed to N (such as N=1920 or 4096, etc.)
  e. In one example, different max tile width may be specified in different profiles/levels/tiers.

44. The max slice/sub-picture/tile dimensions (e.g. width and/or size, and/or length, and/or height) may be specified in the specification.
  a. For example, the max slice/sub-picture/tile dimensions may be defined as the max luma dimensions in CTBs.
  b. For example, the size of a slice/sub-picture/tile may be defined as the number of CTBs in a slice.
  c. In one example, in a video unit (e.g. SPS, PPS, picture header, slice header etc.), new syntax element(s) may be signalled to indicate the max luma slice/sub-picture/tile dimensions allowed in the current sequence/picture/slice/sub-picture.
  d. In one example, the max luma slice/sub-picture width/height or max luma slice/sub-picture width/height in CTBs may be signalled for rectangular slices/sub-picture.
  e. In one example, the max luma slice size (such as width*height) or max luma slice size in CTBs may be signalled for raster scan slices.
  f. In one example, the max luma slice/sub-picture size (such as width*height) or max luma slice/sub-picture size in CTBs may be signalled for both rectangular slices/sub-picture and raster scan slices.
  g. In one example, the max luma slice length or max luma slice length in CTBs may be signalled for raster scan slices.
  h. In one example, the max luma slice/sub-picture width/height may be fixed to N (such as N=1920 or 4096, etc.)
  i. In one example, the max luma slice/sub-picture size (such as width*height) may be fixed to N (such as N=2073600 or 83388608, etc.)
  j. In one example, different max slice/sub-picture dimensions may be specified in different profiles/levels/tiers.
  k. In one example, the maximum number of slice/sub-picture/tile to be partitioned in a picture/sub-picture may be specified in the specification.
    i. The maximum number may be signalled.
    ii. The maximum number may be different in different profiles/levels/tiers.

45. Suppose the width and height of the current picture are denoted as PW and PH, respectively; the width and height of scaling window of the current picture are denoted as SW and SH, respectively; the width and height of scaling window of the reference picture are denoted as SW' and SH', respectively; the width and height of the allowed maximum picture are denoted as Wmax and Hmax. For convenience, let $$rw = \frac{SW'}{SW}, Rw = \frac{Wmax}{PW},$$

$$Qw = \frac{PW'}{PW} rh = \frac{SH'}{SH} \text{ and } Rh = \frac{Hmax}{PH}, Qh = \frac{PH'}{PH}.$$

At least one of the constrains below shall be followed by a conformance bit-stream. The constrains below should not be understood in a narrow way. For example, the constrain (a/b)>=(c/d), wherein a, b, c, d are integers greater than 0, can also be understood as (a/b)−(c/d)>=0, or a*d>=c*b or a*d−c*d>=0.

a. a×Wmax×SW−(b×SW'+c×SW)×PW+offw≥0, wherein a, b, c and offw are integers. For example, a=135, b=128, c=7 and offw=0.

b. d×Hmax×SH−(e×SH'+f×SH)×PH+offh≥0, wherein d, e, f are integers. For example, d=135, e=128,f=7 and offh=0.

c. a×Wmax×SW−b×SW'×PW+offw≥0, wherein a, b are integers. For example, a=1, b=1 and offw=0.

d. d×Hmax×SH−e×SH'×PH+offh≥0, wherein d, e are integers. For example, d=1, e=1 and offh=0.

e. $$rw \le Rw + \frac{Lw \times (Rw - 1)}{Bw} + offw,$$

wherein Lw, Bw and offw are integers. For example, Lw=7, Bw=128 and offw=0.

f. $$rh \le Rh + \frac{Lh \times (Rh - 1)}{Bh} + offh,$$

wherein Lh, Bh and offh are integers. For example, Lh=7, Bh=128 and offh=0.

g. rw≤a*Rw+offw, wherein a and offw are integers. For example, a=1 and offw=0.

h. rh≤b*Rh+offh, wherein b and offh are integers. For example, b=1 and offh=0.

i. rw≤a*Qw+offw, wherein a and offw are integers. For example, a=1 and offw=0.

j. rh≤b*Qh+offh, wherein b and offh are integers. For example, b=1 and offh=0.

46. QP related information (such as delta QP) may be signaled in picture header, but not in PPS.

a. In one example, the QP related information (such as delta QP) is specified for a specific coding tool, such as Adaptive Color Transform (ACT).

5. Additional Embodiments

The working draft specified in JVET-O2001-vE may be changed in embodiments as below. Text changes in the VVC draft are shown in underlined bold italicized font in the tables below, and deletions are shown within double bolded brackets, e.g., [[a]] indicates that "a" has been deleted.

5.1. Embodiment of Constrains on the Conformance Window conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidth*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

PicOutputWidthL=pic_width_in_luma_samples−SubWidthC*(conf_win_right_offset+conf_win_left_offset) (7-43)

PicOutputHeightL=pic_height_in_pic_size_units−SubHeightC*(conf_win_bottom_offset+conf_win_top_offset) (7-44)

When ChromaArrayType is not equal to 0, the corresponding specified samples of the two chroma arrays are the samples having picture coordinates (x/SubWidthC, y/SubHeightC), where (x, y) are the picture coordinates of the specified luma samples. ***Let refPicOutputWidthL and refPicOutputHeightL be the PicOutputWidthL and PicOutputHeight, respectively, of a reference picture of a current picture referring to this PPS. It is a requirement of bitstream conformance that all of the following conditions are satisfied: - PicOutputWidthL* 2 shall be greater than or equal to refPicOutputWidthL. - PicOutputHeightL* 2 shall be greater than or equal to refPicOutputHeightL. PicOutputWidthL shall be less than or equal to refPicOutputWidthL * 8. PicOutputHeightL shall be less than or equal to refPicOutputHeightL * 8.***

5.2. Embodiment 1 of Reference Sample Position Derivation 8.5.6.3.1 General The variable fRefWidth is set equal to the PicOutputWidthL of the reference picture in luma samples. The variable fRefHeight is set equal to PicOutputHeightL of the reference picture in luma samples. *The variable fRefLeftOff is set equal to the conf_win_left_offset of the reference picture in luma samples. The variable fRefTopOff is set equal to the conf_win_top_offset of the reference picture in luma samples.* The motion vector mvLX is set equal to (refMvLX−mvOffset).

If cIdx is equal to 0, the following applies:

The scaling factors and their fixed-point representations are defined as hori_scale_fp=((fRefWidth<<14)+(PicOutputWidthL>>1))/PicOutputWidthL (8-753)

vert_scale_fp=((fRefHeight<<14)+(PicOutputHeightL>>1))/PicOutputHeightL (8-754)

Let $(xInt_L, yIntL)$ be a luma location given in full-sample units and (xFracL, yFracL) be an offset given in $\frac{1}{16}$-sample units. These variables are used only in this clause for specifying fractional-sample locations inside the reference sample arrays refPicLX.

The top-left coordinate of the bounding block for reference sample padding $(xSbInt_L, ySbInt_L)$ is set equal to (xSb+(mvLX[0]>>4), ySb+(mvLX[1]>>4)).

For each luma sample location ($x_L$=0 ... sbWidth−1+brdExtSize, $y_L$=0 ... sbHeight−1+brdExtSize) inside the prediction luma sample array predSamplesLX, the corresponding prediction luma sample value predSamplesLX[$x_L$][ $y_L$] is derived as follows:
Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

$$refxSb_L = (((\underline{x\ Sb - conf\ winleft\ offset}) << 4) + refMvLX[0]) * \quad (8-755)$$
$$\text{hori\_scale\_fp}$$

$$refx_L = ((Sign(refxSb) * ((Abs(refxSb) + 128) >> 8) + \quad (8-756)$$
$$x_L * ((\text{hori\_scale\_fp} + 8) >> 4)) + 32) >> 6$$

$$refySb_L = \quad (8-757)$$
$$(((\underline{ySb - conf\ wintop\ offset}) << 4) + refMvLX[1]) * \text{vert\_scale\_fp}$$

$$refy_L = ((Sign(refySb) * ((Abs(refySb) + 128) >> 8) + \quad (8-758)$$
$$yL * ((\text{vert\_scale\_fp} + 8) >> 4)) + 32) >> 6$$

–*refx$_L$* = *refx$_L$* ± *( fRefLeftOff<<4)*.

–*refy$_L$* = *refy$_L$* ± *( fRefTopOff<<4)*.

The variables xInt$_L$, yInt$_L$, xFrac$_L$, and yFrac$_L$ are derived as follows:

xInt$_L$=refx$_L$>>4   (8-759)

yInt$_L$=refy$_L$>>4   (8-760)

xFrac$_L$=refx$_L$ & 15   (8-761)

yFrac$_L$=refy$_L$ & 15   (8-762)

If bdofFlag is equal to TRUE or (sps_affine_prof_enabled_flag is equal to TRUE and inter_affine_flag [xSb][ySb] is equal to TRUE), and one or more of the following conditions are true, the prediction luma sample value predSamplesLX[$x_L$][ $y_L$] is derived by invoking the luma integer sample fetching process as specified in clause 8.5.6.3.3 with (xInt$_L$+(xFrac$_L$>>3)−1), yInt$_L$, +(yFrac$_L$>>3)−1) and refPicLX as inputs.
  $x_L$ is equal to 0.
  $x_L$ is equal to sbWidth+1.
  $y_L$ is equal to 0.
  $y_L$ is equal to sbHeight+1.
Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), (xSbInt$_L$, ySbInt$_L$), refPicLX, hpelIfIdx, sbWidth, sbHeight and (xSb, ySb) as inputs.
Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:
Let (refxSb$_C$, refySb$_C$) and (refx$_C$, refy$_C$) be chroma locations pointed to by a motion vector (mvLX[0], mvLX[1]) given in 1/32-sample units. The variables refxSb$_C$, refySb$_C$, refx$_C$ and refy$_C$ are derived as follows:

$$refxSb_C = \quad (8-763)$$
$$(((\underline{xSb - conf\ win\ left\ offset})/SubWidthC << 5) + mvLX[0]) *$$
$$\text{hori\_scale\_fp}$$

$$refx_C = ((Sign(refxSb_C) * ((Abs(refxSb_C) + 256) >> 9) + \quad (8-764)$$
$$xC * ((\text{hori\_scale\_fp} + 8) >> 4)) + 16) >> 5$$

$$refySb_C = \quad (8-765)$$
$$(((\underline{ySb - conf\ win\ top\ offset})/SubHeightC << 5) + mvLX[1]) *$$
$$\text{vert\_scale\_fp}$$

$$refy_C = ((Sign(refySb_C) * ((Abs(refySb_C) + 256) >> 9) + \quad (8-766)$$
$$yC * ((\text{vert\_scale\_fp} + 8) >> 4)) + 16) >> 5$$

–*refx$_C$* = *refx$_C$* +*( fRefLeftOff/ SubWidthC<< 5)*.

–*refy$_C$* = *refy$_C$* +*( fRefTopOff/ SubHeightC<< 5)*.

The variables xInt$_C$, yInt$_C$, xFrac$_C$ and yFrac$_C$ are derived as follows:

xInt$_C$=refx$_C$>>5   (8-767)

yInt$_C$=refy$_C$>>5   (8-768)

xFrac$_C$=refy$_C$ & 31   (8-769)

yFrac$_C$=refy$_C$ & 31   (8-770)

5.3. Embodiment 2 of Reference Sample Position Derivation

8.5.6.3.1 General

The variable fRefWidth is set equal to the PicOutputWidthL of the reference picture in luma samples. The variable fRefHeight is set equal to PicOutputHeightL of the reference picture in luma samples. *The variable fRefLeftOff is set equal to the conf_win left offset of the reference picture in luma samples. The variable fRef TopOff is set equal to the conf_win top offset of the reference picture in luma samples.*
The motion vector mvLX is set equal to (refMvLX−mvOffset).
  If cIdx is equal to 0, the following applies:
   The scaling factors and their fixed-point representations are defined as $$\text{hori\_scale\_fp}=((\text{fRefWidth}<<14)+(\text{PicOutputWidthL}>>1))/\text{PicOutputWidthL} \quad (8-753)$$

$$\text{vert\_scale\_fp}=((\text{fRefHeigh}<<14)+(\text{PicOutputHeightL}>>1))/\text{PicOutputHeightL} \quad (8-754)$$

Let (xInt$_L$, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding (xSbInt$_L$, ySbInt$_L$) is set equal to (xSb+(myLX[0]>>4), ySb+(myLX[1]>>4)).

For each luma sample location (x$_L$=0 . . . sbWidth−1+brdExtSize, y$_L$=0 . . . sbHeight−1+brdExtSize) inside the prediction luma sample array predSamplesLX, the corresponding prediction luma sample value predSamplesLX[x$_L$][y$_L$] is derived as follows:

Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

$$refxSb_L = ((( \underline{xSb - conf\_win\_left\_offset}) << 4) + refMvLX[0]) * \text{hori\_scale\_fp} \quad (8\text{-}755)$$

$$refx_L = ((\text{Sign}(refxSb) * ((\text{Abs}(refxSb) + 128) >> 8) + x_L * ((\text{hori\_scale\_fp} + 8) >> 4)) \underline{+ (\mathit{RefLeftOff} << 10)} + 32) >> 6 \quad (8\text{-}756)$$

$$refySb_L = ((( \underline{ySb - conf\_win\_top\_offset}) << 4) + refMvLX[1]) * \text{vert\_scale\_fp} \quad (8\text{-}757)$$

$$refy_L = ((\text{Sign}(refySb) * ((\text{Abs}(refySb) + 128) >> 8) + yL * ((\text{vert\_scale\_fp} + 8) >> 4)) \underline{\pm (\mathit{RefTopOff} << 10)} + 32) >> 6 \quad (8\text{-}758)$$

The variables xInt$_L$, yInt$_L$, xFrac$_L$, and yFrac$_L$ are derived as follows:

xInt$_L$=refx$_L$>>4 (8-759)

yInt$_L$=refy$_L$>>4 (8-760)

xFrac$_L$=refx$_L$ & 15 (8-761)

yFrac$_L$=refy$_L$ & 15 (8-762)

If bdofFlag is equal to TRUE or (sps_affine_prof_enabled_flag is equal to TRUE andLX[xL][yL] is inter_affine_flag[xSb][ySb] is equal to TRUE), and one or more of the following conditions are true, the prediction luma sample value predSamplesLX[x$_L$][yL] is derived by invoking the luma integer sample fetching process as specified in clause 8.5.6.3.3 with (xInt$_L$+(xFrac$_L$>>3)−1), yInt$_L$+(yFrac$_L$>>3)−1) and refPicLX as inputs.

x$_L$ is equal to 0.
x$_L$ is equal to sbWidth+1.
y$_L$ is equal to 0.
y$_L$ is equal to sbHeight+1.

Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), (xSbInt$_L$, ySbInt$_L$), refPicLX, hpelIfIdx, sbWidth, sbHeight and (xSb, ySb) as inputs.

Otherwise (cIdx is not equal to 0), the following applies:

Let (xIntC, yIntC) be a chromalocation given in full-sample units and (xFracC, yFracC) bean offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[]>>5)).

For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is) derived as follows:

Let (refxSb$_C$, refySb$_C$) and (refx$_C$, refy$_C$) be chroma locations pointed to by a motion vector (mvLX[0], mvLX[1]) given in 1/32)-sample units. The variables refxSb$_C$, refySb$_C$, refx$_C$ and refy$_C$ are derived as follows:

$$refxSb_C = ((( \underline{xSb - conf\_win\_left\_offset})/\text{SubWidthC} << 5) + mvLX[0]) * \text{hori\_scale\_fp} \quad (8\text{-}763)$$

$$refx_C = ((\text{Sign}(refxSb_C) * ((\text{Abs}(refxSb_C) + 256) >> 9) + xC * ((\text{hori\_scale\_fp} + 8) >> 4)) + 16) >> 5 \quad (8\text{-}764)$$

$$refySb_C = ((( \underline{ySb - conf\_win\_top\_offset})/\text{SubHeightC} << 5) + mvLX[1]) * \text{vert\_scale\_fp} \quad (8\text{-}765)$$

$$refy_C = ((\text{Sign}(refySb_C) * ((\text{Abs}(refySb_C) + 256) >> 9) + yC * ((\text{vert\_scale\_fp} + 8) >> 4)) + 16) >> 5 \quad (8\text{-}766)$$

$\underline{refx_C = refx_C + (\mathit{RefLeftOff}/\mathit{SubWidthC} << 5).}$ $\underline{refy_C = refy_C \pm (\mathit{RefTopOff}/\mathit{SubHeightC} << 5).}$ The variables xInt$_C$, yInt$_C$, xFrac$_C$ and yFrac$_C$ are derived as follows:

xInt$_C$=refx$_C$>>5 (8-767)

yInt$_C$=refy$_C$>>5 (8-768)

xFrac$_C$=refy$_C$ & 31 (8-769)

yFrac$_C$=refy$_C$ & 31 (8-770)

5.4. Embodiment 3 of Reference Sample Position Derivation 8.5.6.3.1 General

The variable fRefWidthis set equal to the PicOutputWidthL of the reference picture in luma samples.

The variable fRefHeight is set equal to PicOutputHeightL of the reference picture in luma samples.

*The variable fRefLeftOff is set equal to the conf_win_left_offset of the reference picture in luma samples. The variable fRefTopOff is set equal to the conf_win_top_offset of the reference picture in luma samples.*

The motion vector mvLX is set equal to (refMvLX−mvOffset).

If cIdx is equal to 0, the following applies:

The scaling factors and their fixed-point representations are defined as hori_scale_fp=((fRefWidth<<14)+(PicOutputWidthL>>1))/PicOutputWidthL (8-753)

vert_scale_fp=((fRefHeight<<14)+(PicOutputHeightL>>1))/PicOutputHeightL (8-754)

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding (xSbInt$_L$, ySbInt$_L$) is set equal to (xSb+(mvLX[0]>>4), ySb+(mvLX[1]>>4)).

For each luma sample location (x$_L$=0 ... sbWidth−1+brdExtSize, y$_L$=0 ... sbHeight−1+brdExtSize) inside the prediction luma sample array predSamplesLX, the corresponding prediction luma sample value predSamplesLX[x$_L$][y$_L$] is derived as follows:

Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

$$refxSb_L = (((\underline{(xSb-conf\_winleft\_offset)}) << 4) + refMvLX[0]) * \text{hori\_scale\_fp} \quad (8\text{-}755)$$

$$refx_L = ((Sign(refxSb) * ((Abs(refxSb) + 128) >> 8) + x_L * ((\text{hori\_scale\_fp} + 8) >> 4)) \underline{+ (fRefLeftOff << 10)} + 32) >> 6 \quad (8\text{-}756)$$

$$refySb_L = (((\underline{(ySb-conf\_wintop\_offset)}) << 4) + refMvLX[1]) * \text{vert\_scale\_fp} \quad (8\text{-}757)$$

$$refy_L = ((Sign(refySb) * ((Abs(refySb) + 128) >> 8) + y_L * ((\text{vert\_scale\_fp} + 8) >> 4)) \underline{\pm (fRefTopOff << 10)} + 32) >> 6 \quad (8\text{-}758)$$

The variables xInt$_L$, yInt$_L$, xFrac$_L$ and yFrac$_L$ are derived as follows:

xInt$_L$=refx$_L$>>4 (8-759)

yInt$_L$=refy$_L$>>4 (8-760)

xFrac$_L$=refx$_L$ & 15 (8-761)

yFrac$_L$=refy$_L$ & 15 (8-762)

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[x$_L$][y$_L$] is derived by invoking the luma integer sample fetching process as specified in clause 8.5.6.3.3 with (xInt$_L$+(xFrac$_L$>>3)−1), yInt$_L$+(yFrac$_L$>>3)−1) and refPicLX as inputs.

x$_L$ is equal to 0.
x$_L$ is equal to sbWidth+1.
y$_L$ is equal to 0.
y$_L$ is equal to sbHeight+1.

Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), (xSbInt$_L$, ySbInt$_L$), refPicLX, hpelIfIdx, sbWidth, sbHeight and (xSb, ySb) as inputs.

Otherwise (cIdx is not equal to 0), the following applies:

Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:

Let (refxSb$_C$, refySb$_C$) and (refx$_C$, refy$_C$) be chroma locations pointed to by a motion vector (mvLX[0], mvLX[1]) given in 1/32-sample units. The variables refxSb$_C$, refySb$_C$, refx$_C$ and refy$_C$ are derived as follows:

$$refxSb_C = (((\underline{(xSb-conf\_winleft\_offset)}/SubWidthC << 5) + mvLX[0]) * \text{hori\_scale\_fp} \quad (8\text{-}763)$$

$$refx_C = ((Sign(refxSb_C) * ((Abs(refxSb_C) + 256) >> 9) + xC * ((\text{hori\_scale\_fp} + 8) >> 4)) \pm \underline{(fRefLeftOff/SubWidthC << 10)} + 16) >> 5 \quad (8\text{-}764)$$

$$refySb_C = (((\underline{(ySb-conf\_wintop\_offset)}/SubHeightC << 5) + mvLX[1]) * \text{vert\_scale\_fp} \quad (8\text{-}765)$$

$$refy_C = ((Sign(refySb_C) * ((Abs(refySb_C) + 256) >> 9) + yC * ((\text{vert\_scale\_fp} + 8) >> 4)) \pm \underline{(fRefTopOff/SubHeightC << 10)} + 16) >> 5 \quad (8\text{-}766)$$

The variables xInt$_C$, yInt$_C$, xFrac$_C$ and yFrac$_C$ are derived as follows:

xInt$_C$=refx$_C$>>5 (8-767)

yInt$_C$=refy$_C$>>5 (8-768)

xFrac$_C$=refy$_C$ & 31 (8-769)

yFrac$_C$=refy$_C$ & 31 (8-770)

5.5. Embodiment 1 of Reference Sample Position Clipping 8.5.6.3.1 General

Inputs to this process are:
- a luma location (xSb, y Sb) specifyingthe top-left sample of the current coding subblock relative to the top-left luma sample of the current picture,
- a variable sbWidth specifying the width of the current coding subblock,
- a variable sbHeight specifying the height of the current coding subblock, a motion vector offset mvOffset,
a refined motion vector refMvLX,
the selected reference picture sample array refPicLX,
the half sample interpolation filter index hpelIfIdx,
the bi-directional optical flow flag bdofFlag,
a variable cIdx specifying the colour component index of the current block.

Outputs of this process are:
an (sbWidth+brdExtSize)×(sbHeight+brdExtSize) array predSamplesLX of prediction sample values.

The prediction block border extension size brdExtSize is derived as follows:

brdExtSize=(bdofFlag||(inter_affine_flag[xSb][ySb]
&& sps_affine_prof_enabled_flag))?2:0  (8-752)

The variable fRefWidth is set equal to the PicOutputWidthL of the reference picture in luma samples. The variable fRefHeight is set equal to PicOutputHeightL of the reference picture in luma samples. The motion vector mvLX is set equal to (refMvLX−mvOffset).

If cIdx is equal to 0, the following applies:
The scaling factors and their fixed-point representations are defined as hori_scale_fp=((fRefWidth<<14)+(PicOut-
putWidthL>>1))/PicOutputWidthL  (8-753)

vert_scale_fp=((fRefHeight<<14)+(PicOut-
putHeightL>>1))/PicOutputHeightL  (8-754)

Let ($xInt_L$, $yInt_L$) be a luma location given in full-sample units and (xFracL, yFracL) be an offset given in 1/16-sample units. These variables are used only in this clause for specifying fractional-sample locations inside the reference sample arrays refPicLX.

The top-left coordinate of the bounding block for reference sample padding ($xSbInt_L$, $ySbInt_L$) is set equal to (xSb+(mvLX[0]>>4), ySb+(mvLX[1]>>4)).

For each luma sample location ($x_L$=0 . . . sbWidth−1+brdExtSize, $y_L$=0 . . . sbHeight−1+brdExtSize) inside the prediction luma sample array predSamplesLX, the corresponding prediction luma sample value predSamplesLX[$x_L$][$y_L$] is derived as follows:
Let (refx $Sb_L$, $refySb_L$) and ($refx_L$, $refy_L$) be luma locations pointed to by a motion vector (refMvLX[0], refMvLX[1]) given in 1/16-sample units. The variables $refxSb_L$, $refx_L$, $refySb_L$, and $refy_L$ are derived as follows:

$$refxSb_L = ((xSb<<4) + refMvLX[0]) * \text{hori\_scale\_fp} \quad (8\text{-}755)$$

$$refx_L = ((\text{Sign}(refxSb)*((\text{Abs}(refxSb) + 128) >> 8) + \quad (8\text{-}756)$$
$$x_L * ((\text{hori\_scale\_fp} + 8) >> 4)) + 32) >> 6$$

$$refySb_L = ((ySb<<4) + refMvLX[1]) * \text{vert\_scale\_fp} \quad (8\text{-}757)$$

$$refyL = ((\text{Sign}(refySb)*((\text{Abs}(refySb) + 128) >> 8) + \quad (8\text{-}758)$$
$$yL * ((\text{vert\_scale\_fp} + 8) >> 4)) + 32) >> 6$$

The variables $xInt_L$, $yInt_L$, $xFrac_L$ and $yFrac_L$ are derived as follows:

$xInt_L$= _Clip3( 0, fRefWidth - 1, refxL_>>4)  (8-759)

$yInt_L$= _Clip3( 0, fRefHeight -1, refyL_>>4)  (8-760)

xFrac$_L$=refx$_L$ & 15  (8-761)

yFrac$_L$=refy$_L$ & 15  (8-762)

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with ($xInt_L$+($xFrac_L$>>3)−1), $yInt_L$+($yFrac_L$>>3)−1) and refPicLX as inputs.
$x_L$ is equal to 0.
$x_L$ is equal to sbWidth+1.
$y_L$ is equal to 0.
$y_L$ is equal to sbHeight+1.

Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), ($xSbInt_L$, $ySbInt_L$), refPicLX, hpelIfIdx, sbWidth, sbHeight and (xSb, ySb) as inputs.

Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
Let ($refxSb_C$, $refySb_C$) and ($refx_C$, $refy_C$) be chroma locations pointed to by a motion vector (mvLX[0], mvLX[1]) given in 1/32-sample units. The variables $refxSb_C$, $refySb_C$, $refx_C$ and $refy_C$ are derived as follows:

$$refxSb_C = ((xSb/SubWidthC<<5) + mvLX[0]) * \text{hori\_scale\_fp} \quad (8\text{-}763)$$

$$refx_C = ((\text{Sign}(refxSb_C)*((\text{Abs}(refxSb_C) + 256) >> 9) + \quad (8\text{-}764)$$
$$xC * ((\text{hori\_scale\_fp} + 8) >> 4)) + 16) >> 5$$

$$refySb_C = ((ySb/SubHeightC<<5) + mvLX[1]) * \text{vert\_scale\_fp} \quad (8\text{-}765)$$

$$refy_C = ((\text{Sign}(refySb_C)*((\text{Abs}(refySb_C) + 256) >> 9) + \quad (8\text{-}766)$$
$$yC * ((\text{vert\_scale\_fp} + 8) >> 4)) + 16) >> 5$$

The variables $xInt_C$, $yInt_C$, $xFrac_C$ and $yFrac_C$ are derived as follows:

xInt$_C$= **_Clip3 (0, fRefWidth/
SubWidthC -1, refxC_**>>5)  (8-767)

yInt$_C$= **_Clip3 ( 0, fRefHeight/
SubHeightC - 1, refyC_**>>5)  (8-768)

xFrac$_C$=refy$_C$ & 31  (8-769)

yFrac$_C$=refy$_C$ & 31  (8-770)

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight and refPicLX as inputs.

5.6. Embodiment 2 of Reference Sample Position Clipping 8.5.6.3.1 General
Inputs to this process are:
 a luma location (xSb, ySb) specifyingthe top-left sample of the current coding subblock relative to the top-left luma sample of the current picture,
 a variable sbWidth specifying the width of the current coding subblock,
 a variable sbHeight specifying the height of the current coding subblock,
 a motion vector offset mvOffset,
 a refined motion vector refMvLX,
 the selected reference picture sample array refPicLX,
 the half sample interpolation filter index hpelIfIdx,
 the bi-directional optical flow flag bdofFlag,
 a variable cIdx specifying the colour component index of the current block.
Outputs of this process are:
 an (sbWidth+brdExtSize)×(sbHeight+brdExtSize) array predSamplesLX of prediction sample values.
The prediction block border extension size brdExtSize is derived as follows:

brdExtSize=(bdofFlag||(inter_affine_flag[xSb][ySb] && sps_affine_prof_enabled_flag))?2:0  (8-752)

The variable fRefWidth is set equal to the PicOutputWidthL of the reference picture in luma samples. The variable fRefHeight is set equal to PicOutputHeightL of the reference picture in luma samples. *The variable fRefLeftOff is set equal to the conf_win_left_offset of the reference picture in luma samples.*
*The variable fRefTopOff is set equal to the conf_win_top_offset of the reference picture in luma samples.*
The motion vector mvLX is set equal to (refMvLX−mvOffset).
 If cIdx is equal to 0, the following applies:
  The scaling factors and their fixed-point representations are defined as hori_scale_fp=((fRefWidth<<14)+(PicOutputWidthL>>1))/PicOutputWidthL  (8-753)

vert_scale_fp=((fRefHeight<<14)+(PicOutputHeightL>>1))/PicOutputHeightL  (8-754)

Let (xInt$_L$, yIntL) be a luma location given in full-sample units and (xFracL, yFracL) be an offset given in 1/16-sample units. These variables are used only in this clause for specifying fractional-sample locations inside the reference sample arrays refPicLX.
 The top-left coordinate of the bounding block for reference sample padding (xSbInt$_L$, ySbInt$_L$) is set equal to (xSb+(mvLX[0]>>4), ySb+(mvLX[1]>>4)).
 For each luma sample location (x$_L$=0 . . . sbWidth−1+brdExtSize, y$_L$=0 . . . sbHeight−1+brdExtSize) inside the prediction luma sample array predSamplesLX, the corresponding prediction luma sample value predSamplesLX[x$_L$][y$_L$] is derived as follows:
  Let (refx Sb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

$$refxSb_L = ((xSb<<4) + refMvLX[0])*hori\_scale\_fp \quad (8\text{-}755)$$

$$refx_L = ((Sign(refxSb)*((Abs(refxSb) + 128) >> 8) + \quad (8\text{-}756)$$
$$x_L*((hori\_scale\_fp + 8) >> 4)) + 32) >> 6$$

$$refySb_L = ((ySb<<4) + refMvLX[1])*vert\_scale\_fp \quad (8\text{-}757)$$

$$refyL = ((Sign(refySb)*((Abs(refySb) + 128) >> 8) + \quad (8\text{-}758)$$
$$yL*((vert\_scale\_fp + 8) >> 4)) + 32) >> 6$$

The variables xInt$_L$, yInt$_L$, xFrac$_L$ and yFrac$_L$ are derived as follows:

xInt$_L$= *Clip3( fRefLeftOff, fRefLeftOff+*
*fRefWidth - 1, refxL*>>4)  (8-759)

yInt$_L$= *Clip3( fRefTopOff, fRefTopOff +*
*-fRefHeight -1, refyL* >>4)  (8-760)

xFrac$_L$=refx$_L$ & 15  (8-761)

yFrac$_L$=refy$_L$ & 15  (8-762)

If bdofFlag is equal to TRUE or (sps_affine_prof_enabled_flag is equal to TRUE and inter_affine_flag [xSb][ySb] is equal to TRUE), and one or more of the following conditions are true, the prediction luma sample value predSamplesLX[x$_L$][y$_L$] is derived by invoking the luma integer sample fetching process as specified in clause 8.5.6.3.3 with (xInt$_L$+(xFrac$_L$>>3)−1), yInt$_L$ (yFrac$_L$>>3)−1) and refPicLX as inputs.
  x$_L$ is equal to 0.
  x$_L$ is equal to sbWidth+1.
  yL is equal to 0.
  y$_L$ is equal to sbHeight+1.
 Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), (xSbInt$_L$, ySbInt$_L$), refPicLX, hpelIfIdx, sbWidth, sbHeight and (xSb, ySb) as inputs.
Otherwise (cIdx is not equal to 0), the following applies:
 Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
 The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).
 For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
  Let (refxSb$_C$, refySb$_C$) and (refx$_C$, refy$_C$) be chroma locations pointed to by a motion vector (mvLX[0], mvLX[1]) given in $\frac{1}{32}$-sample units. The variables $refxSb_C$, $refySb_C$, $refx_C$ and $refy_C$ are derived as follows:

$$refxSb_C = ((xSb/SubWidthC << 5) + mvLX[0]) * \text{hori\_scale\_fp} \quad (8\text{-}763)$$

$$refx_C = ((\text{Sign}(refxSb_C) * ((\text{Abs}(refxSb_C) + 256) >> 9) + \quad (8\text{-}764)$$
$$xC * ((\text{hori\_scale\_fp} + 8) >> 4)) + 16) >> 5$$

$$refySb_C = ((ySb/SubHeightC << 5) + mvLX[1]) * \text{vert\_scale\_fp} \quad (8\text{-}765)$$

$$refy_C = ((\text{Sign}(refySb_C) * ((\text{Abs}(refySb_C) + 256) >> 9) + \quad (8\text{-}766)$$
$$yC * ((\text{vert\_scale\_fp} + 8) >> 4)) + 16) >> 5$$

The variables $xInt_C$, $yInt_C$, $xFrac_C$ and $yFrac_C$ are derived as follows:

$xInt_C$=*Clip3( fRefLeftOff/ SubWidthC, (fRefWidth + fRefLeftOff )/ SubWidthC* −1, *refxC* >>5)  (8-767)

$yInt_C$=*Clip3( fRefTopOff / Clip3( fRefTopOff (fRefHeight + fRefTopOff)/ SubHeightC* −1, *refyC* >>5)  (8-768)

$xFrac_C = refy_C$ & 31  (8-769)

$yFrac_C = refy_C$ & 31  (8-770)

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight and refPicLX as inputs.

5.7 Embodiment of Usage of Coding Tools

5.7.1 BDOF On/Off control

The variable currPic specifies the current picture and the variable bdofFlag is derived as follows:
  If all of the following conditions are true, bdofFlag is set equal to TRUE.
    sps_bdof_enabled_flag is equal to 1 and slice_disable_bdof_dmvr_flag is equal to 0.
    predFlagL0[xSbIdx][ySbIdx] and predFlagL1[xSbIdx][ySbIdx] are both equal to 1.
    DiffPicOrderCnt(currPic, RefPicList[0][refIdxL0]) is equal to DiffPicOrderCnt(RefPicList[1][refIdxL1], currPic).
    RefPicList[0][refIdxL0] is a short-term reference picture and RefPicList[1][refIdxL1] is a short-term reference picture.
    MotionModelIdc[xCb][yCb] is equal to 0.
    merge_subblock_flag[xCb][yCb] is equal to 0.
    sym_mvd_flag[xCb][yCb] is equal to 0.
    ciip_flag[xCb][yCb] is equal to 0.
    BcwIdx[xCb][yCb] is equal to 0.
    luma_weight_l0_flag[refIdxL0] and luma_weight_l1_flag[refIdxL1] are both equal to 0.
    cbWidth is greater than or equal to 8.
    cbHeight is greater than or equal to 8.
    cbHeight*cbWidth is greater than or equal to 128.
    *RefPicIsScaled[ 0 ][ refIdxL0 ] is equal to 0 and RefPicIsScaled[ 1 ][ refIdxL1 ] is equal to 0.*
    cIdx is equal to 0.
  Otherwise, bdofFlag is set equal to FALSE.

5.7.2 DMVR On/Off Control

When all of the following conditions are true, dmvrFlag is set equal to 1:
  sps_dmvr_enabled_flag is equal to 1 and slice_disable_bdof_dmvr_flag is equal to 0
  general_merge_flag[xCb][yCb] is equal to 1
  both predFlagL0[0][0] and predFlagL1 [0][0] are equal to 1
  mmvd_merge_flag[xCb][yCb] is equal to 0
  ciip_flag[xCb][yCb] is equal to 0
  DiffPicOrderCnt(currPic, RefPicList[0][refIdxL0]) is equal to DiffPicOrderCnt(RefPicList[1][ refIdxL1], currPic)
  RefPicList[0][refIdxL0] is a short-term reference picture and RefPicList[1][refIdxL1] is a short-term reference picture.
  BcwIdx[xCb][yCb] is equal to 0
  Both luma_weight_l0_flag[refIdxL0] and luma_weight_l1_flag[refIdxL1] are equal to 0
  cbWidth is greater than or equal to 8
  cbHeight is greater than or equal to 8
  cbHeight*cbWidth is greater than or equal to 128
  *RefPicIsScaled[ 0 ][ refIdxL0 ] is equal to 0 and RefPicIsScaled[ 1 ][ refIdxL1 ] is equal to 0.*

5.7.3 PROF On/Off Control for a Reference Picture List X

The variable cbProfFlagLX is derived as follows:
  If one or more of the following conditions are true, cbProfFlagLX is set equal to FALSE.
    sps_affine_prof_enabled_flag is equal to 0.
    fallbackModeTriggered is equal to 1.
    numCpMv is equal to 2 and cpMvLX[1][0] is equal to cpMvLX[0][0] and cpMvLX[1][1] is equal to cpMvLX[0][1].
    numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].
    *RefPicIsScaled[ X ][ refIdxLX ] is set equal to 0*
    [[The pic_width_in_luma_samples of the reference picture refPicLX associated with the refIdxLX is not equal to the pic_width_in_luma_samples of the current picture, respectively.
    The pic_height_in_luma_samples of the reference picture refPicLX associated with the refIdxLX is not equal to the pic_height_in_luma_samples of the current picture, respectively]]
  Otherwise, cbProfFlagLX set equal to TRUE.

5.7.4 PROF On/Off Control for a Reference Picture List X (A Second Embodiment)

The variable cbProfFlagLX is derived as follow:
  If one or more of the following conditions are true, cbProfFlagLX is set equal to FALSE.
    sps_affine_prof_enabled_flag is equal to 0.
    fallbackModeTriggered is equal to 1.
    numCpMv is equal to 2 and cpMvLX[1][0] is equal to cpMvLX[0][0] and cpMvLX[1][1] is equal to cpMvLX[0][1].

numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].

_RefPicIsScaled[ 0 ][ refIdxL0 ] and RefPicIsScaled[ 1 ][ refIdxL1 ] are equal to 0_

[[The pic_width_in_luma_samples of the reference picture refPicLX associated with the refIdxLX is not equal to the pic_width_in_luma_samples of the current picture, respectively.

The pic_height_in_luma_samples of the reference picture refPicLX associated with the refIdxLX is not equal to thepic_height_in_luma_samples of the current picture, respectively]]

Otherwise, cbProfFlagLX set equal to TRUE.

5.8 Embodiment of Conditionally Signal the Inter Related Syntax Elements in Picture Header (on Pop of JVET-P2001-v9)

7.3.2.6 Picture Header RBSP Syntax

| picture_header_rbsp( ) { | Descriptor |
|---|---|
| non_reference_picture_flag | u(1) |
| gdr_pic_flag | u(1) |
| no_output_of_prior_pics_flag | u(1) |
| if( gdr_pic_flag ) | |
|   recovery_poc_cnt | ue(v) |
| ph_pic_parameter_set_id | ue(v) |
| if( sps_poc_msb_flag ) { | |
|   ph_poc_msb_present_flag | u(1) |
|   if( ph_poc_msb_present_flag ) | |
|     poc_msb_val | u(v) |
| } | |
| if( sps_subpic_id_present_flag && !sps_subpic_id_signalling_flag ) { | |
|   ph_subpic_id_signalling_present_flag | u(1) |
|   if( ph_subpics_id_signalling_present_flag ) { | |
|     ph_subpic_id_len_minus1 | ue(v) |
|     for( i = 0; i <= sps_num_subpics_minus1; i++ ) | |
|       ph_subpic_id[ i ] | u(v) |
|   } | |
| } | |
| if( !sps_loop_filter_across_virtual_boundaries_disabled_present_flag ) { | |
|   ph_loop_filter_across_virtual_boundaries_disabled_present_flag | u(1) |
|   if( ph_loop_filter_across_virtual_boundaries_disabled_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( separate_colour_plane flag == 1 ) | |
|   colour_plane_id | u(2) |
| if( output_flag_present_flag ) | |
|   pic_output_flag | u(1) |
| _pic all intra slices flag //alternative solution may reuse the pic type syntax element thus no need to signal new element in picture header_ | |
| pic_rpl_present_flag | u(1) |

-continued

| picture_header_rbsp( ) { | Descriptor |
|---|---|
| if( pic_rpl_present_flag ) { | |
|   for( i = 0; i < 2; i++ ) { | |
|     if( num_ref_pic_lists_in_sps[ i ] > 0 && !pps_ref_pic_list_sps_idc[ i ] && ( i == 0 \|\| ( i == 1 && rpl1_idx_present_flag ) ) ) | |
|       pic_rpl_sps_flag[ i ] | u(1) |
|     if( pic_rpl_sps_flag[ i ] ) { | |
|       if( num_ref_pic_lists_in_sps[ i ] > 1 && ( i == 0 \|\| ( i == 1 && rpl1_idx_present_flag ) ) ) | |
|         pic_rpl_idx[ i ] | u(v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_slice_header_flag[ i ][ RplsIdx[ i ] ] ) | |
|         pic_poc_lsb_lt[ i ][ j ] | u(v) |
|       pic_delta_poc_msb_present_flag[ i ][ j ] | u(1) |
|       if( pic_delta_poc_msb_present_flag[ i ][ j ] ) | |
|         pic_delta_poc_msb_cycle_lt[ i ][ j ] | ue(v) |
|     } | |
|   } | |
| } | |
| if( partition_constraints_override_enabled_flag ) { | |
|   partition_constraints_override_flag | ue(v) |
|   if( partition_constraints_override_flag ) { | |
|     pic_log2_diff_min_qt_min_cb_intra_slice_luma | ue(v) |
|     _if (!pic all intra slices flag) //note: conditionally signal the inter slice partition related syntax_ | |
|     pic_log2_diff_min_qt_min_cb_inter_slice | ue(v) |
|     pic_max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma != 0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( pic_max_mtt_hierarchy_depth_inter_slice != 0 _**&&** !pic all intra slices flag note: conditionally signal the inter slice partition related syntax_ | |
|       pic_log2_diff_max_bt_min_qt_inter_slice | ue(v) |
|       pic_log2_diff_max_tt_min_qt_inter_slice | ue(v) |
|     } | |
|     if( qtbtt_dual_tree_intra_flag ) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma != 0 ) { | |
|         pic_log2_diff_max_bt_min_qt_intra_slice_chroma | ue(v) |

-continued

| picture_header_rbsp( ) { | Descriptor |
|---|---|
|     pic_log2_diff_max_tt_<br>      min_qt_intra_slice_chroma | ue(v) |
|     } | |
|    } | |
|   } | |
|  } | |
|  if( cu_qp_delta_enabled_flag ) { | |
|   pic_cu_qp_delta_<br>    subdiv_intra_slice | ue(v) |
| if (!pic_all_intra_slices_flag) //note:<br>conditionally signal the<br>inter slice partition<br>related syntax | |
|   pic_cu_qp_delta_<br>    subdiv_inter_slice | ue(v) |
|  } | |
|  if( cu_chroma_qp_<br>offset_enabled_flag ) { | |
|   pic_cu_chroma_qp_offset_<br>    subdiv_intra_slice | ue(v) |
| if (!pic_all_intra_slices_flag) //note:<br>conditionally signal the<br>inter slice partition<br>related syntax | |
|   pic_cu_chroma_qp_<br>    offset_subdiv_inter_slice | ue(v) |
|  } | |
| *if (!pic all intra slices flag) {//note:*<br>*conditionally signal the inter prediction related syntax* | |
|  if( sps_temporal_mvp_enabled_flag ) | |
|   pic_temporal_mvp_enabled_flag | u(1) |
|  if(!pps_mvd_l1_zero_idc ) | |
|   mvd_l1_zero_flag | u(1) |
|  if( !pps_six_minus_max_<br>num_merge_cand_plus1 ) | |
|   pic_six_minus_max_<br>    num_merge_cand | ue(v) |
|  if( sps_affine_enabled_flag ) | |
|   pic_five_minus_max_num_<br>    subblock_merge_cand | ue(v) |
|  if( sps_fpel_mmvd_enabled_flag ) | |
|   pic_fpel_mmvd_enabled_flag | u(1) |
|  if( sps_bdof_pic_present_flag ) | |
|   pic_disable_bdof_flag | u(1) |
|  if( sps_dmvr_pic_present_flag ) | |
|   pic_disable_dmvr_flag | u(1) |
|  if( sps_prof_pic_present_flag ) | |
|   pic_disable_prof_flag | u(1) |
|  if( sps_triangle_enabled_flag &&<br>MaxNumMergeCand >= 2 &&<br>!pps_max_num_merge_cand_<br>minus_max_num_<br>triangle_cand_minus1 ) | |
|   pic_max_num_merge_cand_<br>    minus_max_num_triangle_cand | ue(v) |
| } | |
|  if ( sps_ibc_enabled_flag ) | |
|   pic_six_minus_max_<br>    num_ibc_merge_cand | ue(v) |
|  if( sps_joint_cbcr_enabled_flag ) | |
|   pic_joint_cbcr_sign_flag | u(1) |
|  if( sps_sao_enabled_flag ) { | |
|   pic_sao_enabled_present_flag | u(1) |
|   if( pic_sao_enabled_<br>present_flag ) { | |
|    pic_sao_luma_enabled_flag | u(1) |
|    if(ChromaArrayType != 0 ) | |
|     pic_sao_chroma_enabled_flag | u(1) |
|   } | |
|  } | |
|  if( sps_alf_enabled_flag ) { | |
|   pic_alf_enabled_present_flag | u(1) |
|   if( pic_alf_enabled_<br>present_flag ) { | |
|    pic_alf_enabled_flag | u(1) |

-continued

| picture_header_rbsp( ) { | Descriptor |
|---|---|
|    if( pic_alf_enabled_flag ) { | |
|     pic_num_alf_aps_ids_luma | u(3) |
|     for( i = 0; i < pic_num_<br>alf_aps_ids_luma; i++ ) | |
|      pic_alf_aps_id_luma[ i ] | u(3) |
|     if( ChromaArrayType != 0 ) | |
|      pic_alf_chroma_idc | u(2) |
|     if( pic_alf_chroma_idc ) | |
|      pic_alf_aps_id_chroma | u(3) |
|    } | |
|   } | |
|  } | |
|  if ( !pps_dep_<br>quant_enabled_flag ) | |
|   pic_dep_quant_enabled_flag | u(1) |
|  if( !pic_dep_quant_enabled_flag ) | |
|   sign_data_hiding_enabled_flag | u(1) |
|  if( deblocking_filter_<br>override_enabled_flag ) { | |
|   pic_deblocking_filter_<br>    override_present_flag | u(1) |
|   if( pic_deblocking_filter_<br>override_present_flag ) { | |
|    pic_deblocking_<br>    filter_override_flag | u(1) |
|    if( pic_deblocking_<br>filter_override_flag ) { | |
|     pic_deblocking_<br>     filter_disabled_flag | u(1) |
|     if( !pic_deblocking_<br>filter_disabled_flag ) { | |
|      pic_beta_offset_div2 | se(v) |
|      pic_tc_offset_div2 | se(v) |
|     } | |
|    } | |
|   } | |
|  } | |
|  if( sps_lmcs_enabled_flag ) { | |
|   pic_lmcs_enabled_flag | u(1) |
|   if( pic_lmcs_enabled_flag ) { | |
|    pic_lmcs_aps_id | u(2) |
|    if( ChromaArrayType != 0 ) | |
|     pic_chroma_residual_scale_flag | u(1) |
|   } | |
|  } | |
|  if( sps_scaling_list_<br>enabled_flag ) { | |
|   pic_scaling_list_present_flag | u(1) |
|   if( pic_scaling_<br>list_present_flag ) | |
|    pic_scaling_list_aps_id | u(3) |
|  } | |
|  if( picture_header_<br>extension_present_flag ) { | |
|   ph_extension_length | ue(v) |
|   for( i = 0; i < ph_<br>extension_length; i++ ) | |
|    ph_extension_data_byte[ i ] | u(8) |
|  } | |
|  rbsp_trailing_bits( ) | |
| } | |

7.4.3.6 Picture Header RBSP Semantics

*pic_all_intra_slices_ flag equal to 1 specifies that all the slices in the picture are I slices.*
*pic_all_intra_slices flag equal to 0 specifies that there is at leaset one P or B slice is in the picture.*

7.3.7 Slice Header Syntax
7.3.7.1 General Slice Header Syntax

```
slice_header( ) {                                Descriptor
  slice_pic_order_cnt_lsb                        u(v)
  if( subpics_present_flag )
    slice_subpic_id                              u(v)
  if( rect_slice_flag ||
  NumTilesInPic > 1 )
    slice_address                                u(v)
  if( !rect_slice_flag &&
  NumTilesInPic > 1 )
    num_tiles_in_slice_minus1                    ue(v)
  if (!pic all intra slices flag) //note:
  when slice type is not
  signalled, it is inferred to be equal to 2 .
    slice_type                                   ue(v)
  if( !pic_rpl_present_flag &&
  ( ( nal_unit_type != IDR_W_RADL
  && nal_unit_type !=
    IDR_N_LP ) ||
    sps_idr_rpl_present_flag ) ) {
```

5.9 Embodiment of Constrains on RPR (On Top of JVET-P2001-v14)

Let refPicWidthInLumaSamples and refPicHeightInLumaSamples be the pic_width_in_luma_samples and pic_height_in_luma_samples, respectively, of a reference picture of a current picture referring to this PPS. Let refPicOutputWidthL and refPicOutputHeightL be the PicOutputWidthL and PicOutputHeightL, respectively, of the reference picture. It is a requirement of bitstream conformance that all of the following conditions are satisfied:

PicOutputWidthL*2 shall be greater than or equal to refPicOutputWidthL.
PicOutputHeightL*2 shall be greater than or equal to refPicOutputHeightL.
PicOutputWidthL shall be less than or equal to refPicOutputWidthL*8.
PicOutputHeightL shall be less than or equal to refPicOutputHeightL*8.
(PicOutputWidthL−refPicOutputWidthL)*(PicWidthInLumaSamples−refPicWidthInLumaSamples) shall be greater than or equal to 0.
(PicOutputHeightL−−refPicOutputHeightL)*(PicHeightInLumaSamples−refPicHeightInLumaSamples) shall be greater than or equal to 0.
135*pic_width_max_in_luma_samples*PicOutputWidthL−(128*refPicOutputWidthL+7*PicOutputWidthL)*PicWidthInLumaSamples shall be greater than or equal to 0.
135*pic_height_max_in_luma_samples*PicOutputHeightL−(128*refPicOutputHeightL+7*PicOutputHeightL)* PicHeightInLumaSamples shall be greater than or equal to 0.

5.10 Embodiment of Signaling of the Wraparound Offset (On Top of JVET-P2001-v14)

7.3.2.3 Sequence Parameter Set RBSP Syntax

```
seq_parameter_set_rbsp( ) {                      Descriptor
  sps_decoding_parameter_set_id                  u(4)
  sps_video_parameter_set_id                     u(4)
  ...
```

```
seq_parameter_set_rbsp( ) {                      Descriptor
  if( sps_bdpcm_enabled_flag &&
  chroma_format_idc = = 3 )
    sps_bdpcm_chroma_enabled_flag                u(1)
[ [ sps_ref_wraparound_enabled_flag              u(1)
  if( sps_ref_wraparound_
  enabled_flag )
    sps_ref_wraparound_offset_minus1             ue(v) ]]
  sps_temporal_mvp_enabled_flag                  u(1)
  ...
```

7.3.2.3 Picture Parameter Set RBSP syntax

```
pic_parameter_set_rbsp( ) {                      Descriptor
  pps_pic_parameter_set_id                       ue(v)
  pps_seq_parameter_set_id                       u(4)
  pic_width_in_luma_samples                      ue(v)
  pic_height_in_luma_samples                     ue(v)
  pps_ref_wraparound_                            u(1)
  enabled_flag
  if(_pps_ref_wraparound_
  enabled_flag )
    pps_ref_wraparound_                          ue(v)
    offset_minus1
  conformance_window_flag                        u(1)
  ...
``` pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of (CtbSizeY/MinCbSizeY+1) is less than or equal to (pic_width_in_luma_samples/MinCbSizeY−1), the value of pps_ref_wraparound_enabled_flag shall be equal to 0.

pps_ref_wraparound_offset_minus1 plus 1 specifies the offset used for computing the horizontal wrap-around position in units of MinCbSizeY luma samples. The value of pps_ref_wraparound_offset_minus1 shall be in the range of (CtbSizeY/MinCbSizeY)+1 to (pic_width_in_luma_samples/MinCbSizeY)−1, inclusive.

7.4.4.2 General Constraint Information Semantics
no_ref_wraparound_constraint_flag equal to 1 specifies that [[sps_ref_wraparound_enabled_flag]] *pps ref wraparound enabled flag* shall be equal to 0. no_ref_wraparound_constraint_flag equal to 0 does not impose such a constraint.

8.5.3.2.2 Luma Sample Bilinear Interpolation Process

Inputs to this process are:
  a luma location in full-sample units ($xInt_L$, $yInt_L$),
  a luma location in fractional-sample units ($xFrac_L$, $yFrac_L$),
  the luma reference sample array $refPicLX_L$.

The luma locations in full-sample units ($xInt_i$, $yInt_i$) are derived as follows for i=0 . . . 1:
  If subpic_treated_as_pic_flag[ SubPicIdx ] is equal to 1, the following applies:

$$xInt_i = Clip3(SubPicLeftBoundaryPos, SubPicRightBoundaryPos, xInt_L+i) \qquad (642)$$

$$yInt_i = Clip3(SubPicTopBoundaryPos, SubPicBotBoundaryPos, yInt_L+i) \qquad (643)$$

Otherwise (subpic_treated_as_pic_flag[ SubPicIdx] is equal to 0), the following applies:

xInt$_i$=Clip3(0,picW−1,[[sps_ref_wraparound_enabled_flag]] pps_ref_wraparound_enabled_flag?

ClipH(([[sps_ref_wraparound_offset_minus1]] pps_ref_wraparound_offset_minus1+1)*MinCbSizeY,picW,(xInt$_L$+i)): xInt$_L$+i)   (644)

yInt$_i$=Clip3(0,picH−1,yInt$_L$+i)   (645)

8.5.6.3.2 Luma Sample Interpolation Filtering Process
The luma locations in full-sample units (xInt$_i$, yInt$_i$) are derived as follows for i=0 . . . 7:
  If subpic_treated_as_pic_flag[ SubPicIdx] is equal to 1, the following applies:

xInt$_i$=Clip3(SubPicLeftBoundaryPos,SubPicRightBoundaryPos,xInt$_L$+i−3)   (955)

yInt$_i$=Clip3(SubPicTopBoundaryPos,SubPicBotBoundaryPos,yInt$_L$+i−3)   (956)

Otherwise (subpic_treated_as_pic_flag[ SubPicIdx] is equal to 0), the following applies:

xInt$_i$=Clip3(0,picW−1,[[sps_ref_wraparound_enabled_flag]] pps_ref_wraparound_enabled_flag?

ClipH(([[pps_ref_wraparound_offset_minus1]] pps_ref_wraparound_offset_minus1+1)*MinCbSizeY,picW,xInt$_L$+i−3): xInt$_L$+i−3)   (957)

yInt$_i$=Clip3(0,picH−1,yInt$_L$+i−3)   (958)

8.5.6.3.3 Luma Integer Sample Fetching Process
The luma locations in full-sample units (xInt, yInt) are derived as follows:
  If subpic_treated_as_pic_flag[SubPicIdx] is equal to 1, the following applies:

xInt=Clip3(SubPicLeftBoundaryPos,SubPicRightBoundaryPos,xInt$_L$)   (966)

yInt=Clip3(SubPicTopBoundaryPos,SubPicBotBoundaryPos,yInt$_L$)   (967)

Otherwise, the following applies:

xInt=Clip3(0,picW−1,[[sps_ref_wraparound_enabled_flag]] pps_ref_wraparound_enabled_flag?   (968)

ClipH(([[pps_ref_wraparound_offset_minus1]] pps_ref_wraparound_offset_minus1+1)*MinCbSizeY,picW,xInt$_L$): xInt$_L$)yInt=Clip3(0,picH−1,yInt$_L$)   (969)

8.5.6.3.4 Chroma Sample Interpolation Process
The variable xOffset is set equal to ([[pps_ref_wraparound_offset_minus1]] pps_ref_wraparound_offset_minus1+1)*MinCbSizeY)/SubWidthC.
The chroma locations in full-sample units (xInt$_i$, yInt$_i$) are derived as follows for i=0 . . . 3:
  If subpic_treated_as_pic_flag[SubPicIdx] is equal to 1, the following applies:

xInt$_i$=Clip3(SubPicLeftBoundaryPos/SubWidthC, SubPicRightBoundaryPos/SubWidthC,xInt$_L$+i)   (971)

yInt$_i$=Clip3(SubPicTopBoundaryPos/SubHeightC, SubPicBotBoundaryPos/SubHeightC,yInt$_L$+i)   (972)

Otherwise (subpic_treated_as_pic_flag[SubPicIdx] is equal to 0), the following applies:

xInt$_i$=Clip3(0,picW$_C$−1,[[sps_ref_wraparound_enabled_flag]] pps_ref_wraparound_enable_flag?ClipH(xOffset,picW$_C$,xInt$_C$+i−1): xInt$_C$+i−1)   (973)

yInt$_i$=Clip3(0,picH$_C$−1,yInt$_C$+i−1)

5.11 Embodiment of Deblocking Filtering Between Subpictures (on Top of JVET-P2001-v14)

8.8.3 Deblocking Filter Process
8.8.3.1 General
Inputs to this process are the reconstructed picture prior to deblocking, i.e., the array recPicture$_L$ and, when ChromaArrayType is not equal to 0, the arrays recPicture$_{Cb}$ and recPicture$_{Cr}$. Outputs of this process are the modified reconstructed picture after deblocking, i.e., the array recPicture$_L$ and, when ChromaArrayType is not equal to 0, the arrays recPicture$_{Cb}$ and recPicture$_{Cr}$.
The deblocking filter process is applied to all coding sub-block edges and transform block edges of a picture, except the following types of edges:
  Edges that are at the boundary of the picture,
  [[Edges that coincide with the boundaries of a subpicture for which loop_filter_across_subpic_enabled_flag[SubPicIdx] is equal to 0,]]
  Edges that coincide with the virtual boundaries of the picture when VirtualBoundariesDisabledFlag is equal to 1, 8.8.3.2 Deblocking Filter Process for one Direction
Inputs to this process are:
  the variable treeType specifying whether the luma (DUAL_TREE_LUMA) or chroma components (DUAL_TREE_CHROMA) are currently processed,
  1. The variable filterEdgeFlag is derived as follows:
    If edgeType is equal to EDGE_VER and one or more of the following conditions are true, filterEdgeFlag is set equal to 0:
      The left boundary of the current coding block is the left boundary of the picture.
      [[The left boundary of the current coding block is the left or right boundary of the subpicture and loop_filter_across_subpic_enabled_flag[SubPicIdx] is equal to 0.]]
    Otherwise, if edgeType is equal to EDGE_HOR and one or more of the following conditions are true, the variable filterEdgeFlag is set equal to 0:
      The top boundary of the current luma coding block is the top boundary of the picture.
      [[The top boundary of the current coding block is the top or bottom boundary of the subpicture and loop_filter_across_subpic_enabled_flag[SubPicIdx] is equal to 0.]]

8.8.3.6.6 Filtering Process for a Luma Sample Using Short Filters
When nDp is greater than 0 and pred_mode_plt_flag of the coding unit that includes the coding block containing the sample p$_0$ is equal to 1, nDp is set equal to 0
When nDq is greater than 0 and pred_mode_plt_flag of the coding unit that includes the coding block containing the sample q$_0$ is equal to 1, nDq is set equal to 0:

*When nDp is greater than 0 and loop filter across subpic enabled flag[ subPicIdxP ] is equal to 0, nDp is set equal to 0, wherein subPicIdxP is the subpicture index of the subpicture containing the sample $p_0$. When nDq is greater than 0 and loop filter across subpic enabled flag[ subPicIdxQ ] is equal to 0, nDq is set equal to 0, wherein subPicIdxQ is the subpicture index of the subpicture containing the sample $q_0$.*

8.8.3.6.7 Filtering Process for a Luma Sample Using Long Filters

When pred_mode_plt_flag of the coding unit that includes the coding block containing the sample $p_i$ is equal to 1, the filtered sample value, $p_i'$ is substituted by the corresponding input sample value $p_i$ with i=0 . . . maxFilterLengthP−1. When pred_mode_plt_flag of the coding unit that includes the coding block containing the sample $q_i$ is equal to 1, the filtered sample value, $q_i'$ is substituted by the corresponding input sample value $q_j$ with j=0 . . . maxFilterLengthQ−1. *When loop filter across subpic enabled flag[ subPicIdxP ] is equal to 0, wherein subPicIdxP is the subpicture index of the subpicture containing the sample $p_0$, the filtered sample value, $p_i'$ is substituted by the corresponding input sample value $p_i$ with i =0 . . . maxFilterLengthP - 1. When loop filter across subpic enabled flag[ subPicIdxQ ] is equal to 0, wherein subPicIdxQ is the subpicture index of the subpicture containing the sample $q_0$, the filtered sample value, $q_i'$ is substituted by the corresponding input sample value $q_i$ with j =0 . . . maxFilterLengthQ− 1.*

8.8.3.6.9 Filtering Process for a Chroma Sample

When pred_mode_plt_flag of the coding unit that includes the coding block containing the sample $p_i$ is equal to 1, the filtered sample value, $p_i'$ is substituted by the corresponding input sample value $p_i$ with i=0 . . . maxFilterLengthP−1. When pred_mode_plt_flag of the coding unit that includes the coding block containing the sample $q_i$ is equal to 1, the filtered sample value, $q_i'$ is substituted by the corresponding input sample value $q_i$ with i=0 . . . maxFilterLengthQ−1: *When loop filter across subpic enabled flag[subPicIdxP ] is equal to 0, wherein subPicIdxP is the subpicture index of the subpicture containing the sample $p_0$, the filtered sample value, $p_i'$ is substituted by the corresponding input sample value, $p_i'$ =0 . . . maxFilterLengthP - 1. When loop filter across subpic enabled flag[ subPicIdxQ ] is equal to 0, wherein subPicIdxQ is the subpicture index of the subpicture containing the sample $q_0$, the filtered sample value, $q_i'$ is substituted by the corresponding input sample value $q_i$ with i =0 . . . maxFilterLengthQ - 1:*

6. Example Implementations of the Disclosed Technology

Figure 7:
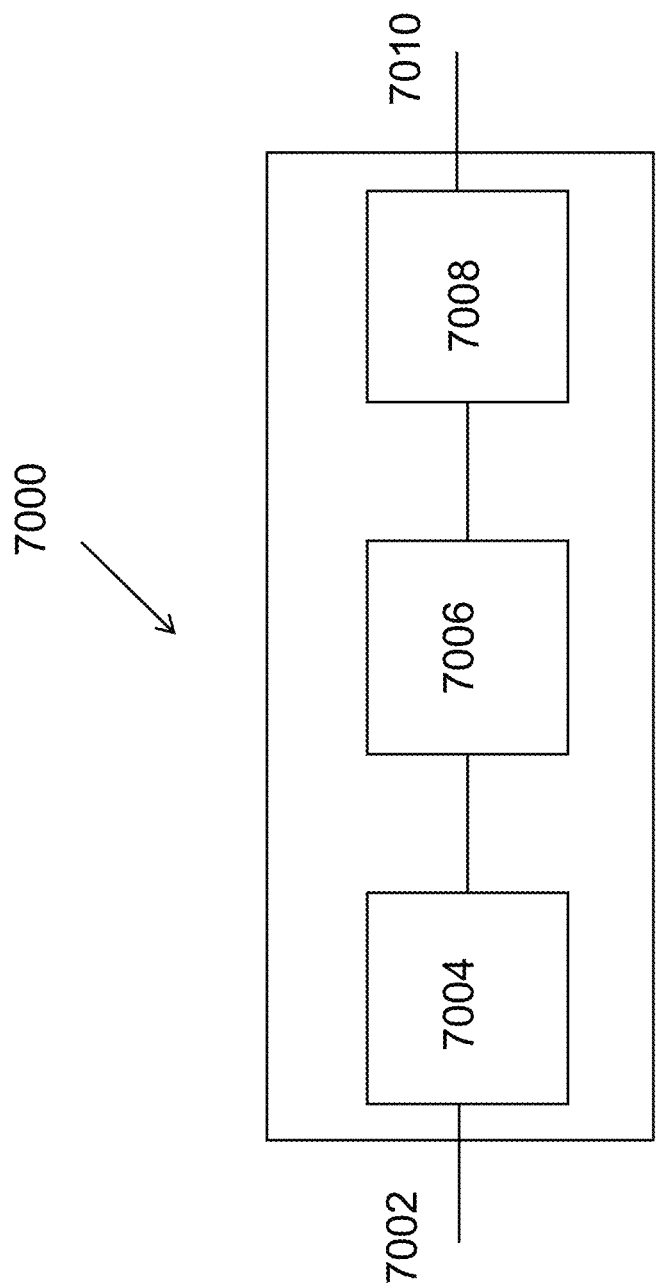
FIG. 7 is a block diagram showing an example video processing system in which various techniques disclosed herein may be implemented.

FIG. 7 is a block diagram showing an example video processing system 7000 in which various techniques disclosed herein may be implemented. Various implementations may include some or all of the components of the system 7000. The system 7000 may include input 7002 for receiving video content. The video content may be received in a raw or uncompressed format, e.g, 8 or 10 bit multi-component pixel values, or may be in a compressed or encoded format. The input 7002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 7000 may include a coding component 7004 that may implement the various coding or encoding methods described in the present document. The coding component 7004 may reduce the average bitrate of video from the input 7002 to the output of the coding component 7004 to produce a coded representation of the video. The coding techniques are therefore sometimes called video compression or video transcoding techniques. The output of the coding component 7004 may be either stored, or transmitted via a communication connected, as represented by the component 7006. The stored or communicated bitstream (or coded) representation of the video received at the input 7002 may be used by the component 7008 for generating pixel values or displayable video that is sent to a display interface 7010. The process of generating user-viewable video from the bitstream representation (or bitstream) is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 8:
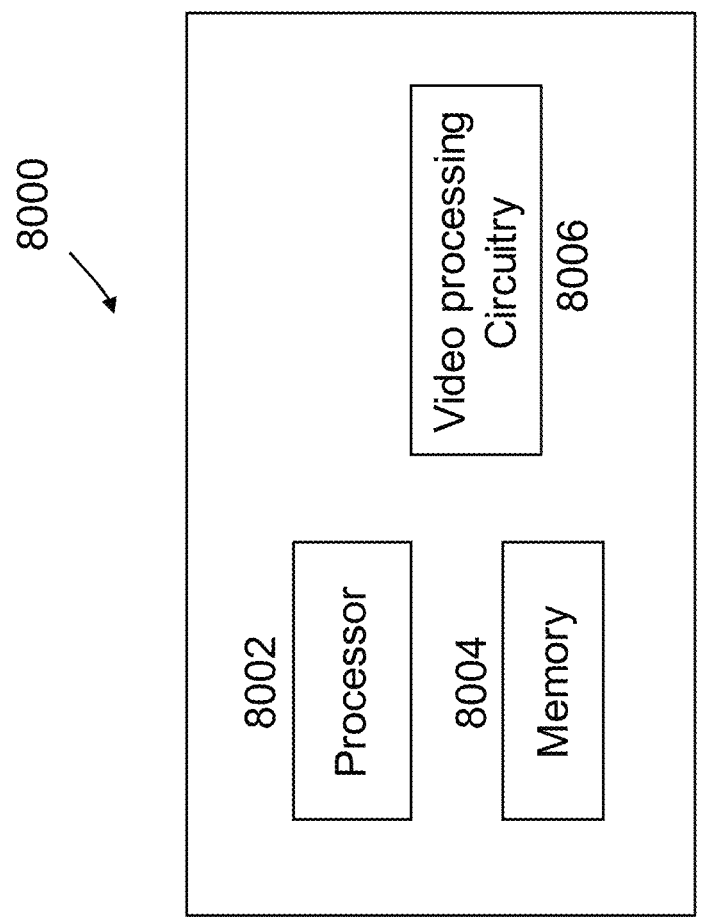
FIG. 8 is a block diagram of an example hardware platform used for video processing.

FIG. 8 is a block diagram of a video processing apparatus 8000. The apparatus 8000 may be used to implement one or more of the methods described herein. The apparatus 8000 may be embodied in a smartphone, tablet, computer, Internet of Things (IoT) receiver, and so on. The apparatus 8000 may include one or more processors 8002, one or more memories 8004 and video processing hardware 8006. The processor(s) 8002 may be configured to implement one or more methods described in the present document (e.g., in FIGS. 12-13). The memory (memories) may be used for storing data and code used for implementing the methods and techniques described herein. The video processing hardware 8006 may be used to implement, in hardware circuitry, some techniques described in the present document.

Figure 9:
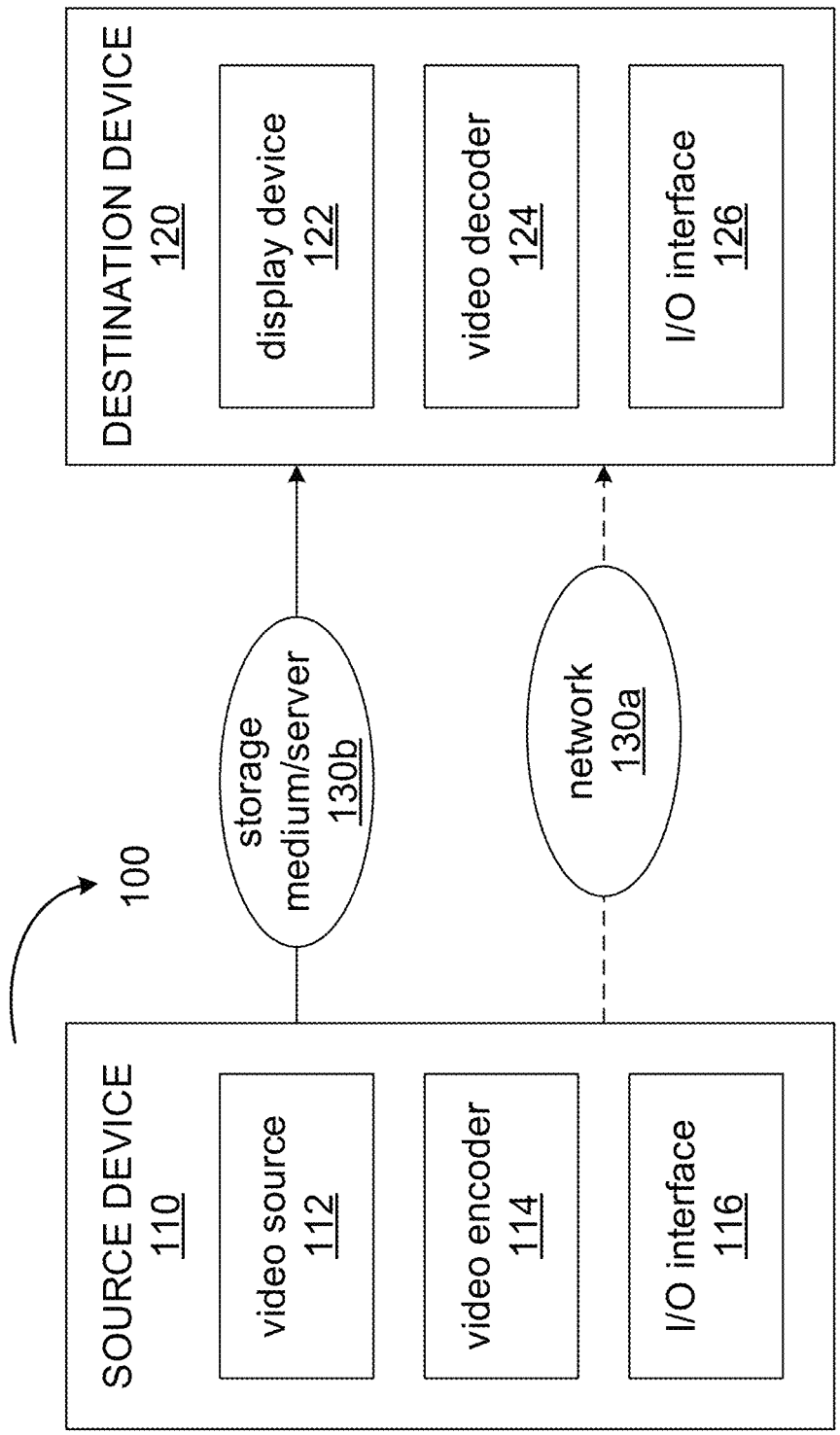
FIG. 9 is a block diagram that illustrates an example video coding system that can implement some embodiments of the present disclosure.

FIG. 9 is a block diagram that illustrates an example video coding system 100 that may utilize the techniques of this disclosure. As shown in FIG. 9, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 10:
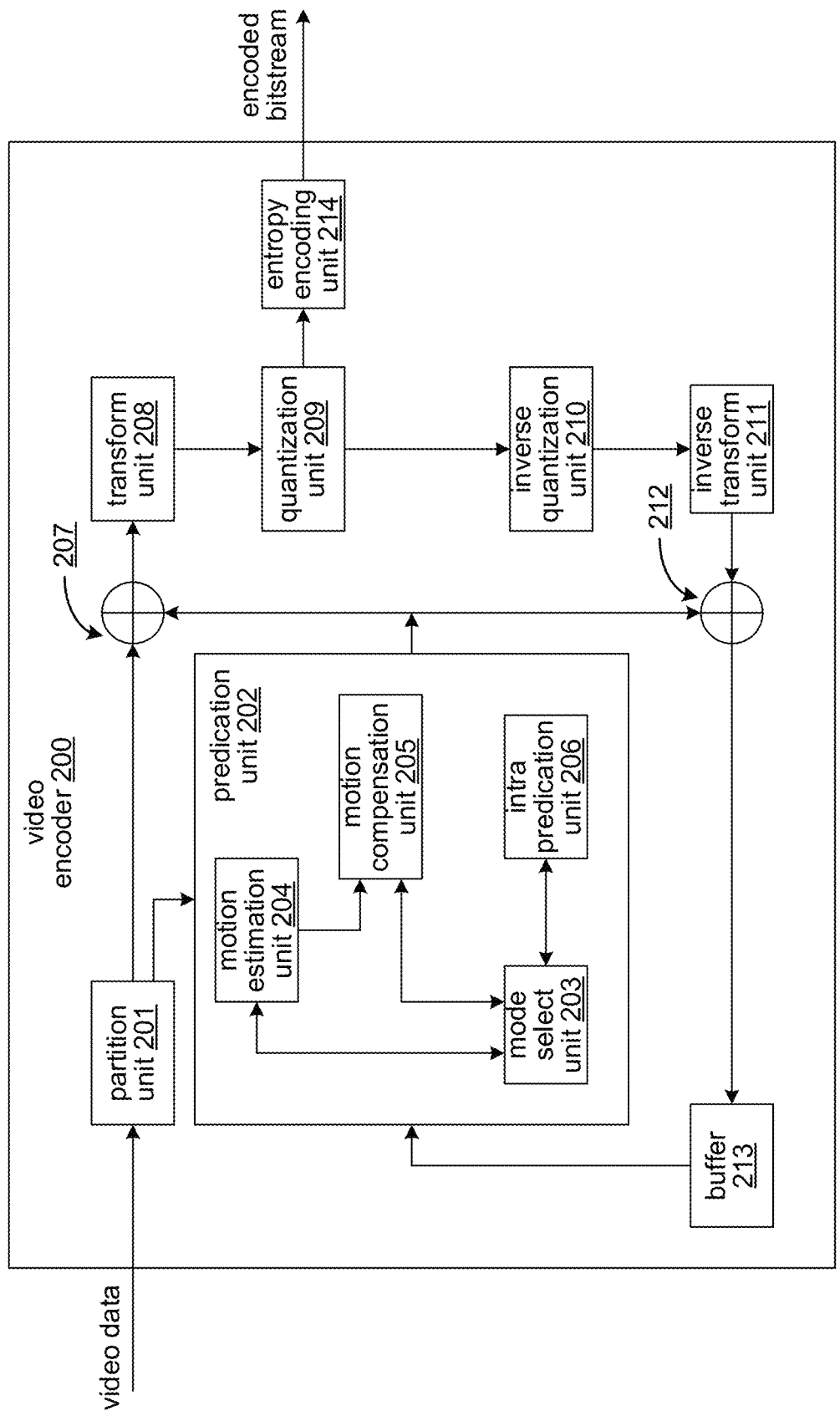
FIG. 10 is a block diagram that illustrates an example of an encoder that can implement some embodiments of the present disclosure.

FIG. 10 is a block diagram illustrating an example of video encoder 200, which may be video encoder 114 in the system 100 illustrated in FIG. 9.

Video encoder 200 may be configured to perform any or all of the techniques of this disclosure. In the example of FIG. 10, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 10 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g, a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current videoblock based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 201 may receive data from other functional components of the video encoder 200. When entropy encoding unit 201 receives the data, entropy encoding unit 201 may perform one or more entropy encoding operations to generate entropy encoded data and output a bitstream that includes the entropy encoded data.

Figure 11:
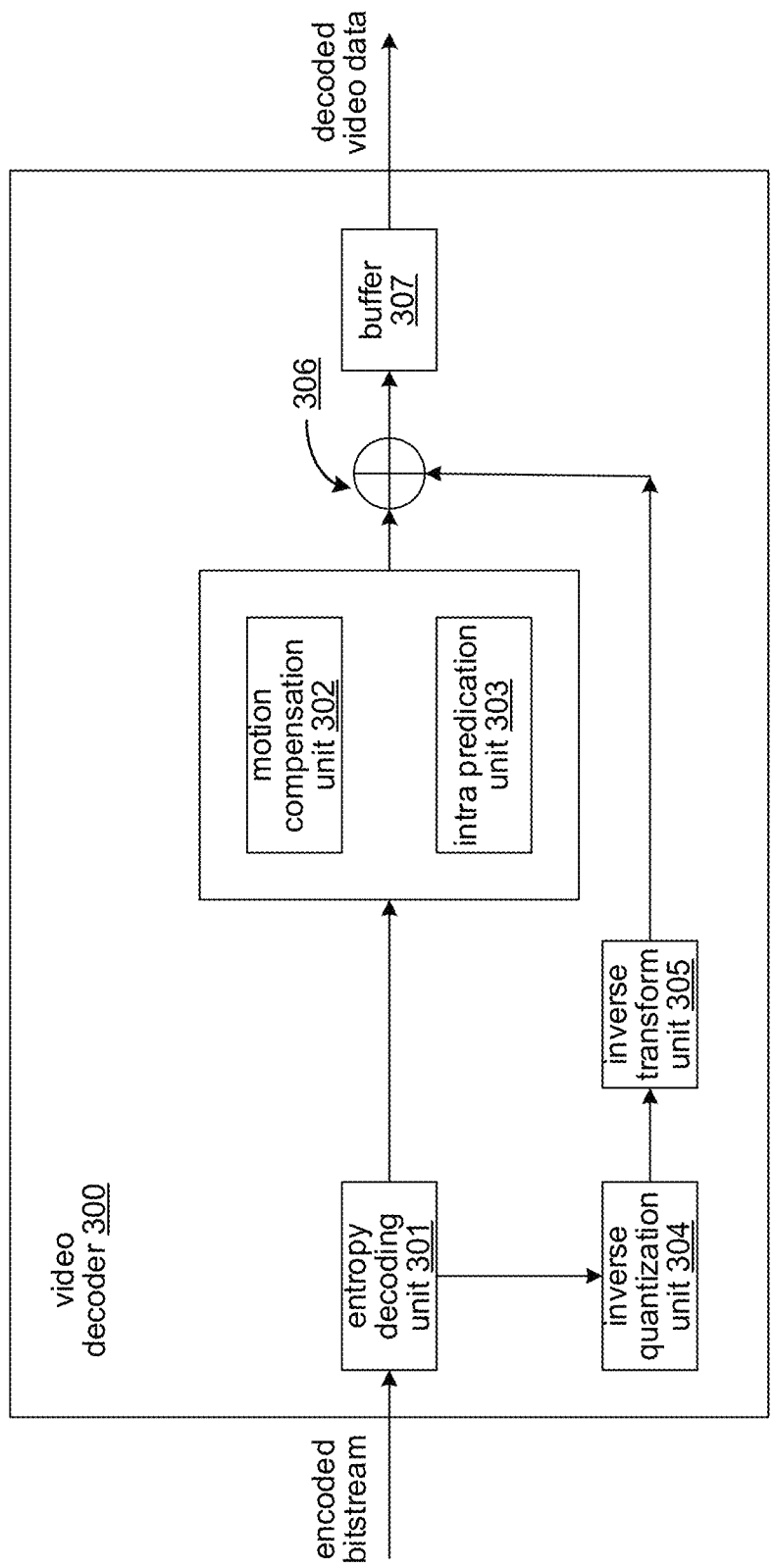
FIG. 11 is a block diagram that illustrates an example of a decoder that can implement some embodiments of the present disclosure.

FIG. 11 is a block diagram illustrating an example of video decoder 300 which may be video decoder 114 in the system 100 illustrated in FIG. 9.

The video decoder 300 may be configured to perform any or all of the techniques of this disclosure. In the example of FIG. 11, the video decoder 300 includes a plurality of functional components. The techniques described in this disclosure may be shared among the various components of the video decoder 300. In some examples, a processor may be configured to perform any or all of the techniques described in this disclosure.

In the example of FIG. 11, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 10).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

FIGS. 12-17 show example methods that can implement the technical solution described above in, for example, the embodiments shows in FIGS. 1-5.

Figure 12:
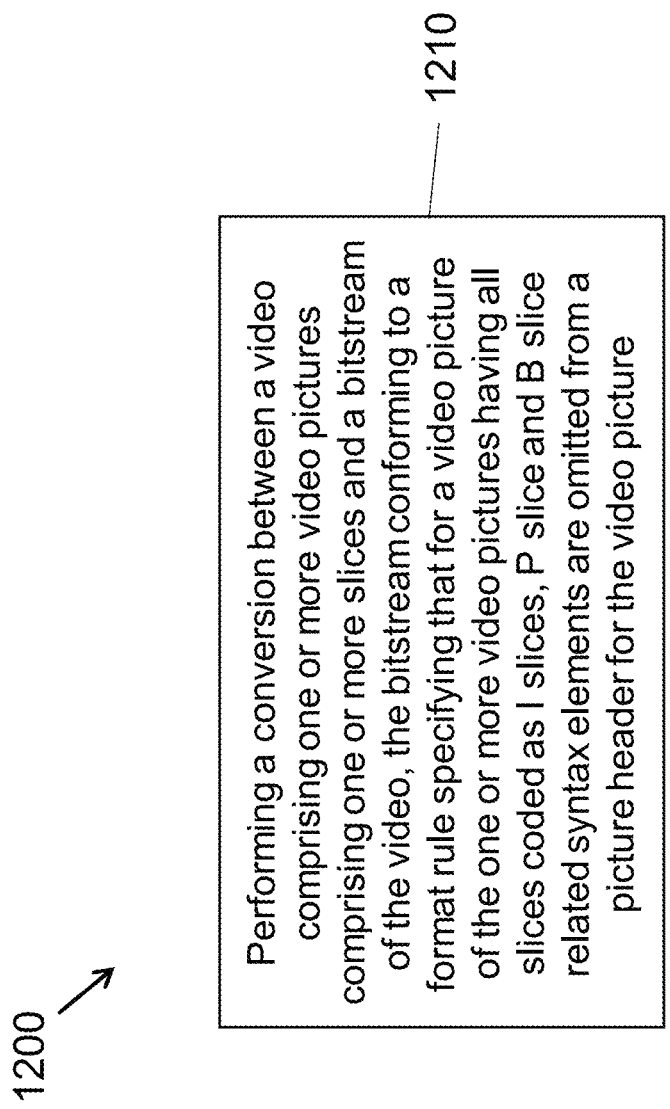
FIGS. 12-17 show flowcharts for example methods of video processing.

FIG. 12 shows a flowchart for an example method 1200 of video processing. The method 1200 includes, at operation 1210, performing a conversion between a video comprising one or more video pictures comprising one or more slices and a bitstream of the video, the bitstream conforming to a format rule specifying that for a video picture of the one or more video pictures having all slices coded as I slices, P slice and B slice related syntax elements are omitted from a picture header for the video picture.

Figure 13:
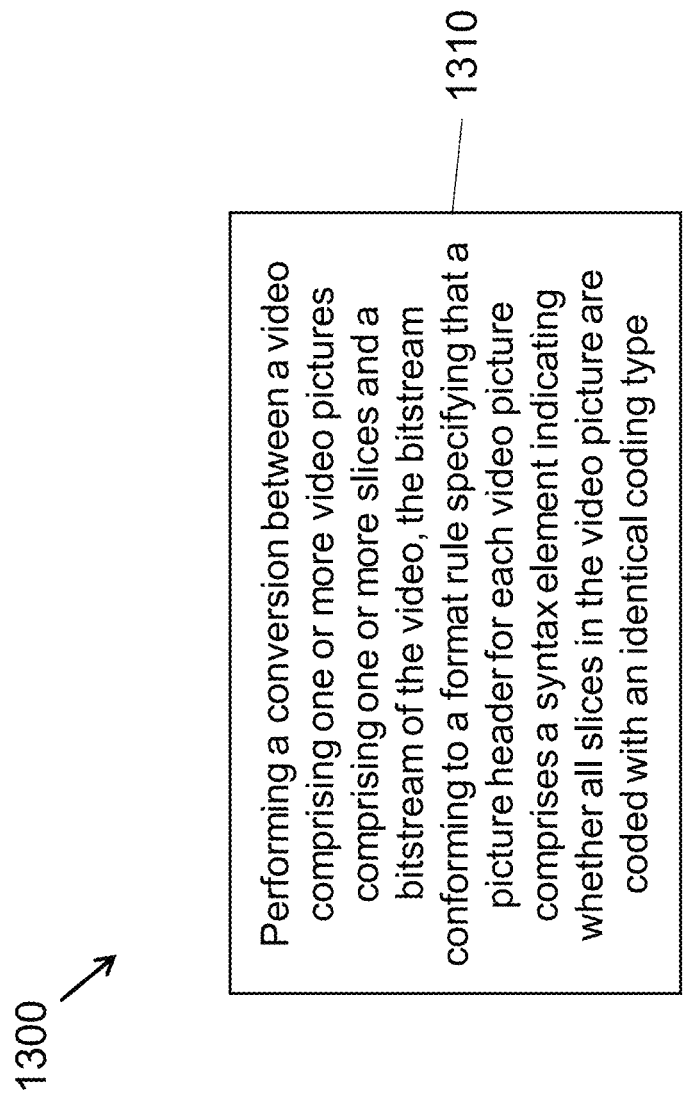

FIG. 13 shows a flowchart for an example method 1300 of video processing. The method 1300 includes, at operation 1310, performing a conversion between a video comprising one or more video pictures comprising one or more slices and a bitstream of the video, the bitstream conforming to a format rule specifying that a picture header for each video picture comprises a syntax element indicating whether all slices in the video picture are coded with an identical coding type.

Figure 14:
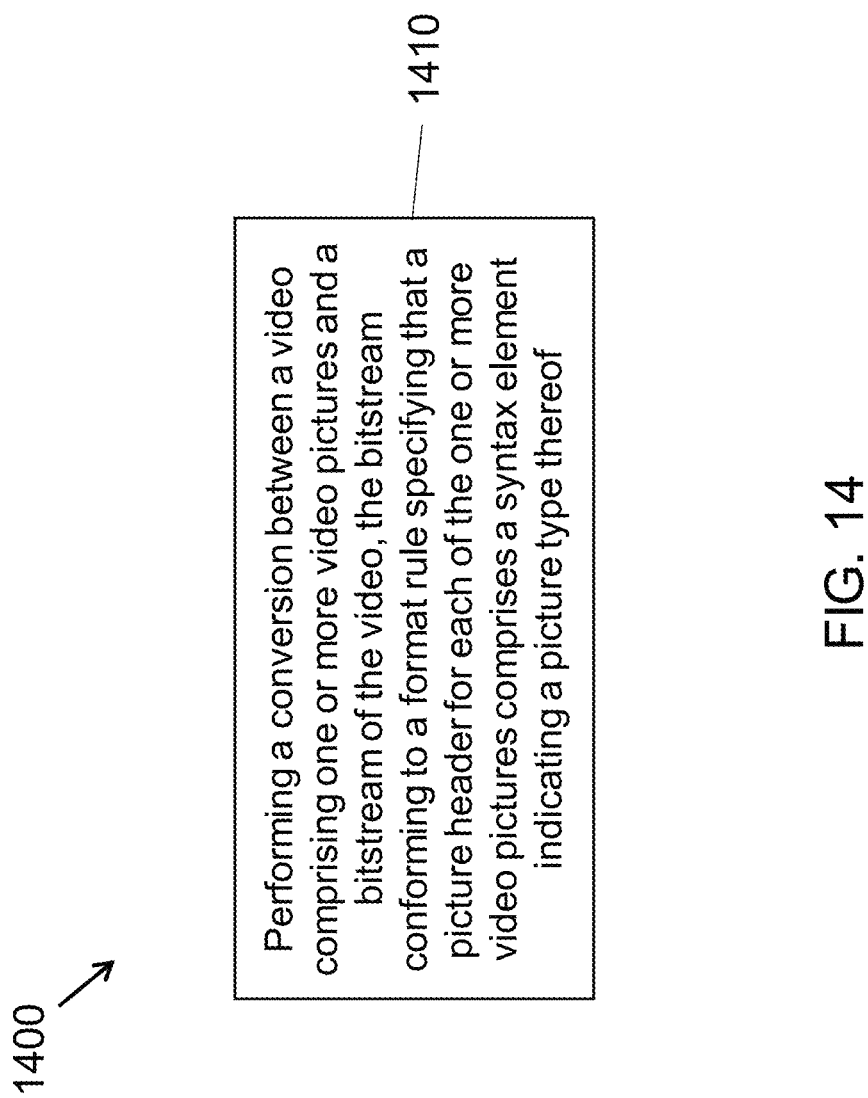

FIG. 14 shows a flowchart for an example method 1400 of video processing. The method 1400 includes, at operation 1410, performing a conversion between a video comprising one or more video pictures and a bitstream of the video, the bitstream conforming to a format rule specifying that a picture header for each of the one or more video pictures comprises a syntax element indicating a picture type thereof.

Figure 15:
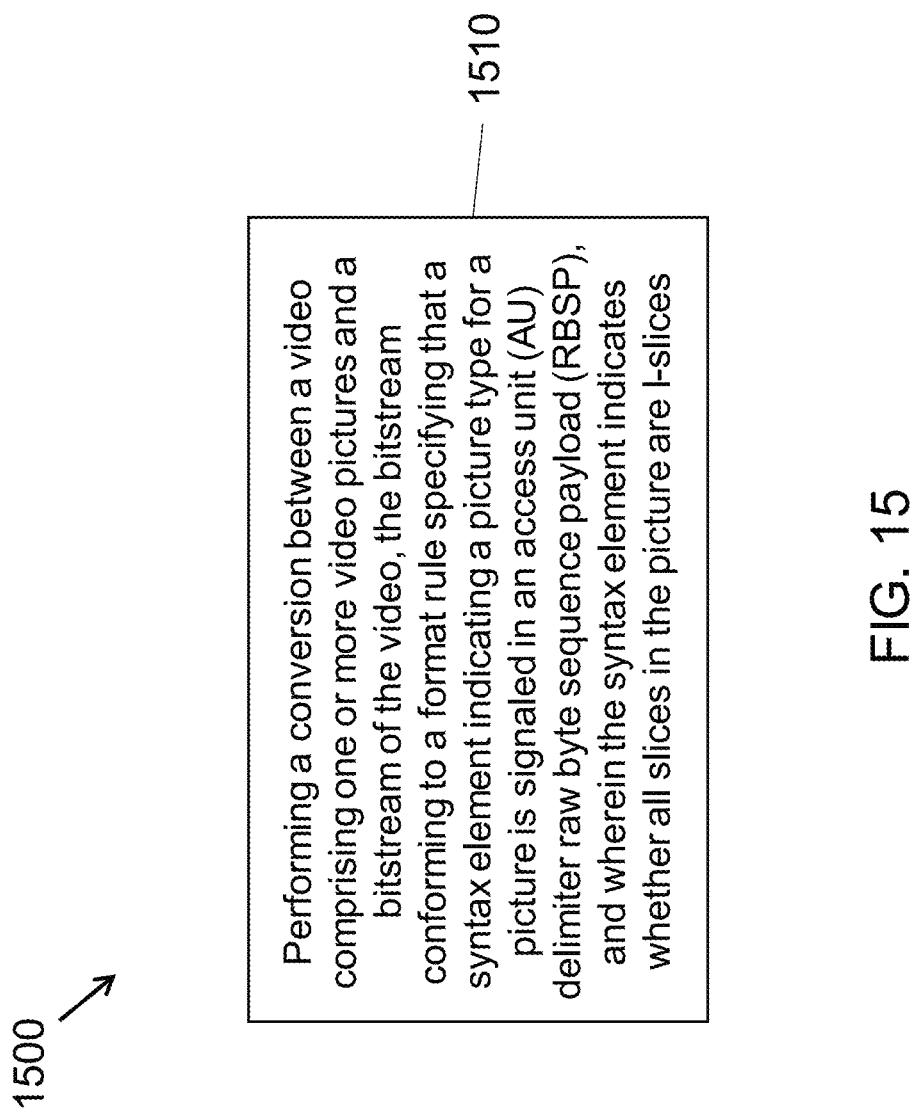

FIG. 15 shows a flowchart for an example method 1500 of video processing. The method 1500 includes, at operation 1510, performing a conversion between a video comprising one or more video pictures and a bitstream of the video, the bitstream conforming to a format rule specifying that a syntax element indicating a picture type for a picture is signaled in an access unit (AU) delimiter raw byte sequence payload (RBSP), and wherein the syntax element indicates whether all slices in the picture are I-slices.

Figure 16:
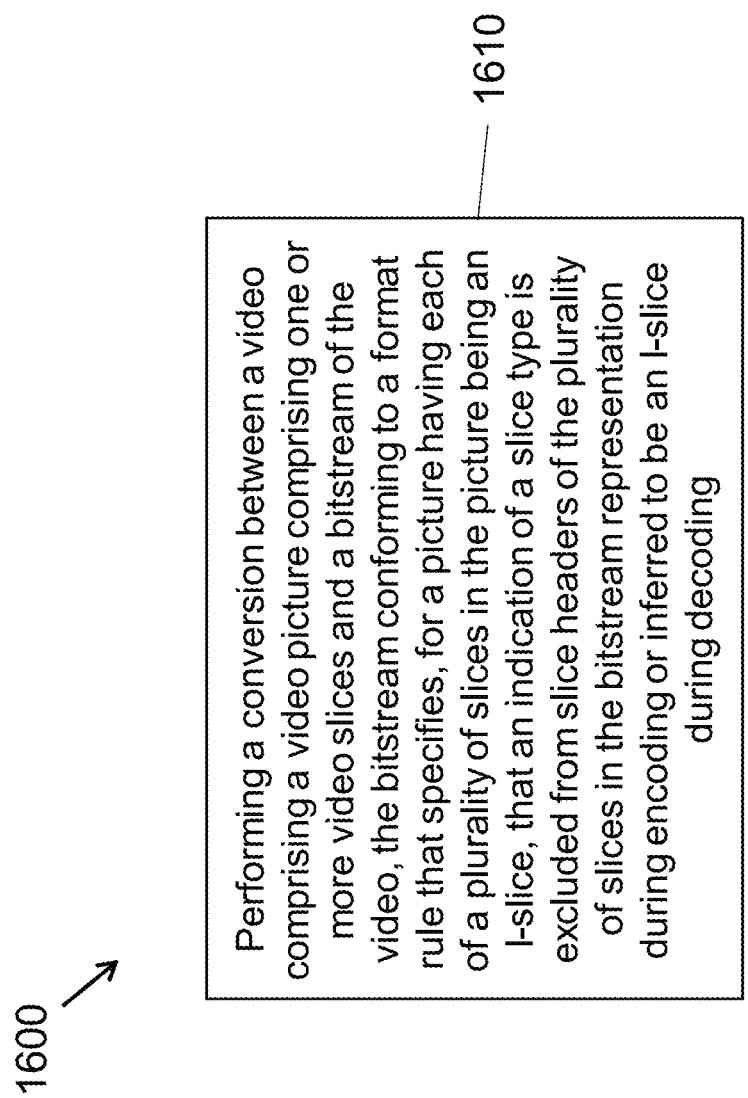

FIG. 16 shows a flowchart for an example method 1600 of video processing. The method 1600 includes, at operation 1610, performing a conversion between a video comprising a video picture comprising one or more video slices and a bitstream of the video, the bitstream conforming to a format rule that specifies, for a picture having each of a plurality of slices in the picture being an I-slice, that an indication of a slice type is excluded from slice headers of the plurality of slices in the bitstream during encoding or inferred to be an I-slice during decoding.

Figure 17:
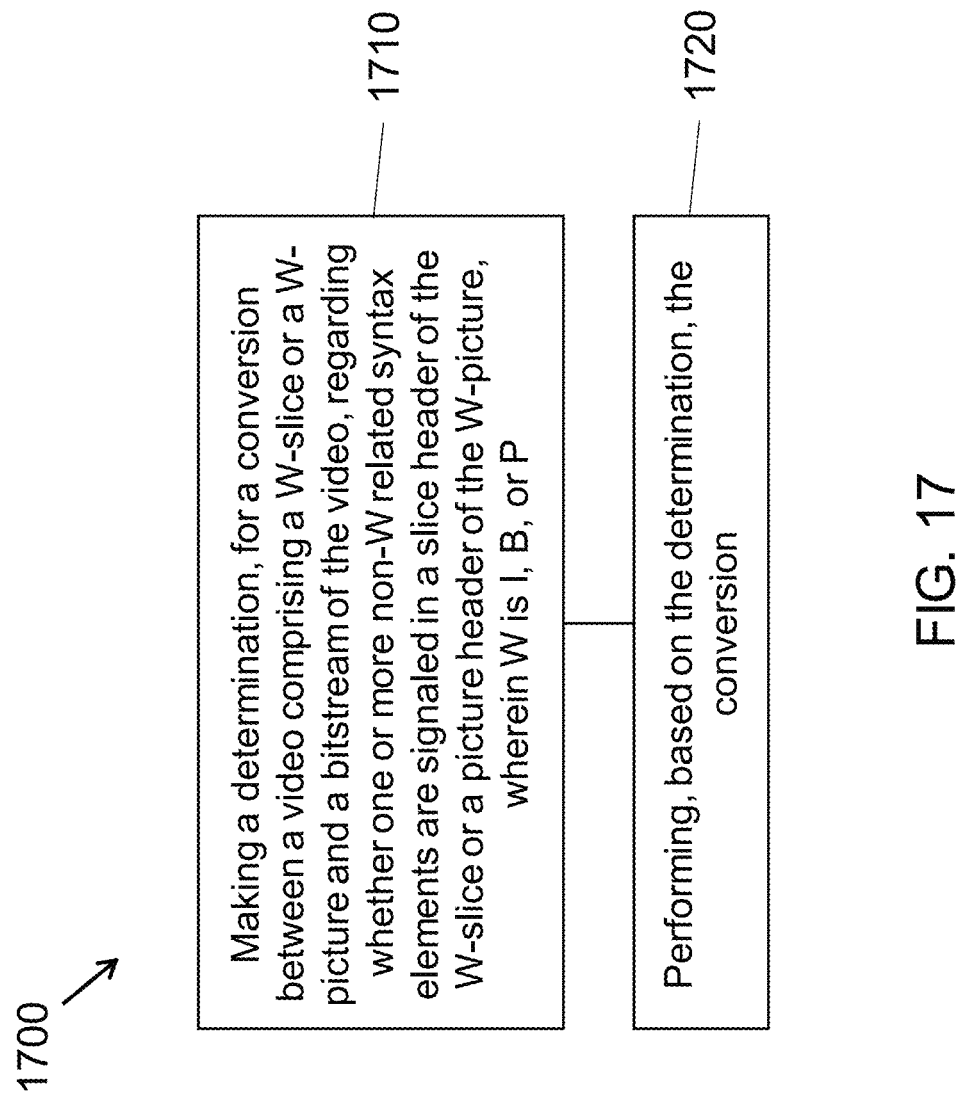

FIG. 17 shows a flowchart for an example method 1700 of video processing. The method 1700 includes, at operation 1710, making a determination, for a conversion between a video comprising a W-slice or a W-picture and a bitstream of the video, regarding whether one or more non-W related syntax elements are signaled in a slice header of the W-slice or a picture header of the W-picture, wherein W is I, B, or P.

The method 1700 includes, at operation 1720, performing, based on the determination, the conversion.

A listing of solutions preferred by some embodiments is provided next.

1. A method of video processing, comprising performing a conversion between a video comprising one or more video pictures comprising one or more slices and a bitstream of the video, wherein the bitstream conforms to a format rule, and wherein the format rule specifies that for a video picture of the one or more video pictures having all slices coded as I slices, P slice and B slice related syntax elements are omitted from a picture header for the video picture.

2. The method of solution 1, wherein a first syntax element indicating that all slices of the video unit are I slices is signaled in the picture header.

3. The method of solution 2, wherein whether or not to signal a second syntax element in the bitstream is based on the first syntax element, and wherein the second syntax element indicates slice type information in a slice header of a slice associated with the picture header.

4. The method of solution 3, wherein the second syntax element is excluded from the bitstream and inferred to be a slice type.

5. The method of solution 3, wherein the second syntax element is signaled in the bitstream and is equal to one of multiple predetermined values based on a conformance requirement 6. The method of solution 3, wherein a first syntax element indicating that the video unit comprises all I slices is signaled in an access unit (AU) delimiter raw byte sequence payload (RBSP) associated with at least one of the I slices.

7. A method of video processing, comprising performing a conversion between a video comprising one or more video pictures comprising one or more slices and a bitstream of the video, wherein the bitstream conforms to a format rule, and wherein the format rule specifies that a picture header for each video picture comprises a syntax element indicating whether all slices in the video picture are coded with an identical coding type.

8. The method of solution 7, wherein all slices are coded as either I slices, P slices, or B slices.

9. The method of solution 7, wherein a slice header for a slice excludes slice type information and the slice is inferred to be an I-slice due to the syntax element in the picture header indicating that all the slices are I slices.

10. A method of video processing, comprising performing a conversion between a video comprising one or more video pictures and a bitstream of the video, wherein the bitstream conforms to a format rule, and wherein the format rule specifies that a picture header for each of the one or more video pictures comprises a syntax element indicating a picture type thereof.

11. The method of solution 10, wherein a slice type of one or more slices in the picture is only allowed to indicate an I-slice due to the syntax element indicating that the picture is an I-picture.

12. The method of solution 10, wherein a slice type of one or more slices in the picture indicates an I-slice and/or a B-slice and/or a P-slice due to the syntax element indicating that the picture is a non-I picture.

13. A method of video processing, comprising performing a conversion between a video comprising one or more video pictures and a bitstream of the video, wherein the bitstream conforms to a format rule, and wherein the format rule specifies that a syntax element indicating a picture type for a picture is signaled in an access unit (AU) delimiter raw byte sequence payload (RBSP), and wherein the syntax element indicates whether all slices in the picture are I-slices.

14. A method of video processing, comprising performing a conversion between a video comprising a video picture comprising one or more video slices and a bitstream of the video, wherein the bitstream conforms to a format rule, and wherein, for a picture having each of a plurality of slices in the picture be an I-slice, the format rule specifies that an indication of a slice type is excluded from slice headers of the plurality of slices in the bitstream during encoding or inferred to be an I-slice during decoding.

15. The method of solution 14, wherein the bitstream is organized such that each of the plurality of slices in the picture is an I-slice.

16. The method of solution 14, wherein the bitstream is organized such that a B-slice or a P-slice is not included in the picture.

17. A method of video processing, comprising making a determination, for a conversion between a video comprising a W-slice or a W-picture and a bitstream of the video, regarding whether one or more non-W related syntax elements are signaled in a slice header of the W-slice or a picture header of the W-picture, wherein W is I, B, or P, and performing, based on the determination, the conversion.

18. The method of solution 17, wherein W is I, and wherein non-W is B or P.

19. The method of solution 17, wherein W is B, and wherein non-W is I or P.

20. The method of any of solutions 17 to 19, wherein the one or more syntax elements are excluded from the bitstream due to all slices in the picture being W-slices.

21. The method of any of solutions 17 to 19, wherein the one or more syntax elements are conditionally signaled in the bitstream due to all slices in the picture being W-slices.

22. The method of any of solutions 17 to 21, wherein the one or more syntax elements comprise reference picture related syntax elements in the picture header.

23. The method of any of solutions 17 to 21, wherein the one or more syntax elements comprise inter slice related syntax elements in the picture header.

24. The method of any of solutions 17 to 21, wherein the one or more syntax elements comprise inter prediction related syntax elements in the picture header.

25. The method of any of solutions 17 to 21, wherein the one or more syntax elements comprise bi-prediction related syntax elements in the picture header.

26. The method of any of solutions 1 to 25, wherein the conversion comprises decoding the video from the bitstream.

27. The method of any of solutions 1 to 25, wherein the conversion comprises encoding the video into the bitstream.

28. A method of writing a bitstream representing a video to a computer-readable recording medium, comprising: generating a bitstream from a video according to a method described in any of solutions 1 to 25; and writing the bitstream to a computer-readable recording medium.

29. A video processing apparatus comprising a processor configured to implement a method recited in any one or more of solutions 1 to 28.

30. A computer-readable medium having instructions stored thereon, the instructions, when executed, causing a processor to implement a method recited in any one or more of solutions 1 to 27.

31. A computer readable medium that stores the bitstream generated according to any of solutions 1 to 28.

32. A video processing apparatus for storing a bitstream, wherein the video processing apparatus is configured to implement a method recited in any one or more of solutions 1 to 28.

In the present document, the term "video processing" may refer to video encoding, video decoding, video compression or video decompression. For example, video compression algorithms may be applied during conversion from pixel representation of a video to a corresponding bitstream or vice versa. The bitstream of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   determining, for a conversion between a first video picture of a video comprising one or more video pictures and a bitstream of the video, a value of a first syntax element included in a picture header for the first video picture, wherein the first syntax element indicates whether all slices included in the first video picture are I slices;
   determining, based on the value of the first syntax element, whether to signal a second syntax element in a slice header of a slice included in the first video picture, wherein the second syntax element indicates a slice type of the slice; and
   performing the conversion based on the determining,
   wherein, in response to the value of the first syntax element indicating that all slices included in the first video picture are I slices, the second syntax element is omitted from slice headers of all slices included in the first video picture, and a value of the second syntax element is inferred to indicate an I slice,
   wherein, in response to the value of the first syntax element indicating that all slices included in the first video picture are I slices, one or more syntax elements are omitted from the picture header for the first video picture in the bitstream,
   wherein the one or more syntax elements comprise a third syntax element specifying usage of a first prediction mode for the first video picture,
   wherein, in the first prediction mode, a signaled motion vector is refined based on at least one motion vector with an offset to the signaled motion vector, and
   wherein the one or more syntax elements are conditionally included in the picture header when the value of the first syntax element does not indicate all slices included in the first video picture are I slices.

2. The method of claim 1, wherein the one or more syntax elements further comprise at least one of: temporal_mvp_enabled_flag, mvd_l1_zero_flag, a fourth syntax element specifying a usage of a second prediction mode for the first video picture, or a fifth syntax element specifying a usage of a third prediction mode for the first video picture,
   wherein, in the second prediction mode, for a video block in the first video picture, a bi-directional optical flow tool is used to obtain a motion vector offset based on at least one gradient value corresponding to a sample in a reference block of the video block, and
   wherein, in the third prediction mode, for a video block in the first video picture, initial prediction samples of a sub-block of the video block coded with an affine mode is generated, and an optical flow operation is applied to generate final prediction samples for the sub-block by deriving a prediction refinement based on motion vector differences dMvH or dMvV, wherein dMvH and dMvV indicate motion vector differences along a horizontal direction and a vertical direction, respectively.

3. The method of claim 1, wherein the one or more syntax elements further comprise at least one of: log 2_diff_min_qt_min_cb_inter_slice, max_mtt_hierarchy_depth_inter_slice, log 2_diff_max_bt_min_qt_inter_slice, or log 2_diff_max_tt_min_qt_inter_slice.

4. The method of claim 1, wherein an intra slice allowed flag is conditionally included in the picture header.

5. The method of claim 1, wherein the first video picture comprises one or more tiles, wherein a maximum tile width of the one or more tiles is defined as a maximum luma tile width in units of coding tree blocks, and a maximum tile height of the one or more tiles is defined as a maximum luma tile height in units of coding tree blocks.

6. The method of claim 1, wherein the conversion includes decoding the video from the bitstream.

7. The method of claim 1, wherein the conversion includes encoding the video into the bitstream.

8. An apparatus for processing video data comprising a processor and a non-transitory memory with instructions thereon, wherein the instructions upon execution by the processor, cause the processor to:
   determine, for a conversion between a first video picture of a video comprising one or more video pictures and a bitstream of the video, a value of a first syntax element included in a picture header for the first video picture, wherein the first syntax element indicates whether all slices included in the first video picture are I slices;
   determine, based on the value of the first syntax element, whether to signal a second syntax element in a slice header of a slice included in the first video picture, wherein the second syntax element indicates a slice type of the slice; and
   perform the conversion based on the determining,
   wherein, in response to the value of the first syntax element indicating that all slices included in the first video picture are I slices, the second syntax element is omitted from slice headers of all slices included in the first video picture, and a value of the second syntax element is inferred to indicate an I slice, wherein, in response to the value of the first syntax element indicating that all slices included in the first video picture are I slices, one or more syntax elements are omitted from the picture header for the first video picture in the bitstream, wherein the one or more syntax elements comprise a third syntax element specifying usage of a first prediction mode for the first video picture, wherein, in the first prediction mode, a signaled motion vector is refined based on at least one motion vector with an offset to the signaled motion vector, and wherein the one or more syntax elements are conditionally included in the picture header when the value of the first syntax element does not indicate all slices included in the first video picture are I slices.

9. The apparatus of claim 8, wherein the one or more syntax elements further comprise at least one of: temporal_mvp_enabled_flag, mvd_l1_zero_flag, a fourth syntax element specifying a usage of a second prediction mode for the first video picture, or a fifth syntax element specifying a usage of a third prediction mode for the first video picture, wherein, in the second prediction mode, for a video block in the first video picture, a bi-directional optical flow tool is used to obtain a motion vector offset based on at least one gradient value corresponding to a sample in a reference block of the video block, and wherein, in the third prediction mode, for a video block in the first video picture, initial prediction samples of a sub-block of the video block coded with an affine mode is generated, and an optical flow operation is applied to generate final prediction samples for the sub-block by deriving a prediction refinement based on motion vector differences dMvH or dMvV, wherein dMvH and dMvV indicate motion vector differences along a horizontal direction and a vertical direction.

10. The apparatus of claim 8, wherein the one or more syntax elements further comprise at least one of: log 2_diff_min_qt_min_cb_inter_slice, max_mtt_hierarchy_depth_inter_slice, log 2_diff_max_bt_min_qt_inter_slice, or log 2_diff_max_tt_min_qt_inter_slice.

11. A non-transitory computer-readable storage medium storing instructions that cause a processor to:

determine, for a conversion between a first video picture of a video comprising one or more video pictures and a bitstream of the video, a value of a first syntax element included in a picture header for the first video picture, wherein the first syntax element indicates whether all slices included in the first video picture are I slices;

determine, based on the value of the first syntax element, whether to signal a second syntax element in a slice header of a slice included in the first video picture, wherein the second syntax element indicates slice type of the slice; and perform the conversion based on the determining, wherein, in response to the value of the first syntax element indicating that all slices included in the first video picture are I slices, the second syntax element is omitted from slice headers of all slices included in the first video picture, and a value of the second syntax element is inferred to indicate I slice, wherein, in response to the value of the first syntax element indicating that all slices included in the first video picture are I slices, one or more syntax elements are omitted from the picture header for the first video picture in the bitstream, wherein the one or more syntax elements comprise a third syntax element specifying usage of a first prediction mode for the first video picture, wherein, in the first prediction mode, a signaled motion vector is refined based on at least one motion vector with an offset to the signaled motion vector, and wherein the one or more syntax elements are conditionally included in the picture header when the value of the first syntax element does not indicate all slices included in the first video picture are I slices.

12. A non-transitory computer-readable storage medium storing a bitstream of a video which is generated by a method performed by a video processing apparatus, wherein the method comprises:

determine, for a first video picture of a video comprising one or more video pictures, a value of a first syntax element included in a picture header for the first video picture, wherein the first syntax element indicates whether all slices included in the first video picture are I slices;

determine, based on the value of the first syntax element, whether to signal a second syntax element in a slice header of a slice included in the first video picture, wherein the second syntax element indicates a slice type of the slice; and generating the bitstream based on the determining, wherein, in response to the value of the first syntax element indicating that all slices included in the first video picture are I slices, the second syntax element is omitted from slice headers of all slices included in the first video picture, and a value of the second syntax element is inferred to indicate an I slice, wherein, in response to the value of the first syntax element indicating that all slices included in the first video picture are I slices, one or more syntax elements are omitted from the picture header for the first video picture in the bitstream, wherein the one or more syntax elements comprise a third syntax element specifying usage of a first prediction mode for the first video picture, wherein, in the first prediction mode, a signaled motion vector is refined based on at least one motion vector with an offset to the signaled motion vector, and wherein the one or more syntax elements are conditionally included in the picture header when the value of the first syntax element does not indicate all slices included in the first video picture are I slices.

13. The method of claim 1, wherein the first video picture comprises one or more slices, and wherein a maximum slice height of the one or more slices is defined in units of coding tree blocks.

14. The apparatus of claim 8, wherein an intra slice allowed flag is conditionally included in the picture header.

15. The apparatus of claim 8, wherein the first video picture comprises one or more tiles, wherein a maximum tile width of the one or more tiles is defined as a maximum luma tile width in units of coding tree blocks, and wherein a maximum tile height of the one or more tiles is defined as a maximum luma tile height in units of coding tree blocks.

16. The apparatus of claim 8, wherein the first video picture comprises one or more slices, and wherein a maximum slice height of the one or more slices is defined in units of coding tree blocks.

17. The non-transitory computer-readable storage medium of claim 11, wherein the one or more syntax elements further comprise at least one of: a temporal_mvp_enabled_flag, an mvd_l1_zero_flag, a fourth syntax element specifying a usage of a second prediction mode for the first video picture, or a fifth syntax element specifying a usage of a third prediction mode for the first video picture,
- wherein, in the second prediction mode, for a video block in the first video picture, a bi-directional optical flow tool is used to obtain a motion vector offset based on at least one gradient value corresponding to a sample in a reference block of the video block, and
- wherein, in the third prediction mode, for a video block in the first video picture, initial prediction samples of a sub-block of the video block coded with an affine mode is generated, and an optical flow operation is applied to generate final prediction samples for the sub-block by deriving a prediction refinement based on motion vector differences dMvH or dMvV, and wherein dMvH and dMvV indicate motion vector differences along a horizontal direction and a vertical direction, respectively.

18. The non-transitory computer-readable storage medium of claim 11, wherein the one or more syntax elements further comprise at least one of: log 2_diff_min_qt_min_cb_inter_slice, max_mtt_hierarchy_depth_inter_slice, log 2_diff_max_bt_min_qt_inter_slice, or log 2_diff_max_tt_min_qt_inter_slice.

19. The non-transitory computer-readable storage medium of claim 12, wherein the one or more syntax elements further comprise at least one of: a temporal_mvp_enabled_flag, an mvd_l1_zero_flag, a fourth syntax element specifying a usage of a second prediction mode for the first video picture, or a fifth syntax element specifying a usage of a third prediction mode for the first video picture,
- wherein, in the second prediction mode, for a video block in the first video picture, a bi-directional optical flow tool is used to obtain a motion vector offset based on at least one gradient value corresponding to a sample in a reference block of the video block, and
- wherein, in the third prediction mode, for a video block in the first video picture, initial prediction samples of a sub-block of the video block coded with an affine mode is generated, and an optical flow operation is applied to generate final prediction samples for the sub-block by deriving a prediction refinement based on motion vector differences dMvH or dMvV, and wherein dMvH and dMvV indicate motion vector differences along a horizontal direction and a vertical direction, respectively.

20. The non-transitory computer-readable storage medium of claim 12, wherein the one or more syntax elements further comprise at least one of: log 2_diff_min_qt_min_cb_inter_slice, max_mtt_hierarchy_depth_inter_slice, log 2_diff_max_bt_min_qt_inter_slice, or log 2_diff_max_tt_min_qt_inter_slice.

\* \* \* \* \*